US011072238B2

(12) United States Patent
Yuasa et al.

(10) Patent No.: US 11,072,238 B2
(45) Date of Patent: Jul. 27, 2021

(54) FOUR-WHEEL DRIVE VEHICLE

(71) Applicant: TOYOTA JIDOSHA KABUSHIKI KAISHA, Toyota (JP)

(72) Inventors: Ryohei Yuasa, Okazaki (JP); Satoshi Ishida, Kita-Nagoya (JP); Shota Murai, Nisshin (JP); Taito Goto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 16/391,495

(22) Filed: Apr. 23, 2019

(65) Prior Publication Data
US 2019/0322171 A1 Oct. 24, 2019

(30) Foreign Application Priority Data

Apr. 23, 2018 (JP) .............................. JP2018-082626

(51) Int. Cl.
*B60K 23/08* (2006.01)
*B60K 17/02* (2006.01)
(Continued)

(52) U.S. Cl.
CPC .......... *B60K 23/0808* (2013.01); *B60K 17/02* (2013.01); *B60K 17/348* (2013.01); *B60K 17/3467* (2013.01); *B60K 2023/0816* (2013.01)

(58) Field of Classification Search
CPC ................ B60K 23/0808; B60K 17/02; B60K 17/3467; B60K 17/348; B60K 2023/0816;
(Continued)

(56) References Cited

U.S. PATENT DOCUMENTS 5,850,616 A 12/1998 Matsuno et al.
7,278,947 B2 10/2007 Puiu
(Continued)

FOREIGN PATENT DOCUMENTS

DE 10 2011 109 340 A1 2/2013
EP 2 740 627 A2 6/2014
(Continued)

*Primary Examiner* — Justin Holmes
(74) *Attorney, Agent, or Firm* — Oliff PLC

(57) ABSTRACT

A four-wheel drive vehicle in which, when a switching request is made for switching from a non-meshing state to a meshing state, the control device calculates a first rotation speed difference between the drive-power-source-side meshing teeth and the sub-drive-wheel-side meshing teeth, and a second rotation speed difference between the drive-power-source-side meshing teeth and the sub-drive-wheel-side meshing teeth. If at least one of the calculated first and second rotation speed differences is within a predetermined range set in advance, the control device couples the sub-drive wheel corresponding to the rotation speed difference within the predetermined range, to the central axle by the control coupling to switch the dog clutch from the non-meshing state to the meshing state. And, if neither the calculated first nor second rotation speed difference is within the predetermined range, the control device prohibits switching of the dog clutch from the non-meshing state to the meshing state.

7 Claims, 19 Drawing Sheets

(51) Int. Cl.
*B60K 17/346* (2006.01)
*B60K 17/348* (2006.01)

(58) Field of Classification Search
CPC .............. B60K 17/344; B60K 23/08; B60K 2023/0858; B60K 17/34; B60K 17/3515; F16D 2500/10431; F16D 2500/10462; F16D 2500/30415; F16D 2500/30426; F16D 2500/7041; F16D 48/10; F16D 48/06; F16D 2500/10456; B60Y 2400/82
See application file for complete search history.

(56) References Cited

U.S. PATENT DOCUMENTS

| | | | |
|---|---|---|---|
| 7,325,640 | B2 | 2/2008 | Ushiroda et al. |
| 8,313,407 | B2 * | 11/2012 | Ekonen ............ B60K 23/0808 475/223 |
| 9,440,533 | B2 * | 9/2016 | Maeda ................ B60K 17/35 |
| 9,688,141 | B2 | 6/2017 | Takaishi et al. |
| 2016/0280064 | A1 | 9/2016 | Nozu et al. |
| 2019/0145515 | A1 * | 5/2019 | Aoyama ............ B60K 23/0808 192/3.63 |

FOREIGN PATENT DOCUMENTS

| | | |
|---|---|---|
| EP | 3 112 726 A1 | 1/2017 |
| JP | 3577375 B2 | 10/2004 |
| JP | 2016-034812 A | 3/2016 |
| JP | 2017-001447 A | 1/2017 |
| WO | 2016/198510 A1 | 12/2016 |

\* cited by examiner

FOUR-WHEEL DRIVE VEHICLE

This application claims priority from Japanese Patent Application No. 2018-082626 filed on Apr. 23, 2018, the disclosure of which is herein incorporated by reference in its entirety.

BACKGROUND OF THE INVENTION

Field of the Invention

The present invention relates to a four-wheel drive vehicle configured to switch a dog clutch between a non-meshing state and a meshing state to selectively switch between a two-wheel drive state in which a drive power is transmitted from a drive power source to a pair of left and right main drive wheels and a four-wheel drive state in which the drive power is also transmitted from the drive power source to a pair of left and right sub-drive wheels, and relates to a technique to smoothly switch the dog clutch from the non-meshing state to the meshing state even when a speed difference exists between the wheels during running.

Description of the Related Art

There is known a four-wheel drive vehicle (a) selectively switching between a two-wheel drive state in which a drive power is transmitted from a drive power source to a pair of left and right main drive wheels and a four-wheel drive state in which the drive power is also transmitted from the drive power source to a pair of left and right sub-drive wheels through a power transmitting member for transmitting the drive power to the pair of left and right sub-drive wheels and (b) disconnecting the power transmitting member from each of the drive power source and the pair of left and right sub-drive wheels in the two-wheel drive state. For example, this corresponds to a four-wheel drive vehicle described in Patent Document 1. The four-wheel drive vehicle of Patent Document 1 includes a pair of left and right control couplings respectively coupled to the pair of left and right sub-drive wheels, a central axle disposed between the pair of left and right control couplings and coupled to these left and right control couplings, and a dog clutch selectively disconnecting or connecting a power transmission path between the central axle and the power transmitting member, and respective one-sided chamfers are formed on drive-power-source-side meshing teeth and sub-drive-wheel-side meshing teeth disposed on the dog clutch and meshing with each other.

PRIOR ART DOCUMENT

Patent Document

Patent Document 1: Japanese Laid-Open Patent Publication No. 2017-1447

SUMMARY OF INVENTION

Technical Problem

In the four-wheel drive vehicle as described in Patent Document 1, if the drive-power-source-side meshing teeth and the sub-drive-wheel-side meshing teeth of the dog clutch are provided with one-sided chamfers such that the drive-power-source-side meshing teeth and the sub-drive-wheel-side meshing teeth mesh each other when a rotation speed of the power transmitting member is greater than a rotation speed of the central axle, i.e., when a rotation speed of the drive-power-source-side meshing teeth is greater than a rotation speed of the sub-drive-wheel-side meshing teeth, the dog clutch cannot smoothly be switched from a non-meshing state in which the drive-power-source-side meshing teeth are not meshed with the sub-drive-wheel-side meshing teeth to a meshing state in which the drive-power-source-side meshing teeth are meshed with the sub-drive-wheel-side meshing teeth in some cases when a speed difference exists between the wheels during running. When the speed difference exists between the wheels during running, for example, during the vehicle is turning, a first rotation speed difference that is a rotation speed difference between the rotation speed of the power transmitting member and the rotation speed of the sub-drive wheel on the outer wheel side of the paired left and right sub-drive wheels is smaller or negative as compared to when the vehicle is running straight, and a second rotation speed difference of the rotation speed of the power transmitting member from the rotation speed of the sub-drive wheel on the inner wheel side of the paired left and right sub-drive wheels is larger as compared to when the vehicle is running straight. Therefore, if the control coupling on the outer wheel side is selected from the pair of left and right control couplings to couple the sub-drive wheel on the outer wheel side to the central axle when the vehicle is turning, the dog clutch may be unable to switch from the non-meshing state to the meshing state in a case where the first rotation speed difference is negative, for example. Alternatively, if the control coupling on the inner wheel side is selected from the pair of left and right control couplings to couple the sub-drive wheel on the inner wheel side to the central axle when the vehicle is turning, a switching sound may be generated at a level noticeable to a driver at the time of switching of the dog clutch from the non-meshing state to the meshing state in a case where the second rotation speed difference is relatively large, for example.

The present invention was conceived in view of the situations and it is therefore an object of the present invention to provide a four-wheel drive vehicle configured to switch smoothly the dog clutch from the non-meshing state to the meshing state even if a speed difference exists between wheels during running.

Solution to Problem

To achieve the above object, a first aspect of the present invention provides a four-wheel drive vehicle (a) selectively switching between a two-wheel drive state in which a drive power is transmitted from a drive power source to a pair of left and right main drive wheels and a four-wheel drive state in which the drive power is also transmitted from the drive power source to a pair of left and right sub-drive wheels through a power transmitting member for transmitting the drive power to the pair of left and right sub-drive wheels and disconnecting the power transmitting member from each of the drive power source and the pair of left and right sub-drive wheels in the two-wheel drive state, the four-wheel drive vehicle comprising: (b) a pair of left and right control couplings respectively coupled to the pair of left and right sub-drive wheels; a central axle disposed between the paired left and right control couplings and coupled to the pair of left and right control couplings; a dog clutch selectively disconnecting or connecting a power transmission path between the drive power source and the power transmitting member or a power transmission path between the power transmitting member and the central axle; and a control device, wherein (c) the dog clutch includes drive-power-source-side meshing teeth coupled to the drive power source in a power transmittable manner and sub-drive-wheel-side meshing teeth coupled to the sub-drive wheels in a power transmittable manner, wherein (d) the drive-power-source-side meshing teeth and the sub-drive-wheel-side meshing teeth are provided with one-sided chamfers to allow the drive-power-source-side meshing teeth and the sub-drive-wheel-side meshing teeth to mesh with each other when a rotation speed of the drive-power-source-side meshing teeth is greater than a rotation speed of the sub-drive-wheel-side meshing teeth in a case that the drive-power-source-side meshing teeth and the sub-drive-wheel-side meshing teeth come closer to each other and cause respective tip portions to abut on each other, wherein (e) when a switching request is made for switching from a non-meshing state in which the drive-power-source-side meshing teeth are not meshed with the sub-drive-wheel-side meshing teeth to a meshing state in which the drive-power-source-side meshing teeth are meshed with the sub-drive-wheel-side meshing teeth, the control device calculates a first rotation speed difference between the drive-power-source-side meshing teeth and the sub-drive-wheel-side meshing teeth in a case that one of the pair of left and right sub-drive wheels is coupled to the central axle by corresponding one of the pair of left and right control couplings, and a second rotation speed difference between the drive-power-source-side meshing teeth and the sub-drive-wheel-side meshing teeth in the case that the other of the pair of left and right sub-drive wheels is coupled to the central axle by corresponding the other of the pair of left and right control couplings, wherein (f) if at least one of the calculated first and second rotation speed differences is within a predetermined range set in advance, the control device couples the sub-drive wheel corresponding to the rotation speed difference within the predetermined range, to the central axle by the control coupling to switch the dog clutch from the non-meshing state to the meshing state, and wherein (g) if neither the calculated first nor second rotation speed difference is within the predetermined range, the control device prohibits switching of the dog clutch from the non-meshing state to the meshing state.

Advantageous Effects of Invention

According to the four-wheel drive vehicle recited in the first aspect of the invention, (e) when a switching request is made for switching from the non-meshing state to the meshing state, the control device calculates the above-described first and second rotation speed differences; (f) if at least one of the calculated first and second rotation speed differences is within the predetermined range, the control device couples the sub-drive wheel corresponding to the rotation speed difference within the predetermined range, to the central axle by the control coupling to switch the dog clutch from the non-meshing state to the meshing state; and (g) if neither the calculated first nor second rotation speed difference is within the predetermined region, the control device prohibits switching of the dog clutch from the non-meshing state to the meshing state. Therefore, when the dog clutch is switched from the non-meshing state to the meshing state, the sub-drive wheel having the rotation speed difference within the predetermined region can be coupled to the central axle by the control coupling, so that when the drive-power-source-side meshing teeth are meshed with the sub-drive-wheel-side meshing teeth, the rotation speed difference therebetween is within the predetermined region and allows smooth switching of the dog clutch from the non-meshing state to the meshing state. As a result, even when a speed difference exists between wheels during running, the dog clutch can smoothly be switched from the non-meshing state to the meshing state.

DESCRIPTION OF THE PREFERRED EMBODIMENTS

Figure 1:
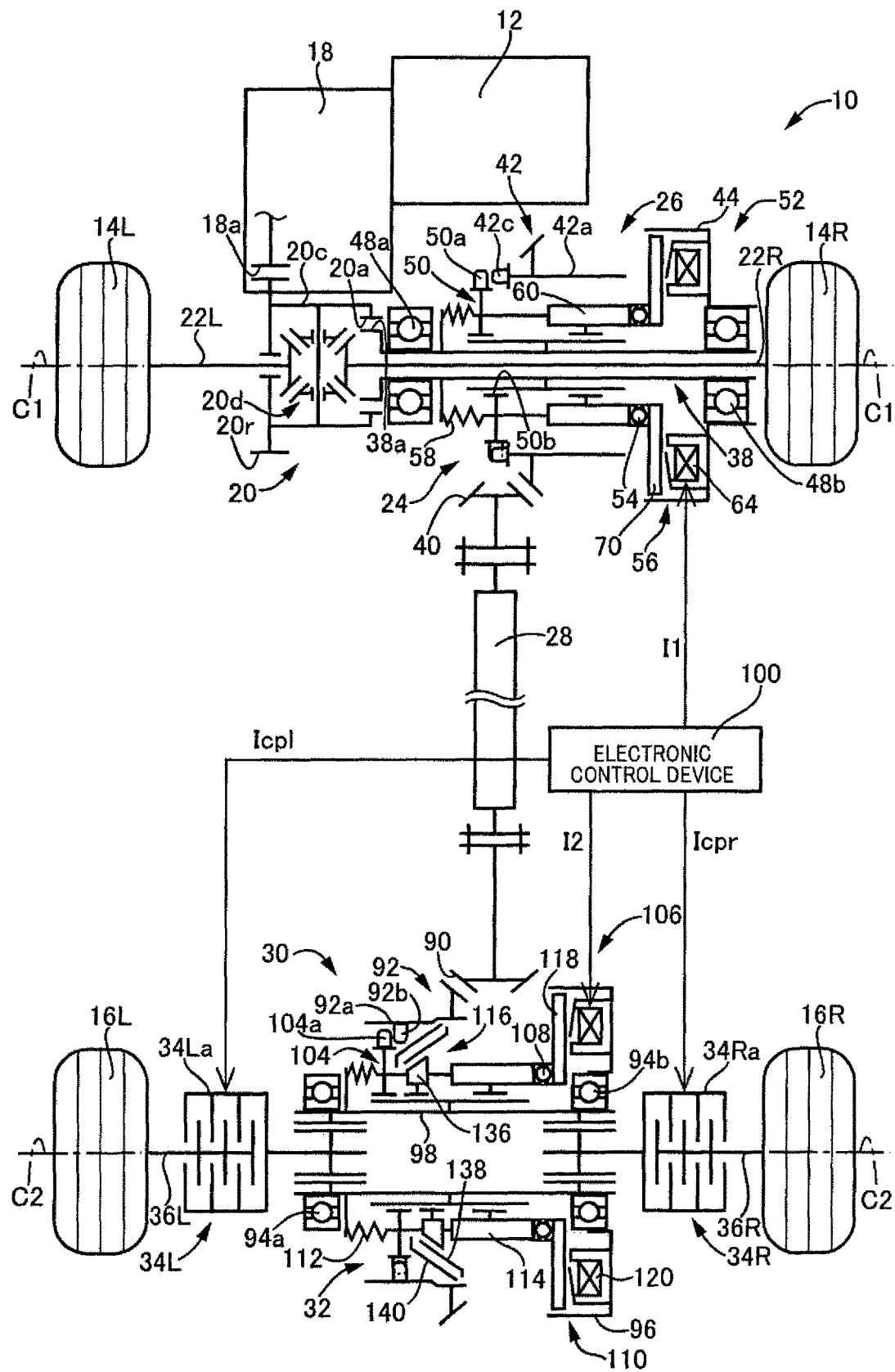
FIG. 1 is a schematic for schematically explaining a configuration of a four-wheel drive vehicle to which a first example of the present invention is preferably applied.

A second aspect of the present invention provides the four-wheel drive vehicle recited in the first aspect of the invention, wherein when both the first and second rotation speed differences are within the predetermined range, the control device selects the first rotation speed difference or the second rotation speed difference so that a smaller difference is selected out of a difference between a set rotation speed difference defined in advance and the first rotation speed difference and a difference between the set rotation speed difference and the second rotation speed difference, and couples the sub-drive wheel corresponding to the selected rotation speed difference, to the central axle by the control coupling. Therefore, the sub-drive wheel having the rotation speed difference relatively close to the set rotation speed difference can be coupled to the central axle by the control coupling, so that the dog clutch can smoothly be switched from the non-meshing state to the meshing state during turning running of the vehicle.

A third aspect of the present invention provides the four-wheel drive vehicle recited in the first aspect of the invention, wherein even if neither the first rotation speed difference nor the second rotation speed difference is within the predetermined range and it is determined that the dog clutch needs to be switched from the non-meshing state to the meshing state, the control device couples the sub-drive wheel corresponding to a larger value of the first rotation speed difference and the second rotation speed difference, to the central axle by the control coupling. Therefore, if the dog clutch needs to be switched from the non-meshing state to the meshing state, the dog clutch can be switched from the non-meshing state to the meshing state.

A fourth aspect of the present invention provides the four-wheel drive vehicle recited in any one of the first to third aspects of the invention, wherein (a) the dog clutch selectively disconnects or connects the power transmission path between the drive power source and the power transmitting member, wherein (b) the four-wheel drive vehicle comprises a first clutch selectively disconnecting or connecting the power transmission path in the power transmission path between the power transmitting member and the central axle, and wherein (c) when the sub-drive wheel is coupled to the central axle by the control coupling, the control device controls the dog clutch to connect the power transmission path between the drive power source and the power transmitting member and controls the first clutch to connect the power transmission path between the power transmitting member and the central axle. Therefore, even when a speed difference exists between wheels during running, the four-wheel drive vehicle can smoothly be switched from the two-wheel drive state to the four-wheel drive state.

A fifth aspect of the present invention provides the four-wheel drive vehicle recited in the fourth aspect of the invention, wherein (a) the first clutch includes a first synchronizing mechanism synchronizing a rotation speed of a first rotating member coupled to the power transmitting member in a power transmittable manner and a rotation speed of a second rotating member coupled to the central axle in a power transmittable manner, and wherein (b) when the sub-drive wheel is coupled to the central axle by the control coupling and the rotation speed of the first rotating member is synchronized with the rotation speed of the second rotating member by the first synchronizing mechanism, the control device switches the dog clutch from the non-meshing state to the meshing state. Therefore, even when a speed difference exists between wheels during running, the four-wheel drive vehicle can more smoothly be switched from the two-wheel drive state to the four-wheel drive state.

A sixth aspect of the present invention provides the four-wheel drive vehicle recited in any one of the first to third aspects of the invention, wherein (a) the dog clutch selectively disconnects or connects the power transmission path between the power transmitting member and the central axle, wherein (b) the four-wheel drive vehicle comprises a second clutch selectively disconnecting or connecting the power transmission path in the power transmission path between the drive power source and the power transmitting member, and wherein (c) when the sub-drive wheel is coupled to the central axle by the control coupling, the control device controls the dog clutch to connect the power transmission path between the power transmitting member and the central axle and controls the second clutch to connect the power transmission path between the drive power source and the power transmitting member. Therefore, even when a speed difference exists between wheels during running, the four-wheel drive vehicle can smoothly be switched from the two-wheel drive state to the four-wheel drive state.

A seventh aspect of the present invention provides the four-wheel drive vehicle recited in the sixth aspect of the invention, wherein (a) the second clutch includes a second synchronizing mechanism synchronizing a rotation speed of a third rotating member coupled to the drive power source in a power transmittable manner and a rotation speed of a fourth rotating member coupled to the power transmitting member in a power transmittable manner, and wherein (b) when the sub-drive wheel is coupled to the central axle by the control coupling and the rotation speed of the third rotating member is synchronized with the rotation speed of the fourth rotating member by the second synchronizing mechanism, the control device switches the dog clutch from the non-meshing state to the meshing state. Therefore, even when a speed difference exists between wheels during running, the four-wheel drive vehicle can more smoothly be switched from the two-wheel drive state to the four-wheel drive state.

An example of the present invention will now be described in detail with reference to the drawings. In the following example, the figures are simplified or deformed as needed and portions are not necessarily precisely drawn in terms of dimension ratio, shape, etc.

First Example

FIG. 1 is a schematic for schematically explaining a configuration of a four-wheel drive vehicle 10 to which the present invention is preferably applied. In FIG. 1, the four-wheel drive vehicle 10 uses an engine 12 as a drive power source and includes an FF-based four-wheel drive device including a first power transmission path transmitting a drive power of the engine 12 to a pair of left and right front wheels 14L, 14R corresponding to main drive wheels and a second power transmission path transmitting the drive power of the engine 12 to a pair of left and right rear wheels 16L, 16R corresponding to sub-drive wheels. In a two-wheel drive state of the four-wheel drive vehicle 10, the drive power transmitted from the engine 12 via an automatic transmission 18 is transmitted through a front-wheel drive power distributing unit 20 and a pair of left and right front wheel axles 22L, 22R to the pair of left and right front wheels 14L, 14R. In this two-wheel drive state, at least a first dog clutch (dog clutch) 24 is released, and the drive power from the engine 12 is not transmitted to a transfer 26, a propeller shaft (power transmitting member) 28, a rear-wheel drive power distributing unit 30, and the rear wheels 16L, 16R. However, in a four-wheel drive state of the four-wheel drive vehicle 10, the first dog clutch 24 and a second dog clutch (first clutch) 32 are both engaged in addition to the two-wheel drive state, and a left control coupling (control coupling) 34L controls a transmission torque to a left rear wheel axle 36L and the rear wheel 16L, while a right control coupling (control coupling) 34R controls a transmission torque to a right rear wheel axle 36R and the rear wheel 16R. Although not shown in FIG. 1, a clutch or a torque converter serving as a fluid transmission device is disposed between the engine 12 and the automatic transmission 18.

As shown in FIG. 1, the front-wheel drive power distributing unit 20 made up of a differential gear device includes a ring gear 20r disposed rotatably around a first rotation axis C1 and meshed with an output gear 18a of the automatic transmission 18, a differential casing 20c fixed to the ring gear 20r, and a differential gear mechanism 20d housed in the differential casing 20c. When the drive power from the engine 12 is transmitted to the ring gear 20r, the front-wheel drive power distributing unit 20 configured as described above transmits the drive power to the front wheels 14L, 14R while allowing a differential rotation of the left and right front wheel axles 22L, 22R. The differential casing 20c is provided with inner circumferential meshing teeth 20a fitted to first outer circumferential spline teeth 38a formed at an axial end portion of an input shaft 38 disposed on the transfer 26. As a result, a portion of the drive power transmitted from the engine 12 via the differential casing 20c to the left and right front wheels 14L and 14R is input via the input shaft 38 to the transfer 26.

Figure 2:
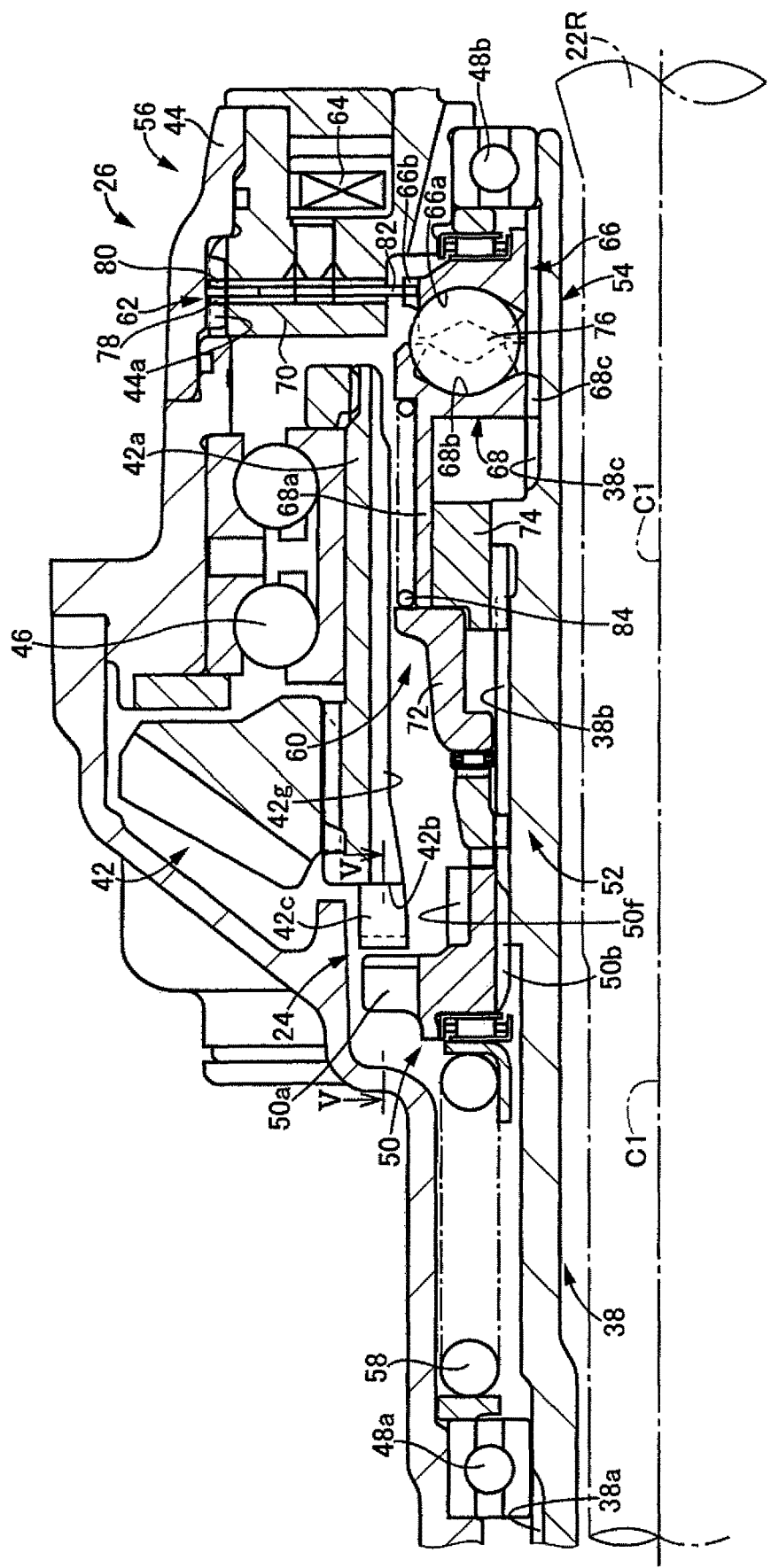
FIG. 2 is a cross-sectional view for explaining a configuration of a transfer disposed in the four-wheel drive vehicle of FIG. 1.

As shown in FIGS. 1 and 2, the transfer 26 includes the cylindrical input shaft 38, a cylindrical first ring gear 42 meshed with a driven pinion 40 (see FIG. 1) coupled to an end portion of the propeller shaft 28 facing on a side close to the front wheels 14L, 14R, and the first dog clutch 24 selectively disconnecting or connecting between the input shaft 38 coupled to the engine 12 in a power transmittable manner and the first ring gear 42 coupled to the propeller shaft 28 in a power transmittable manner in a power transmission path from the engine 12 to the propeller shaft 28. In the transfer 26, when the first dog clutch 24 is engaged so that the power transmission path is connected between the input shaft 38 and the first ring gear 42, a portion of the drive power transmitted from the engine 12 to the pair of the left and right front wheels 14L, 14R is output via the propeller shaft 28 to the pair of the left and right rear wheels 16L, 16R.

As shown in FIG. 2, the cylindrical first ring gear 42 is a bevel gear having helical teeth or a hypoid gear formed thereon, for example, and is provided with a shaft portion 42a projected in a substantially cylindrical shape from an inner circumferential portion of the first ring gear 42 toward the front wheel 14R. The cylindrical first ring gear 42 has the shaft portion 42a supported by a first unit casing 44 via a bearing 46 disposed in the first unit casing 44 and is thereby supported rotatably around the first rotation axis C1 in a cantilevered manner.

As shown in FIG. 2, the cylindrical input shaft 38 penetrates the inside of the cylindrical first ring gear 42 such that a portion of the input shaft 38 is disposed inside the first ring gear 42. The cylindrical input shaft 38 has both end portions supported by the first unit casing 44 via a pair of bearings 48a, 48b disposed in the first unit casing 44, so that the input shaft 38 is supported rotatably around the first rotation axis C1, i.e., the input shaft 38 is supported rotatably concentrically with the first ring gear 42. The cylindrical input shaft 38 is provided with first outer circumferential spline teeth 38a formed on an outer circumferential surface of an end portion of the input shaft 38 on the front wheel 14L side, a second outer circumferential spline teeth 38b formed on an outer circumferential surface of a central portion of the input shaft 38, and third outer circumferential spline teeth 38c formed on an outer circumferential surface of an end portion of the input shaft 38 on the front wheel 14R side.

As shown in FIG. 2, the first dog clutch 24 includes a plurality of first meshing teeth (sub-drive-wheel-side meshing teeth) 42c formed on a side surface 42b on the front wheel 14L side of the shaft portion 42a of the first ring gear 42, a cylindrical first movable sleeve 50 provided with a plurality of first meshing teeth (drive-power-source-side meshing teeth) 50a that can mesh with the first meshing teeth 42c when the first movable sleeve 50 moves in a direction of the first rotation axis C1, and a first movement mechanism 52 moving the first movable sleeve 50 in the first rotation axis C1 direction to move the first movable sleeve 50 between a first meshing position and a first non-meshing position. The first meshing position is a position to which the first movable sleeve 50 is moved in the first rotation axis C1 direction so that the first meshing teeth 50a of the first movable sleeve 50 are meshed with the first meshing teeth 42c of the first ring gear 42 and, when the first movable sleeve 50 is at the first meshing position, the first ring gear 42 and the input shaft 38 cannot relatively rotate, while the first dog clutch 24 is engaged. The first non-meshing position is a position to which the first movable sleeve 50 is moved in the first rotation axis C1 direction so that the first meshing teeth 50a of the first movable sleeve 50 are not meshed with the first meshing teeth 42c of the first ring gear 42 and, when the first movable sleeve 50 is at the first non-meshing position, the first ring gear 42 and the input shaft 38 can relatively rotate, while the first dog clutch 24 is released. The first movable sleeve 50 is provided with inner circumferential meshing teeth 50b meshed with the second outer circumferential spline teeth 38b formed on the input shaft 38 such that the first movable sleeve 50 is relatively non-rotatable around the first rotation axis C1 with respect to the input shaft 38 and movable in the first rotation axis C1 direction with respect to the input shaft 38.

As shown in FIG. 2, the first movement mechanism 52 includes a first ball cam 54, a first actuator 56, a first spring 58, and a first ratchet mechanism 60. The first actuator 56 includes a first auxiliary clutch 62 and a first electromagnetic coil 64 causing the first auxiliary clutch 62 to generate a rotation braking torque, and the first actuator 56 is integrally fixed to the first unit casing 44. The first ball cam 54 is a device converting a rotation force of the input shaft 38 into a thrust force of the input shaft 38 in the first rotation axis C1 direction when the rotation braking torque is generated by the first actuator 56 via the first auxiliary clutch 62 in an annular second cam member 66 described later. The first ratchet mechanism 60 retains the movement position of the first movable sleeve 50 moved in the first rotation axis C1 direction by the thrust force converted by the first ball cam 54. The first spring 58 is interposed between the bearing 48a and the first movable sleeve 50, and the first spring 58 constantly urges the first movable sleeve 50 from the first non-meshing position toward the first meshing position, i.e., constantly urges the first movable sleeve 50 toward the front wheel 14R in the first rotation axis C1 direction. Therefore, when the rotation braking torque is applied to the second cam member 66 by the first electromagnetic coil 64 and the first auxiliary clutch 62 in the first actuator 56 in the first movement mechanism 52, a thrust force is generated in a first cam member 68 described later of the first ball cam 54 in the first rotation axis C1 direction, and the first movable sleeve 50 is moved by the first cam member 68 via the first ratchet mechanism 60 in the first rotation axis C1 direction against an urging force of the first spring 58.

As shown in FIG. 2, the first ratchet mechanism 60 includes an annular first piston 68a reciprocated in the first rotation axis C1 direction with a predetermined stroke by the first ball cam 54 due to the first electromagnetic coil 64 of the first actuator 56 attracting a disk-shaped movable piece 70 and not attracting the movable piece 70, an annular second piston 72 disposed relatively rotatably with respect to the input shaft 38 and moved in the first rotation axis C1 direction against the urging force of the first spring 58 by the first piston 68a moving in the first rotation axis C1 direction, and an annular holder 74 having latching teeth 74a (see FIGS. 3A to 3E), disposed relatively non-rotatably with respect to the input shaft 38 and immovably in the first rotation axis C1 direction with respect to the input shaft 38, and latching with the latching teeth 74a the second piston 72 moved by the first piston 68a. In the first ratchet mechanism 60, the first piston 68a is reciprocated in the first rotation axis C1 direction, so that the first movable sleeve 50 is moved by the second piston 72 to the first non-meshing position against the urging force of the first spring 58, and the second piston 72 is latched by the latching teeth 74a of the holder 74. When the first piston 68a is further reciprocated in the first rotation axis C1 direction, the second piston 72 is unlatched from the latching teeth 74a of the holder 74, and the first movable sleeve 50 is moved by the urging force of the first spring 58 to the first meshing position. As shown in FIG. 2, the first cam member 68 of the first ball cam 54 is integrally provided with the first piston 68a of the first ratchet mechanism 60, and the first ratchet mechanism 60 is disposed between the second cam member 66 of the first ball cam 54 and the first movable sleeve 50.

As shown in FIG. 2, the first ball cam 54 includes a pair of the first cam member 68 and the second cam member 66 which have annular shapes and are inserted between the second piston 72 of the first ratchet mechanism 60 and the bearing 48b such that the first cam member 68 and the second piston 72 overlap in the first rotation axis C1 direction, and a plurality of spherical rolling elements 76 sandwiched between a cam surface 68b formed on the first cam member 68 and a cam surface 66a formed on the second cam member 66, and when the first cam member 68 and the second cam member 66 are relatively rotated in the first ball cam 54, the first cam member 68 and the second cam member 66 are separated in the first rotation axis C1 direction. The paired cam surfaces 68b, 66a formed on the first cam member 68 and the second cam member 66 are groove-shaped surfaces formed at multiple circumferential positions (e.g., three positions) on the first cam member 68 and the second cam member 66 and facing each other with a depth in the first rotation axis C1 direction changing in a circumferential direction. Therefore, when the first cam member 68, i.e., the first piston 68a, is reciprocated once in the first rotation axis C1 direction toward the front wheels 14L and 14R by the first ball cam 54, the first movable sleeve 50 is moved via the first ratchet mechanism 60 to the first non-meshing position against the urging force of the first spring 58, as indicated by the transfer 26 on the upper side relative to the first rotation axis C1 shown in FIG. 2, i.e., on the engine 12 side. The meshing between the first meshing teeth 50a of the first movable sleeve 50 and the first meshing teeth 42c of the first ring gear 42 is then released, and the first dog clutch 24 is released. When the first piston 68a is reciprocated twice by the first ball cam 54, i.e., when the first piston 68a is further reciprocated once while the first movable sleeve 50 is positioned at the first non-meshing position, the second piston 70 is unlatched from the latching teeth 74a of the holder 74 and the first movable sleeve 50 is moved to the first meshing position by the urging force of the first spring 58 although not shown. The first meshing teeth 50a of the first movable sleeve 50 and the first meshing teeth 42c of the first ring gear 42 are then meshed with each other, and the first dog clutch 24 is engaged.

Between the first electromagnetic coil 64 and the movable piece 70, as shown in FIG. 2, the first actuator 56 includes the first auxiliary clutch 62 having a pair of disk-shaped first friction plates 78, 80 and a disk-shaped second friction plate 82. The pair of first friction plates 78, 80 are disposed between the first electromagnetic coil 64 and the movable piece 70 and engaged with inner circumferential spline teeth 44a formed on the first unit casing 44 non-rotatably around the first rotation axis C1 with respect to the first unit casing 44 and movably in the first rotation axis C1 direction with respect to the first unit casing 44. The second friction plate 82 is disposed between the paired first friction plates 78, 80 and engaged with outer circumferential spline teeth 66b formed on the second cam member 66 non-rotatably around the first rotation axis C1 with respect to the second cam member 66 and movably in the first rotation axis C1 direction with respect to the second cam member 66. The concave groove-shaped cam surfaces 68b, 66a formed at multiple circumferential positions between the annular first cam member 68 and the annular second cam member 66 are inclined such that a distance between the cam surfaces 68b, 66a in the first rotation axis C1 direction becomes shorter as the cam surfaces 68b, 66a extend in the circumferential direction. An inner circumferential surface of the first cam member 68 is provided with inner circumferential meshing teeth 68c meshed with the third outer circumferential spline teeth 38c formed on the input shaft 38 relatively non-rotatably with respect to the input shaft 38 and movably in the first rotation axis C1 direction with respect to the input shaft 38.

In the first electromagnetic coil 64 and the first auxiliary clutch 62 serving as the first actuator 56 and the first ball cam 54 configured as described above, for example, when a first drive current I1 (A) is supplied to the first electromagnetic coil 64 from an electronic control device (control device) 100 (see FIG. 1) described later and the movable piece 70 is attracted by the first electromagnetic coil 64 while the input shaft 38 is rotating during vehicle running, the first friction plates 78, 80 and the second friction plate 82 of the first auxiliary clutch 62 are clamped due to the movable piece 70 between the movable piece 70 and the first electromagnetic coil 64, so that a rotation braking torque is transmitted to the second friction plate 82. In other words, when the movable piece 70 is attracted by the first electromagnetic coil 64, the rotation braking torque is transmitted to the second cam member 66 via the second friction plate 82 of the first auxiliary clutch 62. Therefore, the first cam member 68 and the second cam member 66 are relatively rotated by the rotation braking torque, and the first piston 68a formed integrally with the first cam member 68 moves toward the front wheel 14L against the urging force of the first spring 58 in the first rotation axis C1 direction with respect to the second cam member 66 via the spherical rolling element 76, so that the rotation force of the input shaft 38 is converted into a thrust force in the first rotation axis C1 direction. When the first drive current I1 (A) is not supplied from the electronic control device 100 to the first electromagnetic coil 64 and the movable piece 70 is not attracted to the first electromagnetic coil 64, the rotation braking torque is not transmitted to the second cam member 66, and therefore, the second cam member 66 is rotated together with the first cam member 68 via the spherical rolling element 76 so that the second cam member 66 and the first cam member 68 integrally rotate. As a result, the thrust force is not generated in the first ball cam 54, so that the first piston 68a is moved toward the front wheel 14R by the urging force of the first spring 58.

FIGS. 3A to 3E are schematic views for explaining an operating principle of the first ratchet mechanism 60 and shows a state in which the annular first piston 68a, the annular second piston 72, and the annular holder 74 are each developed. As described above, the first ratchet mechanism 60 includes the annular first piston 68a, the annular second piston 72, and the annular holder 74 and functions as a latching mechanism latching the second piston 72. The annular second piston 72 is provided with a projection 72a projected toward the holder 74. The annular holder 74 has the latching teeth 74a periodically formed into a saw tooth shape and arranged in the circumferential direction for latching the projection 72a of the second piston 72, and the holder 74 is disposed at a fixed position on the input shaft 38. The annular first piston 68a has receiving teeth 68d periodically formed in the circumferential direction into the saw tooth shape similar to the latching teeth 74a of the holder 74 but arranged to be shifted by a half phase in the circumferential direction to receive the projection 72a of the second piston 72. The annular first piston 68a is engaged with the holder 74 relatively non-rotatably with respect to the holder 74 and movably in the first rotation axis C1 direction with respect to the holder 74 and moves the second piston 72 by one stroke of the first ball cam 54 against the urging force of the first spring 58. Slopes at tips of the receiving teeth 68d of the first piston 68a and slopes at tips of the latching teeth 74a of the holder 74 are respectively provided with stoppers 68e, 74b stopping a slip of the projection 72a of the second piston 72.

Figure 3A:
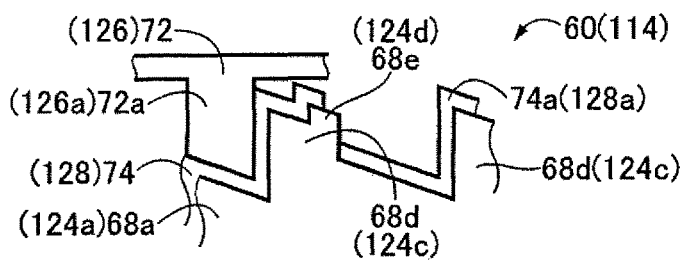
FIGS. 3A to 3E are views for explaining a first ratchet mechanism disposed in the transfer shown in FIG. 2 and for explaining a second ratchet mechanism disposed on a rear-wheel drive power distributing unit shown in FIG. 4.
Figure 3B:
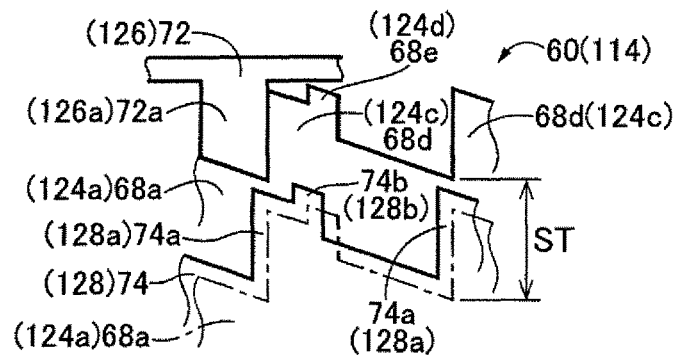
Figure 3C:
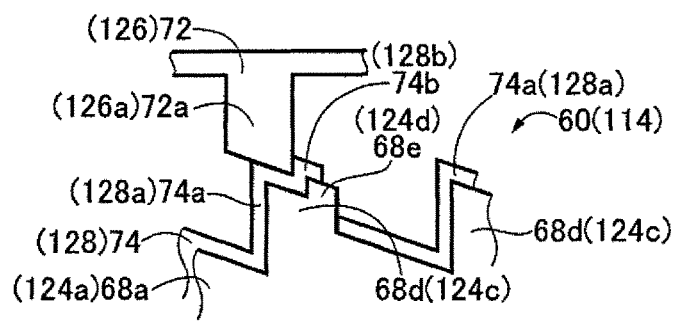
Figure 3D:
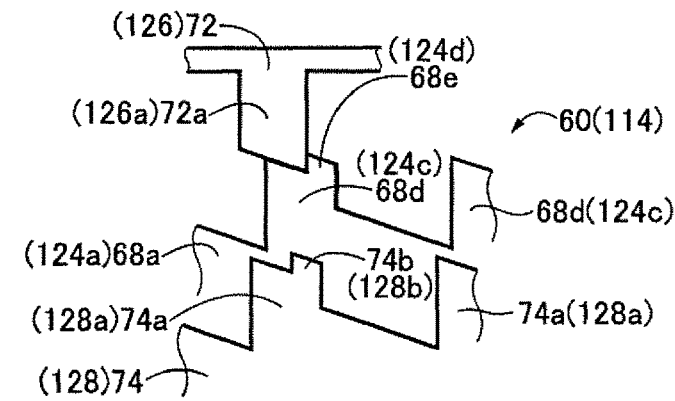
Figure 3E:
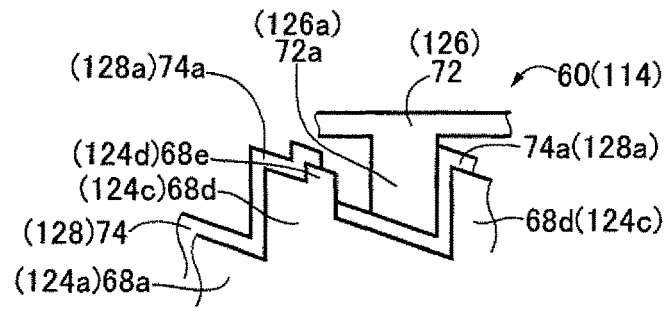

In FIGS. 3A and 3E, the first movable sleeve 50 is located at the first meshing position. As shown in of FIGS. 3A and 3E, while the projection 72a projected from the second piston 72 is positioned at the position of latching on the latching teeth 74a of the holder 74, the first piston 68a is positioned at a base position thereof. In a state shown in FIG. 3B, due to the activation of the first actuator 56 and the first ball cam 54, the first piston 68a is moved by a movement stroke ST from the base position against the urging force of the first spring 58. In this process, the second piston 72 is moved by the first piston 68a and separated from the holder 74, and the second piston 72 slips down the slope of the first piston 68a. A dashed-dotted line shown in FIG. 3B indicates an original position (the base position) of the first piston 68a of FIG. 3A for explaining the movement stroke ST. In a state shown in FIG. 3C, due to the deactivation of the first actuator 56 and the first ball cam 54, the first piston 68a is returned by the movement stroke ST in accordance with the urging forces of the first spring 58 and a third spring 84 and is positioned at the base position. In this process, the second piston 72 is latched on the latching teeth 74a of the holder 74 and retained at a position in which the first movable sleeve 50 locates at the first non-meshing position. The third spring 84 is disposed between a portion of the first cam member 68 excluding the first piston 68a and the second piston 72 in the first rotation axis C1 direction as shown in FIG. 2, and the urging force of the third spring 84 is smaller than the urging force of the first spring 58. In a state shown in FIG. 3D, due to the activation of the first actuator 56 and the first ball cam 54, the first piston 68a is moved again by the movement stroke ST from the base position against the urging force of the first spring 58. In this process, the second piston 72 is further moved toward the first spring 58. Subsequently, as shown in FIG. 3E, when the first piston 68a is returned by the movement stroke ST in accordance with the urging forces of the first spring 58 and the third spring 84 and is positioned at the base position due to the deactivation of the first actuator 56 and the first ball cam 54, the second piston 72 is located at a position in which the first movable sleeve 50 located at the first meshing position, and the first meshing teeth 42c of the first ring gear 42 are meshed with the first meshing teeth 50a of the first movable sleeve 50.

As a result, in the first ratchet mechanism 60, the second piston 72 is moved in the circumferential direction through the reciprocation of the first piston 68a according to the first ball cam 54 to move the first movable sleeve 50 toward the first non-meshing position and the first meshing position. When the second piston 72 is reciprocated once, the first movable sleeve 50 is positioned at the first non-meshing position. When the second piston 72 is reciprocated twice, i.e., when the second piston 72 is further reciprocated once while the first movable sleeve 50 is located at the first non-meshing position, the second piston 72 is unlatched from the latching teeth 74a of the holder 74 so that the first movable sleeve 50 is positioned at the first meshing position by the urging force of the first spring 58.

Figure 4:
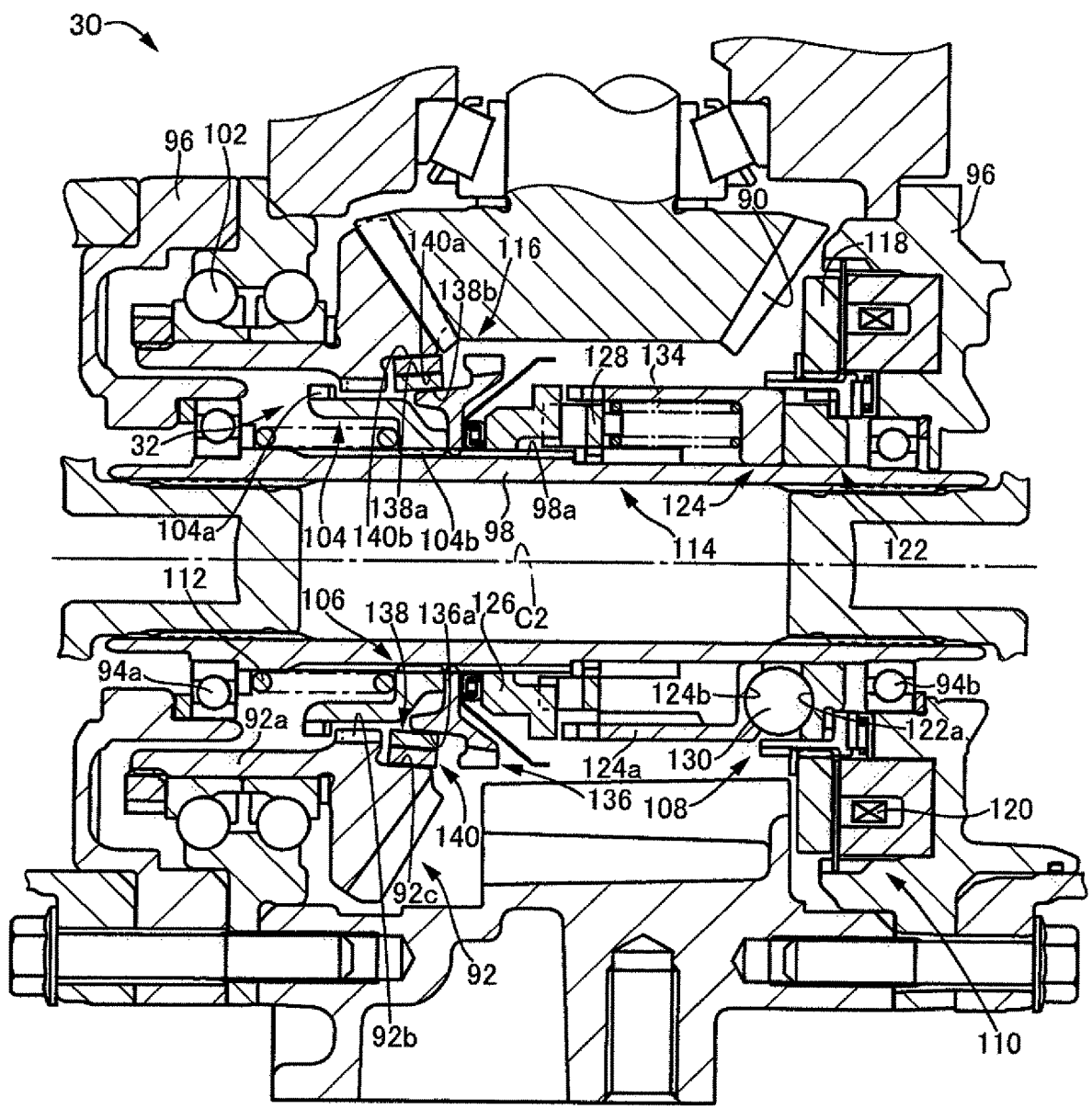
FIG. 4 is a cross-sectional view for explaining a configuration of a portion of the rear-wheel drive power distributing unit disposed in the four-wheel drive vehicle of FIG. 1.

As shown in FIGS. 1 and 4, the rear-wheel drive power distributing unit 30 includes, in a power transmission path from the propeller shaft 28 to the left and right rear wheels 16L, 16R: a second ring gear (first rotating member) 92 meshed with a drive pinion 90 integrally disposed at an end portion of the propeller shaft 28 facing toward the rear wheels 16L, 16R; a cylindrical central axle 98 supported rotatably around a second rotation axis C2 via bearings 94a, 94b by a second unit casing 96 of the rear-wheel drive power distributing unit 30; the left control coupling 34L (see FIG. 1) controlling a transmission torque transmitted from the central axle 98 to the rear wheel axle 36L; the right control coupling 34R (see FIG. 1) controlling a transmission torque transmitted from the central axle 98 to the rear wheel axle 36R; and the second dog clutch 32 disconnecting or connecting a power transmission path between the second ring gear 92 and the central axle 98. For example, when a left coupling drive current Icpl (A) is supplied from the electronic control device 100 to an electromagnetic coil not shown, the left control coupling 34L transmits the transmission torque corresponding to the left coupling drive current (torque command value) Icpl (A), and when the left coupling drive current Icpl (A) is supplied from the electronic control device 100 to the electromagnetic coil, the left control coupling 34L couples the rear wheel 16L to the central axle 98 in a power transmittable manner. Similarly, when a right coupling drive current Icpr (A) is supplied from the electronic control device 100 to an electromagnetic coil not shown, the right control coupling 34R transmits the transmission torque corresponding to the right coupling drive current (torque command value) Icpr (A), and when the right coupling drive current Icpr (A) is supplied from the electronic control device 100 to the electromagnetic coil, the right control coupling 34R couples the rear wheel 16R to the central axle 98 in a power transmittable manner. The right control coupling 34R is coupled to the rear wheel 16R via the rear wheel axle 36R, and the left control coupling 34L is coupled to the rear wheel 16L via the rear wheel axle 36L. The central axle 98 is disposed between the right control coupling 34R and the left control coupling 34L, i.e., between the rear wheel 16R and the rear wheel 16L, and the central axle 98 is coupled to a coupling cover 34Ra (see FIG. 1) disposed on the right control coupling 34R and a coupling cover 34La (see FIG. 1) disposed on the left control coupling 34L.

As shown in FIG. 4, the cylindrical second ring gear 92 is a bevel gear having helical teeth or a hypoid gear formed thereon, for example, and is provided with a shaft portion 92a projected in a substantially cylindrical shape from an inner circumferential portion of the second ring gear 92 toward the rear wheel 16L. The cylindrical second ring gear 92 has the shaft portion 92a supported by the second unit casing 96 via a bearing 102 disposed in the second unit casing 96 and is thereby supported rotatably around the second rotation axis C2 in a cantilevered manner.

As shown in FIG. 4, the cylindrical central axle 98 penetrates the inside of the cylindrical second ring gear 92 such that a portion of the central axle 98 is disposed inside the second ring gear 92. The cylindrical central axle 98 has both end portions supported by a pair of the bearings 94a, 94b disposed in the second unit casing 96, so that the central axle 98 is supported rotatably around the second rotation axis C2, i.e., rotatably concentrically with the second ring gear 92.

As shown in FIG. 4, the second dog clutch 32 includes second meshing teeth 92b formed on an inner circumferential surface of the second ring gear 92, a cylindrical second movable sleeve (second rotating member) 104 provided with second meshing teeth 104a that can mesh with the second meshing teeth 92b, and a second movement mechanism 106 moving the second movable sleeve 104 in a second rotation axis C2 direction to move the second movable sleeve 104 between a second meshing position and a second non-meshing position. The second meshing position is a position to which the second movable sleeve 104 is moved in the second rotation axis C2 direction so that the second meshing teeth 104a of the second movable sleeve 104 are meshed with the second meshing teeth 92b of the second ring gear 92 and, when the second movable sleeve 104 is at the second meshing position, the second ring gear 92 and the central axle 98 cannot relatively rotate, while the second dog clutch 32 is engaged. The second non-meshing position is a position to which the second movable sleeve 104 is moved in the second rotation axis C2 direction so that the second meshing teeth 104a of the second movable sleeve 104 are not meshed with the second meshing teeth 92b of the second ring gear 92 and, when the second movable sleeve 104 is at the second non-meshing position, the second ring gear 92 and the central axle 98 can relatively rotate, while the second dog clutch 32 is released. The second movable sleeve 104 is provided with inner circumferential meshing teeth 104b meshed with outer circumferential spline teeth 98a formed on the central axle 98 such that the second movable sleeve 104 is relatively non-rotatable around the second rotation axis C2 with respect to the central axle 98 and movable in the second rotation axis C2 direction with respect to the central axle 98. In the two-wheel drive state in which the first dog clutch 24 is released, as shown in FIG. 1, when the second movable sleeve 104 is moved by the second movement mechanism 106 to the second non-meshing position so that the second dog clutch 32 is released between the propeller shaft 28 and the rear wheels 16L, 16R, i.e., between the second ring gear 92 and the central axle 98, the propeller shaft 28 is disconnected from the engine 12 and the pair of the left and right rear wheels 16L, 16R to reduce a running resistance of the vehicle 10 due to a rotation resistance of the propeller shaft 28 etc. Therefore, the four-wheel drive vehicle 10 of this example is a four-wheel drive vehicle with a disconnect function of disconnecting from the engine 12 and the pair of the left and right rear wheels 16L, 16R in the two-wheel drive state, while the propeller shaft 28 is used to transmit the drive power to the pair of left and right rear wheels 16L, 16R in the four-wheel drive state.

As shown in FIG. 4, the second movement mechanism 106 includes a second ball cam 108, a second actuator 110, a second spring 112, a second ratchet mechanism 114, and a synchronizing mechanism (first synchronizing mechanism) 116. The second actuator 110 includes a movable piece 118 and a second electromagnetic coil 120 attracting the movable piece 118, and in the second actuator 110, the movable piece 118 is attracted by the second electromagnetic coil 120 that is a non-rotating member, so that a rotation braking torque is generated in a second cam member 122 described later of the second ball cam 108. The second ball cam 108 is a device converting a rotation force of the central axle 98 into a thrust force of the central axle 98 in the second rotation axis C2 direction when the rotation braking torque is generated by the second actuator 110 in the second cam member 122. The second ratchet mechanism 114 retains the movement position of the second movable sleeve 104 moved in the second rotation axis C2 direction by the thrust force converted by the second ball cam 108. The second spring 112 is interposed between the bearing 94a and the second movable sleeve 104, and the second spring 112 constantly urges the second movable sleeve 104 from the second non-meshing position toward the second meshing position, i.e., constantly urges the second movable sleeve 104 toward the rear wheel 16R in the second rotation axis C2 direction. Therefore, when the rotation braking torque is applied to the second cam member 122 by the second actuator 110 in the second movement mechanism 106, a thrust force is generated in a first cam member 124 described later of the second ball cam 108 in the second rotation axis C2 direction, and the second movable sleeve 104 is moved by the first cam member 124 via the second ratchet mechanism 114 in the second rotation axis C2 direction against an urging force of the second spring 112.

As shown in FIG. 4, the second ratchet mechanism 114 includes an annular first piston 124a reciprocated in the second rotation axis C2 direction with a predetermined stroke by the second ball cam 108 due to the second electromagnetic coil 120 of the second actuator 110 attracting the disk-shaped movable piece 118 and not attracting the movable piece 118, an annular second piston 126 disposed relatively rotatably with respect to the central axle 98 and moved in the second rotation axis C2 direction against the urging force of the second spring 112 by the first piston 124*a* moving in the second rotation axis C2 direction, and an annular holder 128 having latching teeth 128*a* (see FIGS. 3A to 3E), disposed relatively non-rotatably with respect to the central axle 98 and immovably in the second rotation axis C2 direction with respect to the central axle 98, and latching with the latching teeth 128*a* the second piston 126 moved by the first piston 124*a*. In the second ratchet mechanism 114, the first piston 124*a* is reciprocated in the second rotation axis C2 direction, so that the second movable sleeve 104 is moved by the second piston 126 to the second non-meshing position against the urging force of the second spring 112, and the second piston 126 is latched by the latching teeth 128*a* of the holder 128. When the first piston 124*a* is further reciprocated in the second rotation axis C2 direction, the second piston 126 is unlatched from the latching teeth 128*a* of the holder 128, and the second movable sleeve 104 is moved by the urging force of the second spring 112 to the second meshing position. As shown in FIG. 4, the first cam member 124 of the second ball cam 108 is integrally provided with the first piston 124*a* of the second ratchet mechanism 114, and the second ratchet mechanism 114 is disposed between the second cam member 122 of the second ball cam 108 and the second movable sleeve 104.

As shown in FIG. 4, the second ball cam 108 includes a pair of the first cam member 124 and the second cam member 122 which have annular shapes and are inserted between the second piston 126 of the second ratchet mechanism 114 and the bearing 94*b* such that the first cam member 124 and the second piston 126 overlap in the second rotation axis C2 direction, and a plurality of spherical rolling elements 130 sandwiched between a cam surface 124*b* formed on the first cam member 124 and a cam surface 122*a* formed on the second cam member 122, and when the first cam member 124 and the second cam member 122 are relatively rotated in the second ball cam 108, the first cam member 124 and the second cam member 122 are separated in the second rotation axis C2 direction. The paired cam surfaces 124*b*, 122*a* formed on the first cam member 124 and the second cam member 122 are groove-shaped surfaces formed at multiple circumferential positions (e.g., three positions) on the first cam member 124 and the second cam member 122 and facing each other with a depth in the second rotation axis C2 direction changing in a circumferential direction. Therefore, when the first cam member 124, i.e., the first piston 124*a*, is reciprocated once in the second rotation axis C2 direction toward the rear wheels 16L and 16R by the second ball cam 108, the second movable sleeve 104 is moved via the second ratchet mechanism 114 to the second non-meshing position against the urging force of the second spring 112, as indicated by the rear-wheel drive power distributing unit 30 on the upper side relative to the second rotation axis C2 shown in FIG. 4, i.e., on the propeller shaft 28 side. The meshing between the second meshing teeth 104*a* of the second movable sleeve 104 and the second meshing teeth 92*b* of the second ring gear 92 is then released, and the second dog clutch 32 is released. When the first piston 124*a* is reciprocated twice by the second ball cam 108, i.e., when the first piston 124*a* is further reciprocated once while the second movable sleeve 104 is positioned at the second non-meshing position, the second piston 126 is unlatched from the latching teeth 128*a* of the holder 128 and the second movable sleeve 104 is moved to the second meshing position by the urging force of the second spring 112 although not shown. The second meshing teeth 104*a* of the second movable sleeve 104 and the second meshing teeth 92*b* of the second ring gear 92 are then meshed with each other, and the second dog clutch 32 is engaged. Although not shown, an inner circumferential surface of the first cam member 124 is provided with inner circumferential meshing teeth meshed with outer circumferential spline teeth (not shown) formed on the central axle 98 relatively non-rotatably with respect to the central axle 98 and movably in the second rotation axis C2 direction with respect to the central axle 98.

In the second ball cam 108 and the second actuator 110 configured as described above, for example, when a second drive current I2 (A) is supplied to the second electromagnetic coil 120 from the electronic control device 100 and the movable piece 118 is attracted by the second electromagnetic coil 120 that is a non-rotating member while the central axle 98 is rotating during vehicle running, a rotation braking torque is transmitted via the movable piece 118 to the second cam member 122. Therefore, the first cam member 124 and the second cam member 122 are relatively rotated by the rotation braking torque, and the first piston 124*a* formed integrally with the first cam member 124 moves toward the rear wheel 16L against the urging force of the second spring 112 in the second rotation axis C2 direction with respect to the second cam member 122 via the spherical rolling element 130, so that the rotation force of the central axle 98 is converted into a thrust force in the second rotation axis C2 direction. When the second drive current I2 (A) is not supplied from the electronic control device 100 to the second electromagnetic coil 120 and the movable piece 118 is not attracted to the second electromagnetic coil 120, the rotation braking torque is not transmitted to the second cam member 122, and therefore, the second cam member 122 is rotated together with the first cam member 124 via the spherical rolling element 130 so that the second cam member 122 and the first cam member 124 integrally rotate. As a result, the thrust force is not generated in the second ball cam 108, so that the first piston 124*a* is moved toward the rear wheel 16R by the urging force of the second spring 112.

FIGS. 3A to 3E are schematic views for explaining an operating principle of the second ratchet mechanism 114 and shows a state in which the annular first piston 124*a*, the annular second piston 126, and the annular holder 128 are each developed. As described above, the second ratchet mechanism 114 includes the annular first piston 124*a*, the annular second piston 126, and the annular holder 128 and functions as a latching mechanism latching the second piston 126. The annular second piston 126 is provided with a projection 126*a* projected toward the holder 128. The annular holder 128 has the latching teeth 128*a* periodically formed into a saw tooth shape and arranged in the circumferential direction for latching the projection 126*a* of the second piston 126, and the holder 128 is disposed at a fixed position on the central axle 98. The annular first piston 124*a* has receiving teeth 124*c* periodically formed in the circumferential direction into the saw tooth shape similar to the latching teeth 128*a* of the holder 128 but arranged to be shifted by a half phase in the circumferential direction to receive the projection 126*a* of the second piston 126. The annular first piston 124*a* is engaged with the holder 128 relatively non-rotatably with respect to the holder 128 and movably in the second rotation axis C2 direction with respect to the holder 128 and moves the second piston 126 by one stroke of the second ball cam 108 against the urging force of the second spring 112. Slopes at tips of the receiving teeth 124*c* of the first piston 124*a* and slopes at tips of the latching teeth 128*a* of the holder 128 are respectively provided with stoppers 124*d*, 128*b* stopping a slip of the projection 126*a* of the second piston 126.

In FIGS. 3A and 3E, the second movable sleeve 104 is located at the second meshing position. As shown in FIGS. 3A and E, while the projection 126a projected from the second piston 126 is positioned at the position of latching on the latching teeth 128a of the holder 128, the first piston 124a is positioned at a base position thereof. In a state shown in FIG. 3B, due to the activation of the second actuator 110 and the second ball cam 108, the first piston 124a is moved by a movement stroke ST from the base position against the urging force of the second spring 112. In this process, the second piston 126 is moved by the first piston 124a and separated from the holder 128, and the second piston 126 slips down the slope of the first piston 124a. A dashed-dotted line shown in FIG. 3B indicates an original position (the base position) of the first piston 124a of FIG. 3B for explaining the movement stroke ST. In a state shown in FIG. 3C, due to the deactivation of the second actuator 110 and the second ball cam 108, the first piston 124a is returned by the movement stroke ST in accordance with the urging forces of the second spring 112 and a fourth spring 134 and is positioned at the base position. In this process, the second piston 126 is latched on the latching teeth 128a of the holder 128 and retained at a position in which the second movable sleeve 104 locates at the second non-meshing position. The fourth spring 134 is disposed between a portion of the first cam member 124 excluding the first piston 124a and the holder 128 in the second rotation axis C2 direction as shown in FIG. 4, and the urging force of the fourth spring 134 is smaller than the urging force of the second spring 112. In a state shown in FIG. 3D, due to the activation of the second actuator 110 and the second ball cam 108, the first piston 124a is moved again by the movement stroke ST from the base position against the urging force of the second spring 112. In this process, the second piston 126 is further moved toward the second spring 112, and the second movable sleeve 104 is moved toward the bearing 94a beyond the second non-meshing position, so that rotation speed of the second ring gear 92 and rotation speed of the second movable sleeve 104, i.e., rotation speed of the central axle 98, are rotationally synchronized by the synchronizing mechanism 116. Subsequently, as shown in FIG. 3E, when the first piston 124a is returned by the movement stroke ST in accordance with the urging forces of the second spring 112 and the fourth spring 134 and is positioned at the base position due to the deactivation of the second actuator 110 and the second ball cam 108, the second piston 126 is located at a position in which the second movable sleeve 104 locates at the second meshing position, and the second meshing teeth 92b of the second ring gear 92 are meshed with the second meshing teeth 104a of the second movable sleeve 104.

As a result, in the second ratchet mechanism 114, the second piston 126 is moved in the circumferential direction through the reciprocation of the first piston 124a according to the second ball cam 108 to move the second movable sleeve 104 toward the second non-meshing position and the second meshing position. When the second piston 126 is reciprocated once, the second movable sleeve 104 is positioned at the second non-meshing position. When the second piston 126 is reciprocated twice, i.e., when the second piston 126 is further reciprocated once while the second movable sleeve 104 is located at the second non-meshing position, the second piston 126 is unlatched from the latching teeth 128a of the holder 128 so that the second movable sleeve 104 is positioned at the second meshing position by the urging force of the second spring 112.

As shown in FIG. 4, the synchronizing mechanism 116 includes an annular member 136 interposed between the second movable sleeve 104 and the second piston 126, and a pair of a first friction engagement members 138 and a second friction engagement members 140 disposed between the annular member 136 and the second ring gear 92. Each of the pairs of first friction engagement member 138 and second friction engagement member 140 has an annular shape and is disposed between a conical outer-circumferential friction surface 136a formed on the outer circumference of the annular member 136 and slightly inclined with respect to the second rotation axis C2 and a conical inner-circumferential friction surface 92c formed on the inner circumference of the end portion of the second ring gear 92 on the second piston 126 side and slightly inclined with respect to the second rotation axis C2. The annular member 136 is supported by the central axle 98 relatively non-rotatably with respect to the central axle 98 and movably in the second rotation axis C2 direction with respect to the central axle 98. Since a portion of the annular member 136 is sandwiched between the second movable sleeve 104 and the second piston 126 by the urging force of the second spring 112, the annular member 136 moves in the second rotation axis C2 direction in conjunction with the movement of the second movable sleeve 104 and the second piston 126 in the second rotation axis C2 direction. The first friction engagement member 138 is provided with a first conical outer-circumferential friction surface 138a slidably contacting with a second conical inner-circumferential friction surface 140a formed on an inner-circumferential surface of the second friction engagement member 140 and slightly inclined relative to the second rotation axis C2, and a first conical inner-circumferential friction surface 138b slidably contacting with the conical outer-circumferential friction surface 136a of the annular member 136. The second friction engagement member 140 is provided with the second conical inner-circumferential friction surface 140a described above and a second conical outer-circumferential friction surface 140b slidably contacting with the conical inner-circumferential friction surface 92c of the second ring gear 92.

Therefore, in a case where the second movable sleeve 104 is at the second non-meshing position and the second piston 126 is reciprocated once by the first cam member 124 of the second ball cam 108, when the first cam member 124 moves forward and the second movable sleeve 104 is moved beyond the second non-meshing position, the second conical outer-circumferential friction surface 140b of the second friction engagement member 140 abuts on the conical inner-circumferential friction surface 92c of the second ring gear 92 and the conical outer-circumferential friction surface 136a of the annular member 136 presses the conical inner-circumferential friction surface 92c of the second ring gear 92 via the first friction engagement member 138 and the second friction engagement member 140, so that a synchronizing operation is performed to synchronize the rotation speed of the central axle 98 having the annular member 136 relatively non-rotatable disposed thereon, i.e., the rotation speed of the second movable sleeve 104, and the rotation speed of the second ring gear 92. When the first cam member 124 moves backward, the second conical outer-circumferential friction surface 140b of the second friction engagement member 140 is separated from the conical inner-circumferential friction surface 92c of the second ring gear 92, so that the synchronizing operation is stopped.

Figure 5:
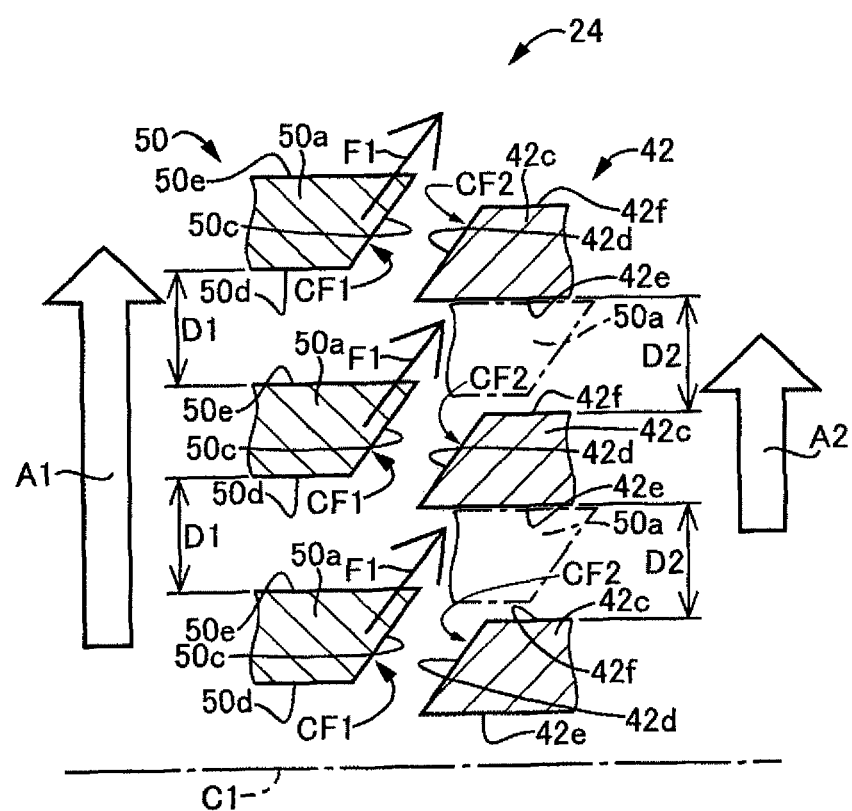
FIG. 5 is a cross-sectional view of the transfer taken along a line V-V of FIG. 2.

FIG. 5 is a diagram showing a state in which, in the case of switching from the two-wheel drive state with each of the first dog clutch 24 and the second dog clutch 32 released to the four-wheel drive state by engaging each of the first dog clutch 24 and the second dog clutch 32, the synchronizing mechanism 116 of the second dog clutch 32 is operated to substantially synchronize the rotation speed of the second movable sleeve 104 with the rotation speed of the second ring gear 92 so that the first meshing teeth 50a of the first movable sleeve 50 are meshed with the first meshing teeth 42c of the first ring gear 42. In FIG. 5, when the two-wheel drive state is switched to the four-wheel drive state, the central axle 98 is coupled to either one of the left and right rear wheels 16L, 16R by the corresponding control coupling 34L, 34R. FIG. 5 is a diagram showing a state of the four-wheel drive vehicle 10 during forward running. The first meshing teeth 50a of the first movable sleeve 50 are coupled to the engine 12 in a power transmittable manner, and the first meshing teeth 42c of the first ring gear 42 are coupled to the rear wheel 16L or 16R in a power transmittable manner, while the synchronizing mechanism 116 disposed on the second dog clutch 32 is operated, or the second dog clutch 32 is engaged, and the left control coupling 34L or the right control coupling 34R is engaged.

As shown in FIG. 5, the multiple first meshing teeth 50a formed on the first movable sleeve 50 are formed on an outer circumferential portion of the cylindrical first movable sleeve 50. The multiple first meshing teeth 50a are each formed in an elongated shape in the first rotation axis C1 direction and are formed in the circumferential direction of the cylindrical first movable sleeve 50 such that intervals D1 between the respective first meshing teeth 50a become constant. The intervals D1 are set such that the multiple first meshing teeth 50a can enter spaces between the multiple first meshing teeth 42c formed on the first ring gear 42.

As shown in FIG. 5, at the time of switching from the two-wheel drive state to the four-wheel drive state, rotation speed of the first meshing teeth 50a of the first movable sleeve 50 is greater than rotation speed of the first meshing teeth 42c of the first ring gear 42, and the first meshing teeth 50a of the first movable sleeve 50 and the first meshing teeth 42c of the first ring gear 42 rotate in directions of arrows A1, A2 around the first rotation axis C1, i.e., both rotate in the same direction. Therefore, when the first movable sleeve 50 is moved from the first non-meshing position to the first meshing position by the first movement mechanism 52, i.e., the first meshing teeth 50a of the first movable sleeve 50 are moved in a direction toward the first meshing teeth 42c of the first ring gear 42 by the first movement mechanism 52, the first meshing teeth 50a of the first movable sleeve 50 move relative to the first meshing teeth 42c of the first ring gear 42 in a direction of an arrow F1. In this example, the first ring gear 42, the second ring gear 92, etc. are designed such that, during straight running of the vehicle 10 while the propeller shaft 28 is rotating, the rotation speed of the first ring gear 42 is reduced by a predetermined value as compared to the rotation speed of the second ring gear 92, or specifically, a difference, i.e., a front-rear ring gear ratio difference G, is generated between a gear ratio between the driven pinion 40 disposed on the propeller shaft 28 and the first ring gear 42 and a gear ratio between the drive pinion 90 disposed on the propeller shaft 28 and the second ring gear 92. In other words, when the rotation speed of the first ring gear 42 becomes slower than the rotation speed of the second ring gear 92 while the propeller shaft 28 is rotating, the rotation speed of the first meshing teeth 50a of the first movable sleeve 50 easily becomes greater than the rotation speed of the first meshing teeth 42c of the first ring gear 42 at the time of switching from the two-wheel drive state to the four-wheel drive state.

As shown in FIG. 5, the multiple first meshing teeth 50a formed on the first movable sleeve 50 are each provided with a chamfered portion, i.e., a one-sided chamfer CF1, inclined in one direction over the entire face width of the first meshing teeth 50a, on end surfaces of the first meshing teeth 50a facing toward the first meshing teeth 42c and serving as abutting surfaces abutting on the first meshing teeth 42c. Since the first meshing teeth 50a of the first movable sleeve 50 are provided with the one-sided chamfers CF1, the end surfaces of the first meshing teeth 50a facing on a side of the first meshing teeth 42c and serving as the abutting surfaces abutting on the first meshing teeth 42c have a first inclined surface 50c formed to incline such that the length of the first meshing teeth 50a in the first rotation axis C1 direction increases with respect to the direction of the arrow A1 in which the first meshing teeth 50a rotate at the time of forward running of the four-wheel drive vehicle 10. The multiple first meshing teeth 50a each have parallel surfaces 50d, 50e formed substantially parallel to the first rotation axis C1 on both sides of the first meshing teeth 50a in the direction of the arrow A1.

As shown in FIG. 5, the multiple first meshing teeth 42c of the first ring gear 42 are formed on the side surface 42b of the cylindrical shaft portion 42a of the first ring gear 42. The multiple first meshing teeth 42c are each formed in an elongated shape in the first rotation axis C1 direction and are respectively formed in the circumferential direction of the shaft portion 42a of the first ring gear 42 such that intervals D2 between the first meshing teeth 42c become constant. The intervals D2 are set such that the multiple first meshing teeth 50a formed on the first movable sleeve 50 can enter spaces between the multiple first meshing teeth 42c.

As shown in FIG. 5, the multiple first meshing teeth 42c formed on the first ring gear 42 are each provided with a chamfered portion, i.e., a one-sided chamfer CF2, inclined in one direction over the entire face width of the first meshing teeth 42c, on end surfaces of the first meshing teeth 42c facing toward the first meshing teeth 50a and serving as abutting surfaces abutting on the first meshing teeth 50a. Since the first meshing teeth 42c of the first ring gear 42 are provided with the one-sided chamfers CF2, the end surfaces of the first meshing teeth 42c facing toward the first meshing teeth 50a and serving as the abutting surfaces abutting on the first meshing teeth 50a have a first inclined surface 42d formed to incline such that the length of the first meshing teeth 42c in the first rotation axis C1 direction decreases with respect to the directions of the arrows A1, A2. The multiple first meshing teeth 42c each have parallel surfaces 42e, 42f formed substantially parallel to the first rotation axis C1 on both sides of the first meshing teeth 42c in the direction of the arrow A1.

Therefore, as shown in FIG. 5, the first meshing teeth 42c formed on the first ring gear 42 and the first meshing teeth 50a formed on the first movable sleeve 50 are provided with the one-sided chamfers CF1, CF2 such that the first meshing teeth 50a are meshed with the first meshing teeth 42c when the rotation speed of the first meshing teeth 50a of the first movable sleeve 50 is greater than the rotation speed of the first meshing teeth 42c of the first ring gear 42 in a case where the first meshing teeth 50a are moved by the first movement mechanism 52 in the direction toward the first meshing teeth 42c to cause the end portions of the first meshing teeth 50a on the side of the first meshing teeth 42c to abut on the end portions of the first meshing teeth 42c facing toward the first meshing teeth 50a.

In the four-wheel drive vehicle 10 configured as described above, for example, when a two-wheel drive running mode is selected by the electronic control device 100 in the four-wheel drive state in which both the first dog clutch 24 and the second dog clutch 32 are engaged, the first movable sleeve 50 is moved from the first meshing position to the first non-meshing position by the first movement mechanism 52 to release the first dog clutch 24, and the second movable sleeve 104 is moved from the second meshing position to the second non-meshing position by the second movement mechanism 106 to release the second dog clutch 32, so as to achieve a disconnect state in which the propeller shaft 28 is disconnected from each of the engine 12 and the pair of the left and right rear wheels 16L, 16R. When a four-wheel drive running mode is selected by the electronic control device 100 from the disconnect state, the synchronizing mechanism 116 of the second movement mechanism 106 synchronizes the rotation speed of the second ring gear 92 and the rotation speed of the second movable sleeve 104, and the first movable sleeve 50 is moved from the first non-meshing position to the first meshing position by the first movement mechanism 52 to engage the first dog clutch 24. After the engagement of the first dog clutch 24, the second movable sleeve 104 is moved from the second non-meshing position to the second meshing position by the second movement mechanism 106 to engage the second dog clutch 32, so that the disconnect state is canceled.

Figure 6:
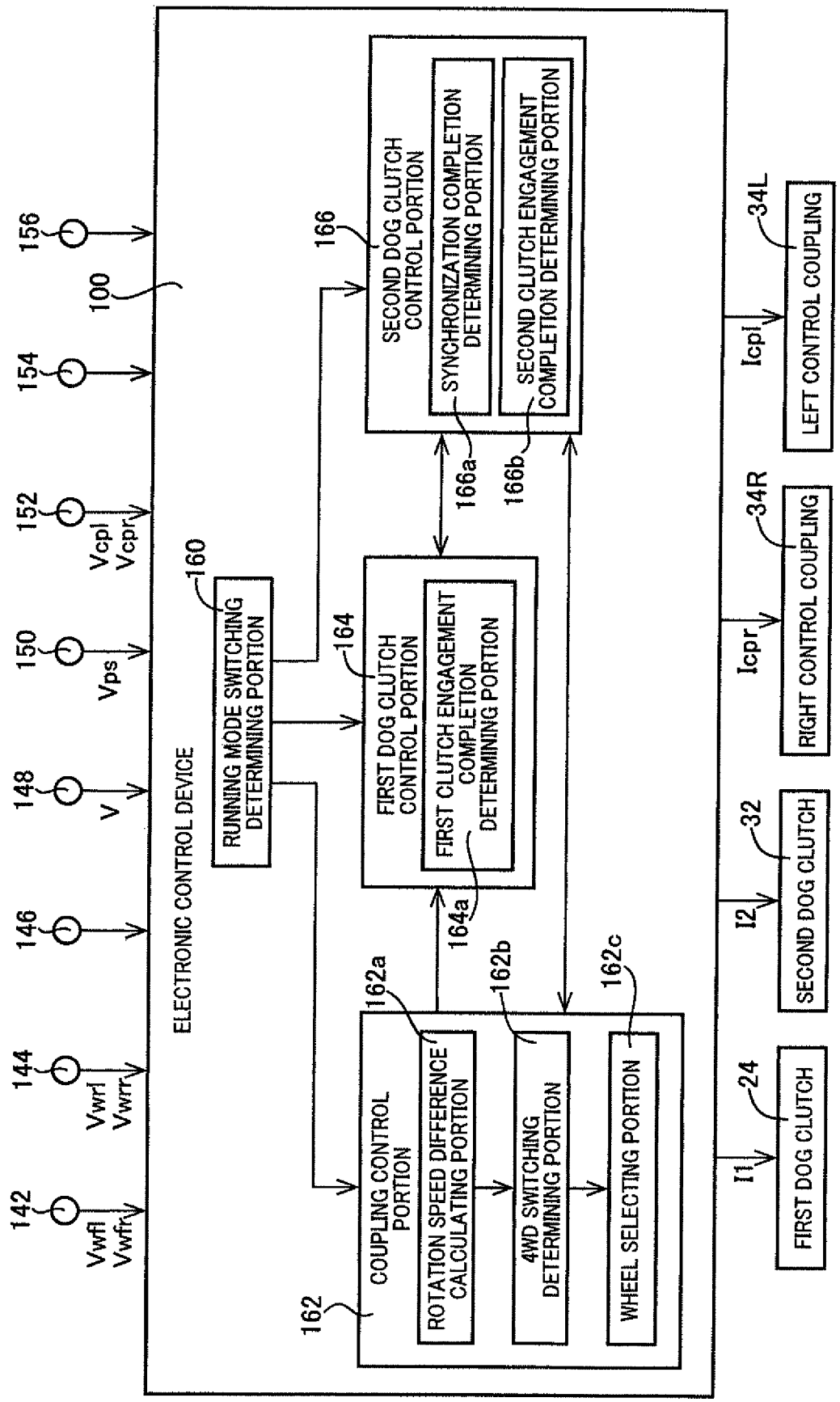
FIG. 6 is a functional block diagram for explaining a main portion of the control function included in an electronic control device of the vehicle of FIG. 1.

FIG. 6 is a functional block diagram for explaining a main portion of the control function included in the electronic control device 100. As shown in FIG. 6, the electronic control device 100 is supplied with various input signals detected by sensors disposed on the four-wheel drive vehicle 10. For example, the signals input to the electronic control device 100 include: a signal indicative of rotation speeds Vwfl, Vwfr (rpm) of the front wheels 14L, 14R detected by a first wheel speed sensor 142; a signal indicative of rotation speeds Vwrl, Vwrr (rpm) of the rear wheels 16L, 16R detected by a second wheel speed sensor 144; an ON/OFF signal indicative of whether the four-wheel drive running mode is selected, detected from a 4WD running mode changeover switch 146; a signal indicative of a vehicle speed V (km/h) of the four-wheel drive vehicle 10 detected from a vehicle speed sensor 148; a signal indicative of a rotation speed Vps (rpm) of the propeller shaft 28 detected by a first rotation speed sensor 150; a signal indicative of rotation speeds Vcpl, Vcpr (rpm) of the coupling covers 34La, 34Ra, i.e., the rotation speed of the central axle 98, detected by a second rotation speed sensor 152; an ON/OFF signal indicative of whether the first dog clutch 24 is engaged, i.e., an ON/OFF signal indicative of whether the first movable sleeve 50 is at the first meshing position, detected by a first position sensor 154; and an ON/OFF signal indicative of whether the second dog clutch 32 is engaged, i.e., an ON/OFF signal indicative of whether the second movable sleeve 104 is at the second meshing position, detected by a second position sensor 156.

Various output signals are supplied from the electronic control device 100 to the devices disposed on the four-wheel drive vehicle 10. For example, the signals supplied from the electronic control device 100 to the portions include: the first drive current I1 (A) supplied to the first electromagnetic coil 64 of the first actuator 56 for engaging the first dog clutch 24; the second drive current I2 (A) supplied to the second electromagnetic coil 120 of the second actuator 110 for engaging the second dog clutch 32; the left coupling drive current Icpl (A) supplied to an electromagnetic coil (not shown) of the left control coupling 34L for controlling the transmission torque transmitted between the rear wheel 16L and the central axle 98; and the right coupling drive current Icpr (A) supplied to an electromagnetic coil (not shown) of the right control coupling 34R for controlling the transmission torque transmitted between the rear wheel 16R and the central axle 98.

As shown in FIG. 6, the electronic control device 100 includes a running mode switching determining portion 160, a coupling control portion 162, a first dog clutch control portion 164, and a second dog clutch control portion 166. The running mode switching determining portion 160 determines whether switching is performed from the two-wheel drive running mode in which the two-wheel drive state is implemented so that the drive power is transmitted from the engine 12 to the pair of the left and right front wheels 14L, 14R to the four-wheel drive running mode in which the four-wheel drive state is implemented so that the drive power is also transmitted from the engine 12 to the pair of the left and right rear wheels 16L, 16R, i.e., determines whether a switching request is made for switching the first dog clutch 24 from a first non-meshing state in which the first meshing teeth 50a of the first movable sleeve 50 are not meshed with the first meshing teeth 42c of the first ring gear 42 to a first meshing state in which the first meshing teeth 50a of the first movable sleeve 50 are meshed with the first meshing teeth 42c of the first ring gear 42. For example, when the 4WD running mode changeover switch 146 is operated by the driver, the running mode switching determining portion 160 determines that the two-wheel drive running mode is switched to the four-wheel drive running mode, i.e., determines that a switching request is made for switching the first dog clutch 24 from the first non-meshing state to the first meshing state.

As shown in FIG. 6, the coupling control portion 162 includes a rotation speed difference calculating portion 162a, a 4WD switching determining portion 162b, and a wheel selecting portion 162c. The coupling control portion 162 controls the left coupling drive current Icpl (A) supplied to the electromagnetic coil of the left control coupling 34L and the right coupling drive current Icpr (A) supplied to the electromagnetic coil of the right control coupling 34R to control the transmission torque from the central axle 98 to the rear wheel 16L, or the transmission torque from the rear wheel 16L to the central axle 98, with the left control coupling 34L and to control the transmission torque from the central axle 98 to the rear wheel 16R, or the transmission torque from the rear wheel 16R to the central axle 98, with the right control coupling 34R.

If the running mode switching determining portion 160 determines that the two-wheel drive running mode is switched to the four-wheel drive running mode, i.e., determines that a switching request is made for switching the first dog clutch 24 from the first non-meshing state to the first meshing state, the rotation speed difference calculating portion 162a calculates a difference (V1*kl*–V1*rl*), i.e., a first rotation speed difference Vs1 (rpm), between a rotation speed V1*kl* (rpm) of the first meshing teeth 50a of the first movable sleeve 50 and a rotation speed V1*rl* (rpm) of the first meshing teeth 42c of the first ring gear 42 in a case where the rear wheel 16L is coupled to the central axle 98 by the left control coupling 34L, and a difference (V1*kr*–V1*rr*), i.e., a second rotation speed difference Vs2 (*rpm*), between a rotation speed V1*kr* (rpm) of the first meshing teeth 50a of the first movable sleeve 50 and a rotation speed V1*rr* (rpm) of the first meshing teeth 42c of the first ring gear 42 in a case where the rear wheel 16R is coupled to the central axle 98 by the right control coupling 34R.

The rotation speed V1$kl$ of the first meshing teeth 50$a$ and the rotation speed V1$kr$ of the first meshing teeth 50$a$ are calculated from the rotation speed Vwfl (rpm) of the front wheel 14L and the rotation speed Vwfr (rpm) of the front wheel 14R detected from the first wheel speed sensor 142 when the running mode switching determining portion 160 determines that the two-wheel drive running mode is switched to the four-wheel drive running mode. Specifically, the rotation speed V1$kl$ and the rotation speed V1$kr$ are average rotation speeds Vwfav ((Vwfl+Vwfr)/2) (rpm) of the rotation speed Vwfl (rpm) of the front wheel 14L and the rotation speed Vwfr (rpm) of the front wheel 14R. The rotation speed V1$rl$ of the first meshing teeth 42$c$ is calculated from the rotation speed Vwrl (rpm) of the rear wheel 16L detected from the second wheel speed sensor 144 when the running mode switching determining portion 160 determines that the two-wheel drive running mode is switched to the four-wheel drive running mode, and the front-rear ring gear ratio difference G set in advance. The rotation speed V1$rl$ is the rotation speed of the first meshing teeth 42$c$ of the first ring gear 42 when the second dog clutch 32 is engaged so that the first meshing teeth 42$c$ of the first ring gear 42 are coupled to the rear wheel 16L in a power transmittable manner. The rotation speed V1$rr$ of the first meshing teeth 42$c$ is calculated from the rotation speed Vwrr (rpm) of the rear wheel 16R detected from the second wheel speed sensor 144 when the running mode switching determining portion 160 determines that the two-wheel drive running mode is switched to the four-wheel drive running mode, and the front-rear ring gear ratio difference G set in advance. The rotation speed V1$rr$ is the rotation speed of the first meshing teeth 42$c$ of the first ring gear 42 when the second dog clutch 32 is engaged so that the first meshing teeth 42$c$ of the first ring gear 42 are coupled to the rear wheel 16R in a power transmittable manner.

When the first rotation speed difference Vs1 and the second rotation speed difference Vs2 are calculated by the rotation speed difference calculating portion 162$a$, the 4WD switching determining portion 162$b$ determines whether the two-wheel drive state can smoothly be switched to the four-wheel drive state, i.e., whether the first dog clutch 24 can smoothly be switched from the first non-meshing state to the first meshing state, based on the calculated first and second rotation speed differences Vs1 and Vs2 and the vehicle speed V (km/h) detected from the vehicle speed sensor 148 when the running mode switching determining portion 160 determines that the two-wheel drive running mode is switched to the four-wheel drive running mode. For example, if at least one of a first point P1 obtained from the first rotation speed difference Vs1 (*rpm*) calculated by the rotation speed difference calculating portion 162$a$ and the vehicle speed V (km/h) detected from the vehicle speed sensor 148 and a second point P2 obtained from the second rotation speed difference Vs2 (*rpm*) calculated by the rotation speed difference calculating portion 162$a$ and the vehicle speed V (km/h) detected from the vehicle speed sensor 148 is within a preset switchable region (predetermined range) Sok shown in a map of FIG. 7, the 4WD switching determining portion 162$b$ determines that the two-wheel drive state can smoothly be switched to the four-wheel drive state, i.e., that the first dog clutch 24 can smoothly be switched from the first non-meshing state to the first meshing state. In addition to the switchable region Sok, the map shown in FIG. 7 has a large switching sound region Sng1, a non-switchable region Sng2, and a switching target differential rotation derivation line Lt stored in advance. Regarding the large switching sound region Sng1, if the rear wheel 16L, 16R having the rotation speed difference Vs calculated by the rotation speed difference calculating portion 162$a$ within the large switching sound region Sng1 are coupled to the central axle 98 by the control couplings 34L, 34R, the rotation speed of the first meshing teeth 50$a$ of the first movable sleeve 50 becomes relatively excessively greater than the rotation speed of the first meshing teeth 42$c$ of the first ring gear 42 in the case of switching of the first dog clutch 24 from the first non-meshing state to the first meshing state, for example, and therefore, an abnormal sound, i.e., a switching sound, or vibration is generated at a level noticeable to the driver when the first meshing teeth 50$a$ are meshed with the first meshing teeth 42$c$. Regarding the non-switchable region Sng2, if the rear wheel 16L, 16R having the rotation speed difference Vs calculated by the rotation speed difference calculating portion 162$a$ within the non-switchable region Sng2 are coupled to the central axle 98 by the control couplings 34L, 34R, the rotation speed of the first meshing teeth 50$a$ of the first movable sleeve 50 becomes slower than the rotation speed of the first meshing teeth 42$c$ of the first ring gear 42 in the case of switching of the first dog clutch 24 from the first non-meshing state to the first meshing state, for example, and therefore, even though the one-sided chamfers CF1 formed on the first meshing teeth 50$a$ of the first movable sleeve 50 come into contact with the one-sided chamfers CF2 formed on the first meshing teeth 42$c$ of the first ring gear 42, the first meshing teeth 50$a$ of the first movable sleeve 50 are not meshed with the first meshing teeth 42$c$ of the first ring gear 42. Regarding the switchable region Sok, if the rear wheel 16L, 16R having the rotation speed difference Vs calculated by the rotation speed difference calculating portion 162$a$ within the switchable region Sok are coupled to the central axle 98 by the control couplings 34L, 34R, the rotation speed of the first meshing teeth 50$a$ of the first movable sleeve 50 becomes moderately greater than the rotation speed of the first meshing teeth 42$c$ of the first ring gear 42 in the case of switching of the first dog clutch 24 from the first non-meshing state to the first meshing state, for example, and therefore, no abnormal sound, i.e., no switching sound, is generated at a level noticeable to the driver when the first meshing teeth 50$a$ are meshed with the first meshing teeth 42$c$. The switching target differential rotation derivation line Lt is a line for deriving an ideal rotation speed difference (set rotation speed difference) Vst between the rotation speed of the first meshing teeth 50$a$ of the first movable sleeve 50 and the rotation speed of the first meshing teeth 42$c$ of the first ring gear 42 according to the vehicle speed V (km/h) detected from the vehicle speed sensor 148, and the switching target differential rotation derivation line Lt is set such that the first meshing teeth 50$a$ of the first movable sleeve 50 are most smoothly meshed with the first meshing teeth 42$c$ of the first ring gear 42 in the case of switching of the first dog clutch 24 from the first non-meshing state to the first meshing state, for example.

Figure 8:
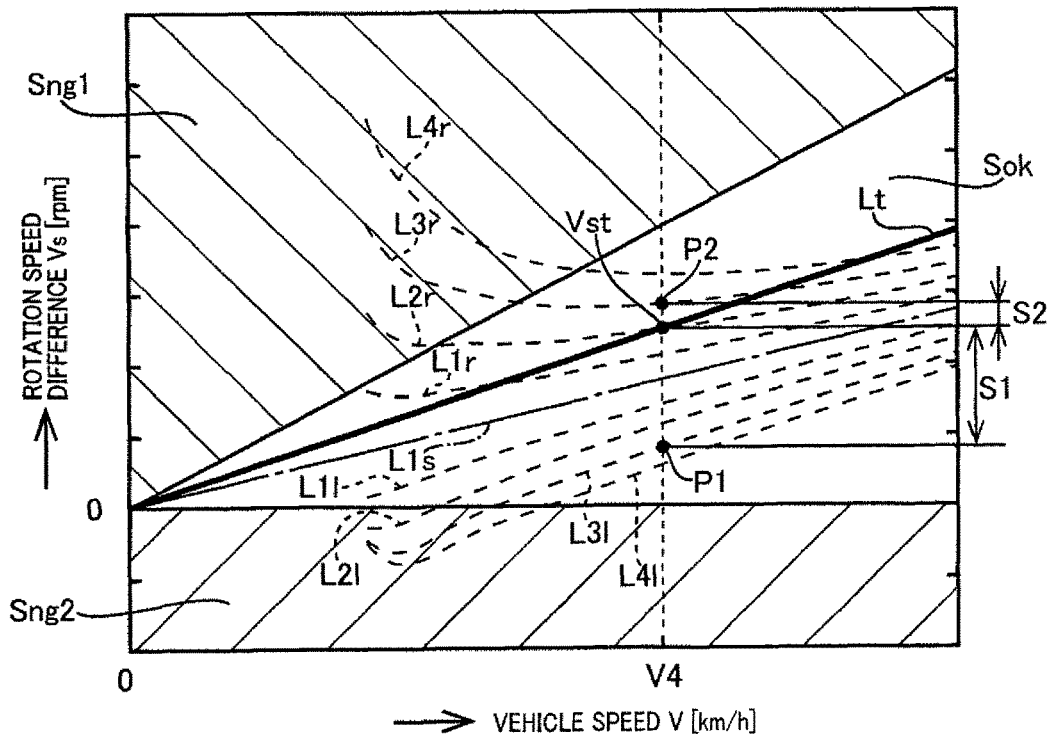
FIG. 8 is a diagram showing first to fourth outer wheel lines and first to fourth inner wheel lines in the map of FIG. 7.

As shown in FIG. 8, for example, if the vehicle speed V (km/h) detected from the vehicle speed sensor 148 is V4 (km/h) and the first point P1 and the second point P2 are both within the switchable region Sok, the 4WD switching determining portion 162$b$ determines that the two-wheel drive state can smoothly be switched to the four-wheel drive state, i.e., that the first dog clutch 24 can smoothly be switched from the first non-meshing state to the first meshing state. A first outer wheel line L1$l$ indicated by a broken line in FIG. 8 is a line indicative of the first rotation speed difference Vs1

Figure 9:
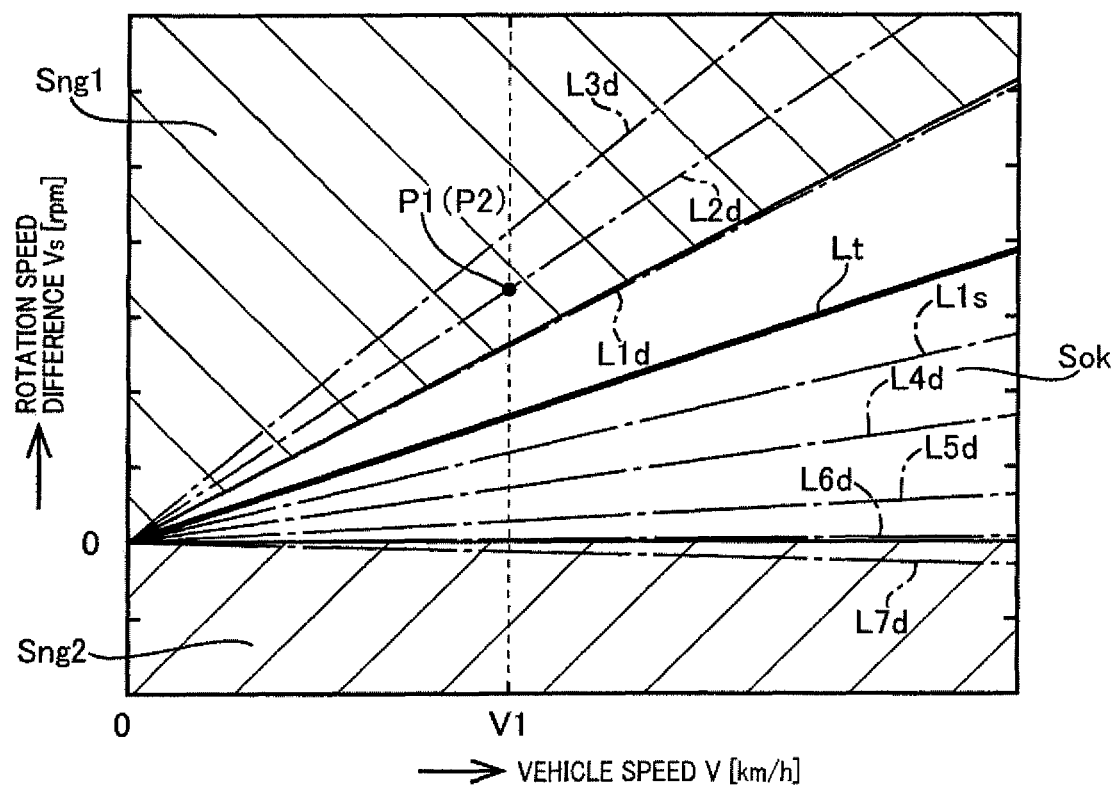
FIG. 9 is a diagram showing first to seventh diameter difference lines in the map of FIG. 7.

(*rpm*) when the central axle 98 is coupled to the rear wheel 16L that is an outer wheel during turning running of the vehicle 10 while the four-wheel drive vehicle 10 is turning right at the vehicle speed V (km/h) with a predetermined acceleration A (G) that is the lateral acceleration acting in the vehicle width direction, for example. The "A" described above is a preset value. A first inner wheel line L1*r* indicated by a broken line in FIG. 8 is a line indicative of the second rotation speed difference Vs2 (*rpm*) when the central axle 98 is coupled to the rear wheel 16R that is an inner wheel during turning running of the vehicle 10 while the four-wheel drive vehicle 10 is turning right at the vehicle speed V (km/h) with the predetermined acceleration A (G) that is the lateral acceleration acting in the vehicle width direction, for example. A second outer wheel line L2l indicated by a broken line in FIG. 8 is a line indicative of the first rotation speed difference Vs1 (*rpm*) when the central axle 98 is coupled to the rear wheel 16L that is an outer wheel during turning running of the vehicle 10 while the four-wheel drive vehicle 10 is turning right at the vehicle speed V (km/h) with a predetermined acceleration 2A (G) that is the lateral acceleration acting in the vehicle width direction, for example. A second inner wheel line L2*r* indicated by a broken line in FIG. 8 is a line indicative of the second rotation speed difference Vs2 (*rpm*) when the central axle 98 is coupled to the rear wheel 16R that is an inner wheel during turning running of the vehicle 10 while the four-wheel drive vehicle 10 is turning right at the vehicle speed V (km/h) with the predetermined acceleration 2A (G) that is the lateral acceleration acting in the vehicle width direction, for example. A third outer wheel line L3l indicated by a broken line in FIG. 8 is a line indicative of the first rotation speed difference Vs1 (*rpm*) when the central axle 98 is coupled to the rear wheel 16L that is an outer wheel during turning running of the vehicle 10 while the four-wheel drive vehicle 10 is turning right at the vehicle speed V (km/h) with a predetermined acceleration 3A (G) that is the lateral acceleration acting in the vehicle width direction, for example. A third inner wheel line L3*r* indicated by a broken line in FIG. 8 is a line indicative of the second rotation speed difference Vs2 (*rpm*) when the central axle 98 is coupled to the rear wheel 16R that is an inner wheel during turning running of the vehicle 10 while the four-wheel drive vehicle 10 is turning right at the vehicle speed V (km/h) with the predetermined acceleration 3A (G) that is the lateral acceleration acting in the vehicle width direction, for example. A fourth outer wheel line L4l indicated by a broken line in FIG. 8 is a line indicative of the first rotation speed difference Vs1 (*rpm*) when the central axle 98 is coupled to the rear wheel 16L that is an outer wheel during turning running of the vehicle 10 while the four-wheel drive vehicle 10 is turning right at the vehicle speed V (km/h) with a predetermined acceleration 4A (G) that is the lateral acceleration acting in the vehicle width direction, for example. A fourth inner wheel line L4*r* indicated by a broken line in FIG. 8 is a line indicative of the second rotation speed difference Vs2 (*rpm*) when the central axle 98 is coupled to the rear wheel 16R that is an inner wheel during turning running of the vehicle 10 while the four-wheel drive vehicle 10 is turning right at the vehicle speed V (km/h) with the predetermined acceleration 4A (G) that is the lateral acceleration acting in the vehicle width direction, for example. A first straight-running line L s indicated by a dashed-dotted line in FIGS. 8 and 9 is a line indicative of the first rotation speed difference Vs1 and the second rotation speed difference Vs2 when the rear wheel 16L or 16R is coupled to the central axle 98 during straight running of the vehicle 10 while the four-wheel drive vehicle 10 is running straight at the vehicle speed V. During straight running of the vehicle 10, the first rotation speed difference Vs1 and the second rotation speed difference Vs2 have the same value.

As shown in FIG. 9, for example, if the vehicle speed V (km/h) detected from the vehicle speed sensor 148 is V1 (km/h) and none of the first point P1 and the second point P2 are within the switchable region Sok, i.e., the first point P1 and the second point P2 are within the large switching sound region Sng1, the 4WD switching determining portion 162b determines that the two-wheel drive state cannot smoothly be switched to the four-wheel drive state, i.e., that the first dog clutch 24 cannot smoothly be switched from the first non-meshing state to the first meshing state. A first diameter difference line L1*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter reduced by a predetermined value DA1 (%) as compared to the diameter of the rear wheels 16L, 16R and is running straight at the vehicle speed V. A second diameter difference line L2*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter reduced by a predetermined value DA2 (%) as compared to the diameter of the rear wheels 16L, 16R and is running straight at the vehicle speed V. A third diameter difference line L3*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter reduced by a predetermined value DA3 (%) as compared to the diameter of the rear wheels 16L, 16R and is running straight at the vehicle speed V. The magnitude relationship of the predetermined values DA1, DA2, DA3 is DA1<DA2<DA3. A fourth diameter difference line L4*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter increased by a predetermined value DB1 (%) as compared to the diameter of the rear wheels 16L, 16R and is running straight at the vehicle speed V. A fifth diameter difference line L5*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter increased by a predetermined value DB2 (%) as compared to the diameter of the rear wheels 16L, 16R and is running straight at the vehicle speed V. A sixth diameter difference line L6*d* indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter increased by a predetermined value DB3 (%) as compared to the diameter of the rear wheels 16L, 16R and is running straight at the vehicle speed V. A seventh diameter difference line L7d indicated by a dashed-dotted line in FIG. 9 is a line indicative of the first rotation speed difference Vs1 and the second rotation speed difference Vs2 when the rear wheel 16L or 16R is coupled to the central axle 98 during straight running of the vehicle 10 while the vehicle 10 is equipped with the front wheels 14L, 14R having the diameter increased by a predetermined value DB4 (%) as compared to the diameter of the rear wheels 16L, 16R and is running straight at the vehicle speed V. The magnitude relationship of the predetermined values DB1, DB2, DB3, DB4 is DB1<DB2<DB3<DB4. When the vehicle is running straight, the first rotation speed difference Vs1 and the second rotation speed difference Vs2 have the same value.

When the 4WD switching determining portion 162b determines that the two-wheel drive state can smoothly be switched to the four-wheel drive state, i.e., that the first dog clutch 24 can smoothly be switched from the first non-meshing state to the first meshing state, the wheel selecting portion 162c selects one control coupling from the left-and-right pair of the left control coupling 34L and the right control coupling 34R to couple corresponding one rear wheel of the left and right paired rear wheels 16L, 16R to the central axle 98. For example, as shown in FIG. 8, if the first point P1 and the second point P2 obtained by the 4WD switching determining portion 162b are both within the switchable region Sok, the wheel selecting portion 162c derives the ideal rotation speed difference Vst (rpm) from the vehicle speed V (km/h), for example, V4 (km/h), detected from the vehicle speed sensor 148 and the switching target differential rotation derivation line Lt, selects the second point P2 to achieve a smaller difference, i.e., a difference S2, out of a difference S1 (rpm) between the ideal rotation speed difference Vst (rpm) and the first point P1, i.e., the first rotation speed difference Vs1 (rpm), and the difference S2 (rpm) between the ideal rotation speed difference Vst (rpm) and the second point P2, i.e., the second rotation speed difference Vs2 (rpm), and selects the right control coupling 34R that couples the rear wheel 16R resulting in the second point P2 within the switchable region Sok to the central axle 98.

Figure 7:
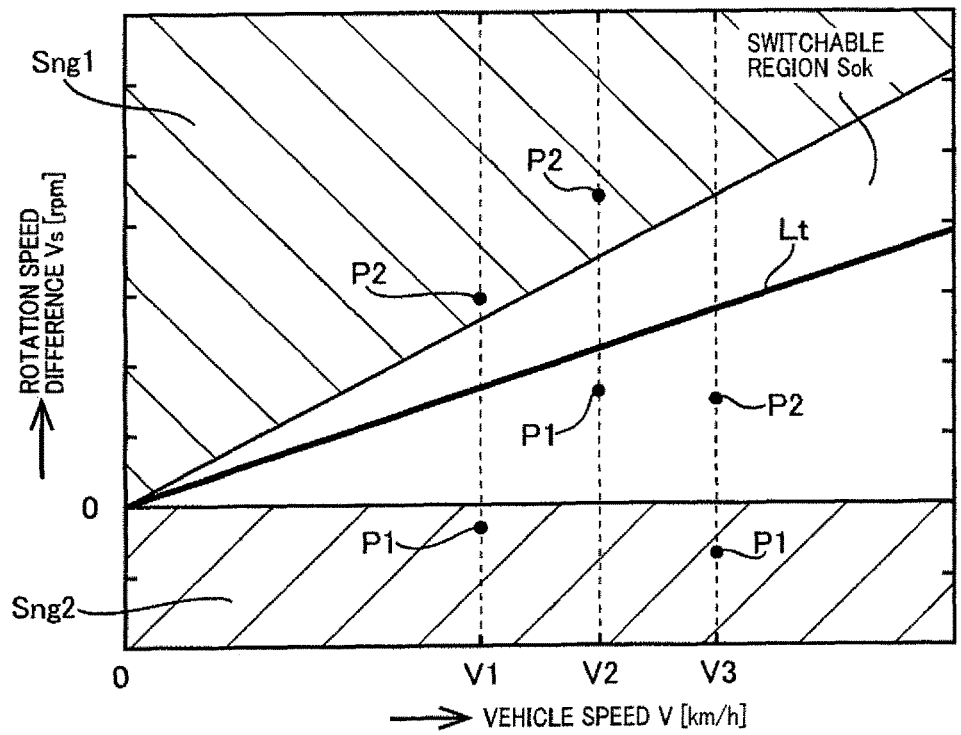
FIG. 7 is a diagram showing an example of a map used in a 4WD switching determining portion and a wheel selecting portion provided in the electronic control device of FIG. 6.

For example, as shown in FIG. 7, if the vehicle speed V (km/h) detected from the vehicle speed sensor 148 is V3 (km/h), for example, and the second point P2 obtained by the 4WD switching determining portion 162b is within the switchable region Sok while the first point P1 obtained by the 4WD switching determining portion 162b is within the non-switchable region Sng2, the wheel selecting portion 162c selects the right control coupling 34R that couples the rear wheel 16R resulting in the second point P2, i.e., the second rotation speed difference Vs2, within the switchable region Sok to the central axle 98. For example, as shown in FIG. 7, if the vehicle speed V (km/h) detected from the vehicle speed sensor 148 is V2 (km/h), and the first point P1 obtained by the 4WD switching determining portion 162b is within the switchable region Sok while the second point P2 obtained by the 4WD switching determining portion 162b is within the large switching sound region Sng1, the wheel selecting portion 162c selects the left control coupling 34L that couples the rear wheel 16L resulting in the first point P1, i.e., the first rotation speed difference Vs1, within the switchable region Sok to the central axle 98.

As shown in FIG. 7, if the vehicle speed V (km/h) detected from the vehicle speed sensor 148 is V1 (km/h), for example, and the first point P1 obtained by the 4WD switching determining portion 162b is within the non-switchable region Sng2 while the second point P2 obtained by the 4WD switching determining portion 162b is within the large switching sound region Sng1, i.e., even if none of the first point P1 and the second point P2 are within the switchable region Sok and the 4WD switching determining portion 162b determines that the two-wheel drive state cannot smoothly be switched to the four-wheel drive state, the wheel selecting portion 162c selects the second point P2 resulting in the larger rotation speed difference Vs out of the first point P1, i.e., the first rotation speed difference Vs1, and the second point P2, i.e., the second rotation speed difference Vs2, thereby selecting the right control coupling 34R that couples the rear wheel 16R resulting in the second point P2 within the large switching sound region Sng1 to the central axle 98, for example, when at least one of the front wheels 14L, 14R and the rear wheels 16L, 16R slips and it is determined that the two-wheel drive state needs to be switched to the four-wheel drive state, i.e., the first dog clutch 24 needs to be switched from the first non-meshing state to the first meshing state.

When the wheel selecting portion 162c selects one control coupling out of the right control coupling 34R and the left control coupling 34L, the coupling control portion 162 supplies a coupling drive current to the electromagnetic coil of the selected control coupling. For example, when the right control coupling 34R is selected by the wheel selecting portion 162c, the coupling control portion 162 supplies the right coupling drive current Icpr (A) of a predetermined value Icpr1 (A) set in advance to the electromagnetic coil of the right control coupling 34R. When the left control coupling 34L is selected by the wheel selecting portion 162c, the coupling control portion 162 supplies the left coupling drive current Icpl (A) of a predetermined value Icpl1 (A) set in advance to the electromagnetic coil of the left control coupling 34L. The predetermined value Icpr1 (A) is the right coupling drive current Icpr (A) set in advance such that the right control coupling 34R is completely engaged, i.e., the rear wheel 16R and the central axle 98 integrally rotate. The predetermined value Icpl1 (A) is the left coupling drive current Icpl (A) set in advance such that the left control coupling 34L is completely engaged, i.e., the rear wheel 16L and the central axle 98 integrally rotate.

When none of the right control coupling 34R and the left control coupling 34L are selected by the wheel selecting portion 162c, the coupling control portion 162 supplies no coupling drive current to the electromagnetic coil of the right control coupling 34R and the electromagnetic coil of the left control coupling 34L and prohibits switching from the two-wheel drive running mode to the four-wheel drive running mode, i.e., switching of the first dog clutch 24 from the first non-meshing state to the first meshing state.

As shown in FIG. 6, the first dog clutch control portion 164 includes a first clutch engagement completion determining portion 164a. When the running mode switching determining portion 160 determines that the two-wheel drive running mode is switched to the four-wheel drive running mode and the coupling drive current is supplied to the electromagnetic coil of either the right control coupling 34R or the left control coupling 34L selected by the wheel selecting portion 162c, the first dog clutch control portion 164 supplies the first drive current I1 (A) to the first electromagnetic coil 64 of the first actuator 56. As a result, the first movable sleeve 50 is moved toward the bearing 48a beyond the first non-meshing position where the projection 72a of the second piston 72 is latched on the latching teeth 74a of the holder 74 against the urging force of the first spring 58.

As shown in FIG. 6, the second dog clutch control portion 166 includes a synchronization completion determining portion 166a and a second clutch engagement completion determining portion 166b. When the running mode switching determining portion 160 determines that the two-wheel drive running mode is switched to the four-wheel drive running mode and the coupling drive current is supplied to the electromagnetic coil of either the right control coupling 34R or the left control coupling 34L selected by the wheel selecting portion 162c, the second dog clutch control portion 166 supplies the second drive current I2 (A) to the second electromagnetic coil 120 of the second actuator 110. As a result, the second movable sleeve 104 is moved toward the bearing 94a beyond the second non-meshing position where the projection 126a of the second piston 126 is latched on the latching teeth 128a of the holder 128 against the urging force of the second spring 112, and the rotation speed of the second ring gear 92 is thereby rotationally synchronized with the rotation speed of the second movable sleeve 104, i.e., the rotation speed of the central axle 98, by the synchronizing mechanism 116.

When the second drive current I2 (A) is supplied by the second dog clutch control portion 166, the synchronization completion determining portion 166a determines whether the rotation speed of the second ring gear 92 is synchronized with the rotation speed of the second movable sleeve 104. For example, the synchronization completion determining portion 166a calculates the rotation speed of the second ring gear 92 from the rotation speed Vps (rpm) of the propeller shaft 28 detected by the first rotation speed sensor 150 and the gear ratio between the drive pinion 90 integrally disposed on the propeller shaft 28 and the second ring gear 92, also calculates the rotation speed of the second movable sleeve 104 from the rotation speeds Vcpl, Vcpr (rpm) of the coupling covers 34La, 34Ra, i.e., the rotation speed of the central axle 98, detected by the second rotation speed sensor 152, and determines that the rotation speed of the second ring gear 92 is synchronized with the rotation speed of the second movable sleeve 104 when a differential rotation between the calculated rotation speeds of the second ring gear 92 and the second movable sleeve 104 falls within a predetermined synchronization determination range.

When the synchronization completion determining portion 166a determines that the rotation speed of the second ring gear 92 is synchronized with the rotation speed of the second movable sleeve 104, the first dog clutch control portion 164 reduces the magnitude of the first drive current I1 (A) supplied to the first electromagnetic coil 64 of the first actuator 56 to stop the supply of the first drive current I1 supplied to the first electromagnetic coil 64. As a result, the first movable sleeve 50 is moved to the first meshing position by the urging force of the first spring 58.

When the first dog clutch control portion 164 reduces the magnitude of the first drive current I1 supplied to the first electromagnetic coil 64 of the first actuator 56, the first clutch engagement completion determining portion 164a determines whether the first dog clutch 24 is completely engaged, i.e., whether the first dog clutch 24 is switched from the first non-meshing state to the first meshing state. For example, when the first position sensor 154 detects that the first movable sleeve 50 is at the first meshing position, the first clutch engagement completion determining portion 164a determines that the first dog clutch 24 is switched from the first non-meshing state to the first meshing state.

When the first clutch engagement completion determining portion 164a determines that the first dog clutch 24 is switched from the first non-meshing position to the first meshing position, the second dog clutch control portion 166 reduces the magnitude of the second drive current I2 (A) supplied to the second electromagnetic coil 120 of the second actuator 110 to stop the supply of the second drive current I2 supplied to the second electromagnetic coil 120. As a result, the second movable sleeve 104 is moved to the second meshing position by the urging force of the second spring 112.

When the second dog clutch control portion 166 reduces the magnitude of the second drive current I2 supplied to the second electromagnetic coil 120 of the second actuator 110, the second clutch engagement completion determining portion 166b determines whether the second dog clutch 32 is completely engaged, i.e., whether the second dog clutch 32 is switched from the second non-meshing state in which the second meshing teeth 92b of the second ring gear 92 are not meshed with the second meshing teeth 104a of the second movable sleeve 104 to the second meshing state in which the second meshing teeth 92b of the second ring gear 92 are meshed with the second meshing teeth 104a of the second movable sleeve 104. For example, when the second position sensor 156 detects that the second movable sleeve 104 is at the second meshing position, the second clutch engagement completion determining portion 166b determines that the second dog clutch 32 is switched from the second non-meshing state to the second meshing state.

When the second clutch engagement completion determining portion 166b determines that the second dog clutch 32 is switched from the second non-meshing state to the second meshing state, the coupling control portion 162 stops the supply of the coupling drive current supplied to either the right control coupling 34R or the left control coupling 34L selected by the wheel selecting portion 162c and subsequently controls the right coupling drive current Icpr (A) supplied to the electromagnetic coil of the right control coupling 34R and the left coupling drive current Icpl (A) supplied to the electromagnetic coil of the left control coupling 34L depending on a vehicle running state.

Figure 10:
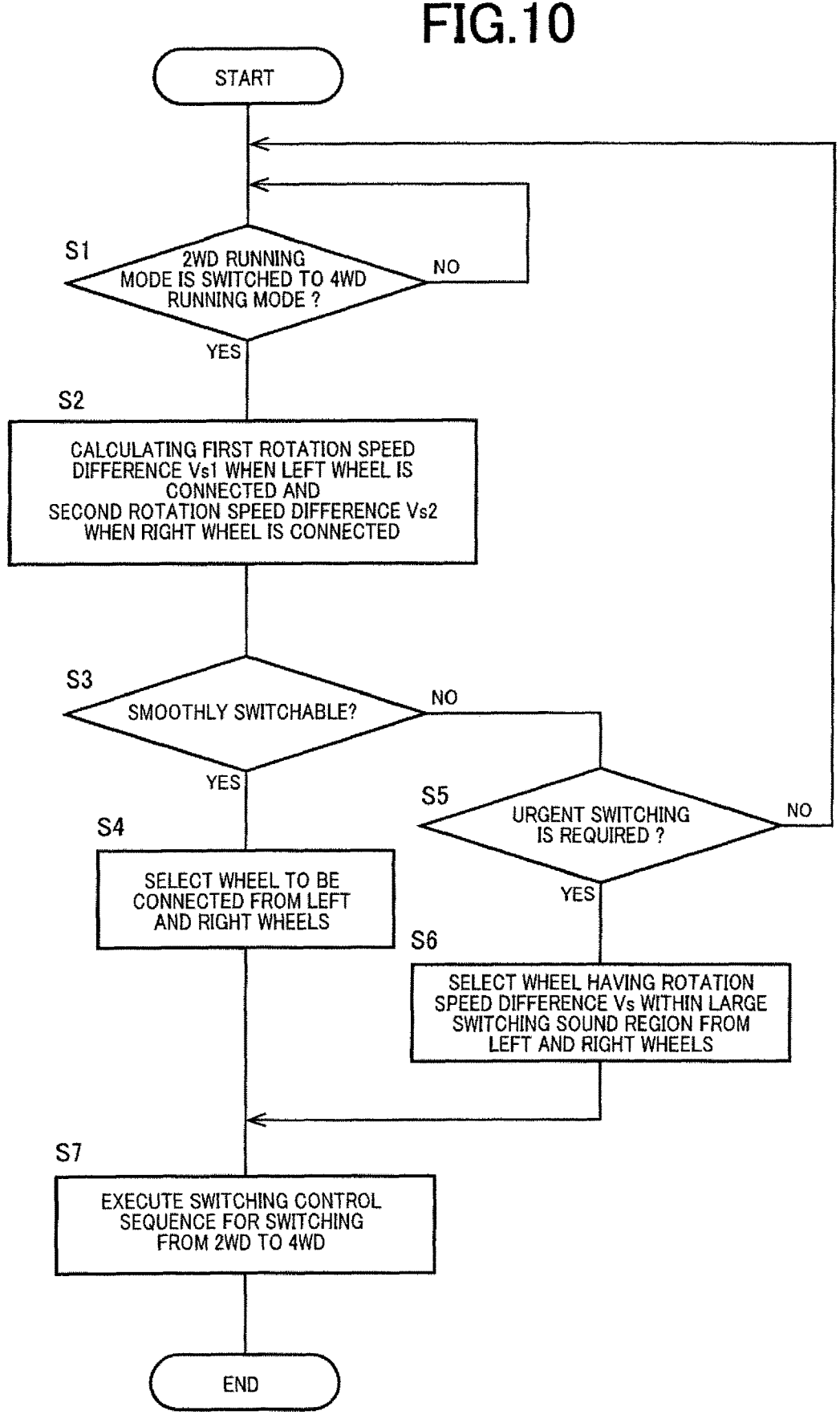
FIG. 10 is a flowchart for explaining an example of an operation of the electronic control device of FIG. 1 configured to switch the vehicle from a two-wheel drive state to a four-wheel drive state while the vehicle performs two-wheel drive running.

FIG. 10 is a flowchart for explaining an example of an operation in the electronic control device 100 to switch the vehicle 10 from the two-wheel drive state in which the drive power is transmitted from the engine 12 to the front wheels 14L, 14R during the two-wheel drive running to the four-wheel drive state in which the drive power is also transmitted from the engine 12 to the rear wheels 16L, 16R.

First, at step (hereinafter, step will be omitted) S1 corresponding to the function of the running mode switching determining portion 160, it is determined whether switching is performed from the two-wheel drive running mode in which the two-wheel drive state is implemented to the four-wheel drive running mode in which the four-wheel drive state is implemented. If the determination of S1 is negative, S1 is executed again, and if the determination of S1 is affirmative, S2 corresponding to the function of the rotation speed difference calculating portion 162a is executed. At S2, calculations are made to obtain the first rotation speed difference Vs, or specifically, the difference between the rotation speed V1kl of the first meshing teeth 50a of the first movable sleeve 50 and the rotation speed V1rl of the first meshing teeth 42c of the first ring gear 42 in the case where the rear wheel 16L, i.e., the left rear wheel, is coupled to the central axle 98, and the second rotation speed difference Vs2 (*rpm*), or specifically, the difference between the rotation speed V1kr of the first meshing teeth 50a of the first movable sleeve 50 and the rotation speed V1rr of the first meshing teeth 42c of the first ring gear 42 in the case where the rear wheel 16R, i.e., the right rear wheel, is coupled to the central axle 98.

At S3 corresponding to the function of the 4WD switching determining portion 162b, it is determined whether the two-wheel drive state can smoothly be switched to the four-wheel drive state, i.e., whether the first dog clutch 24 can smoothly be switched from the first non-meshing state to the first meshing state, based on the first rotation speed difference Vs1 and the second rotation speed difference Vs2 calculated at S2 and the vehicle speed V detected from the vehicle speed sensor 148. If the determination of S3 is affirmative, S4 corresponding to the function of the wheel selecting portion 162c is executed, and if the determination of S3 is negative, S5 corresponding to the function of the wheel selecting portion 162c is executed. At S4, the wheel resulting in the rotation speed difference Vs within the switchable range Sok is selected between the left rear wheel 16L and the right rear wheel 16R and the control coupling is selected for coupling the selected wheel to the central axle 98. At S5, it is determined whether the two-wheel drive state needs to be switched to the four-wheel drive state, i.e., the first dog clutch 24 needs to be switched from the first non-meshing state to the first meshing state. If the determination of S5 is negative, this routine is terminated, and if the determination of S5 is affirmative, S6 corresponding to the function of the wheel selecting portion 162c is executed.

At S6, the wheel resulting in the rotation speed difference Vs within the large switching sound region Sng1 is selected between the left rear wheel 16L and the right rear wheel 16R and the control coupling is selected for coupling the selected wheel to the central axle 98. Subsequently, S7 corresponding to the functions of the coupling control portion 162, the first dog clutch control portion 164, the second dog clutch control portion 166, etc. is executed. At S7, the rear wheel selected at S4 or S6 is coupled to the central axle 98 by the corresponding control coupling, and a switching control sequence is executed for switching the vehicle 10 from the two-wheel drive state to the four-wheel drive state.

Figure 11:
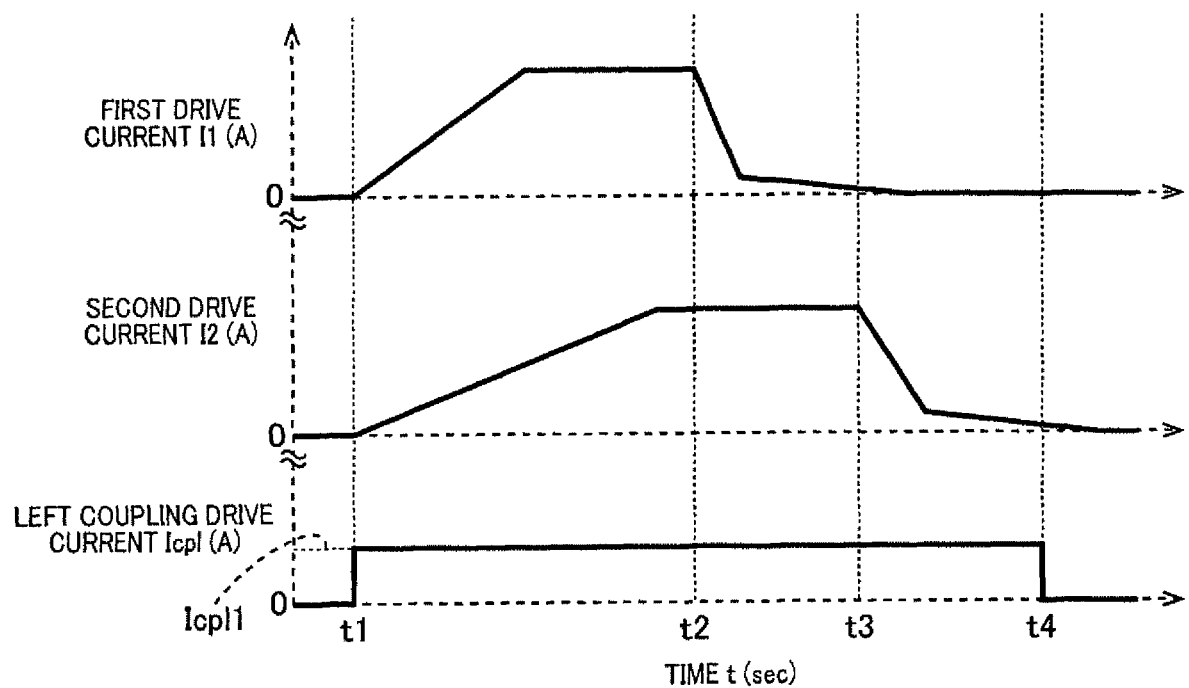
FIG. 11 is a time chart in the case of executing a step S7 shown in the flowchart of FIG. 10, i.e., in the case of executing a switching control sequence in which the vehicle is switched from the two-wheel drive state to the four-wheel drive state.

FIG. 11 is a time chart in the case of executing S7 shown in the flowchart of FIG. 10, i.e., in the case of executing the switching control sequence. In the time chart of FIG. 11, the left rear wheel 16L is selected at S4, and the left control coupling 34L is selected for coupling the selected rear wheel 16L to the central axle 98. As shown in FIG. 11, when the left control coupling 34L is selected at S4 (a first time point t1 of FIG. 11), the left coupling drive current Icpl of the predetermined value Icpl1 (A) is supplied to the electromagnetic coil of the selected left control coupling 34L, and the first drive current I1 and the second drive current I2 are supplied to the first electromagnetic coil 64 of the first actuator 56 and the second electromagnetic coil 120 of the second actuator 110, respectively. When the second drive current I2 is supplied to the second electromagnetic coil 120, the synchronizing mechanism 116 of the second dog clutch 32 is operated so that the rotation speed of the second ring gear 92 is synchronized with the rotation speed of the second movable sleeve 104 in the second dog clutch 32.

Subsequently, as shown in FIG. 11, when the rotation speed of the second ring gear 92 is synchronized with the rotation speed of the second movable sleeve 104 (a second time point t2 of FIG. 11), the magnitude of the first drive current I1 (A) supplied to the first electromagnetic coil 64 is reduced to stop the supply of the first drive current I1. When the magnitude of the first drive current I1 (A) is reduced, the first movable sleeve 50 is moved to the first meshing position by the urging force of the first spring 58. Subsequently, when the first dog clutch 24 is switched from the first non-meshing state to the first meshing state (a third time point t3 of FIG. 11), the magnitude of the second drive current I2 (A) supplied to the second electromagnetic coil 120 is reduced to stop the supply of the second drive current I2. When the magnitude of the second drive current I2 (A) is reduced, the second movable sleeve 104 is moved to the second meshing position by the urging force of the second spring 112. Subsequently, when the second dog clutch 32 is switched from the second non-meshing state to the second meshing state (a fourth time point t4 of FIG. 11), the supply of the left coupling drive current Icpl (A) supplied to the electromagnetic coil of the left control coupling 34L is stopped. As a result, the power transmission path between the engine 12 and the propeller shaft 28 is connected by the first dog clutch 24, and the power transmission path between the propeller shaft 28 and the central axle 98 is connected by the second dog clutch 32, so that the two-wheel drive state is switched to the four-wheel drive state.

As described above, according to the four-wheel drive vehicle 10 of this example, when a switching request is made for switching the first dog clutch 24 from the first non-meshing state in which the first meshing teeth 50a of the first movable sleeve 50 are not meshed with the first meshing teeth 42c of the first ring gear 42 to the first meshing state in which the first meshing teeth 50a are meshed with the first meshing teeth 42c, the electronic control device 100 calculates the first rotation speed difference Vs1 between the first meshing teeth 50a and the first meshing teeth 42c in the case that the rear wheel 16L is coupled to the central axle 98 by the left control coupling 34L, and the second rotation speed difference Vs2 between the first meshing teeth 50a and the first meshing teeth 42c in the case that the rear wheel 16R is coupled to the central axle 98 by the right control coupling 34R; if at least one rotation speed difference Vs of the calculated first and second rotation speed differences Vs1, Vs2 is within the preset switchable region Sok, the electronic control device 100 couples the rear wheel 16L or 16R resulting in the rotation speed difference Vs within the switchable region Sok to the central axle 98 by the corresponding control coupling 34L or 34R to switch the first dog clutch 24 from the first non-meshing state to the first meshing state; and if neither the calculated first nor second rotation speed difference Vs1, Vs2 is within the switchable region Sok, the electronic control device 100 prohibits switching of the first dog clutch 24 from the first non-meshing state to the first meshing state. Therefore, when the first dog clutch 24 is switched from the first non-meshing state to the first meshing state, the rear wheel 16L or 16R resulting in the rotation speed difference Vs between the first meshing teeth 50a of the first movable sleeve 50 and the first meshing teeth 42c of the first ring gear 42 within the switchable region Sok can be coupled to the central axle 98 by the corresponding control coupling 34L or 34R, so that when the first meshing teeth 50a are meshed with the first meshing teeth 42c, the rotation speed difference Vs between the first meshing teeth 50a and the first meshing teeth 42c is within the switchable region Sok and is the rotation speed difference Vs allowing smooth switching of the first dog clutch 24 from the first non-meshing state to the first meshing state. As a result, even when a speed difference exists between wheels during running, for example, when the vehicle 10 is turning or when the vehicle 10 is equipped with tires different in diameter between the front wheels 14L, 14R and the rear wheels 16L, 16R, the first dog clutch 24 can smoothly be switched from the first non-meshing state to the first meshing state.

According to the four-wheel drive vehicle 10 of this example, when both the first rotation speed difference Vs1 and the second rotation speed difference Vs2 are within the switchable region Sok, the electronic control device 100 selects the first rotation speed difference Vs1 or the second rotation speed difference Vs2 so that a smaller difference is selected out of the difference S1 between the ideal rotation speed difference Vst defined in advance and the first rotation speed difference Vs1 and the difference S2 between the ideal rotation speed difference Vst and the second rotation speed difference Vs2 and couples the rear wheel 16L or 16R resulting in the selected rotation speed difference Vs to the central axle 98 by the corresponding control coupling 34L or 34R. Therefore, the rear wheel 16L or 16R resulting in the rotation speed difference Vs between the first meshing teeth 50a of the first movable sleeve 50 and the first meshing teeth 42c of the first ring gear 42 relatively close to the ideal rotation speed difference Vst can be coupled to the central axle 98 by the corresponding control coupling 34L or 34R, so that the first dog clutch 24 can smoothly be switched from the first non-meshing state to the first meshing state, particularly during turning running of the vehicle 10.

According to the four-wheel drive vehicle 10 of this example, even if neither the first rotation speed difference Vs1 nor the second rotation speed difference Vs2 is within the switchable region Sok and it is determined that the first dog clutch 24 needs to be switched from the first non-meshing state to the first meshing state, the electronic control device 100 couples the rear wheel 16L or 16R resulting in the larger rotation speed difference Vs out of the first rotation speed difference Vs1 and the second rotation speed difference Vs2 to the central axle 98 by the corresponding control coupling 34L or 34R. Therefore, if the first dog clutch 24 needs to be switched from the first non-meshing state to the first meshing state, the first dog clutch 24 can be switched from the first non-meshing state to the first meshing state.

According to the four-wheel drive vehicle 10 of this example, when the rear wheel 16L or 16R is coupled to the central axle 98 by the corresponding control coupling 34L or 34L, the electronic control device 100 controls the first dog clutch 24 to connect the power transmission path between the engine 12 and the propeller shaft 28 in a power transmittable manner and controls the second dog clutch 32 to connect the power transmission path between the propeller shaft 28 and the central axle 98 in a power transmittable manner. Therefore, even when a speed difference exists between wheels during running, for example, when the vehicle 10 is turning or when the vehicle 10 is equipped with tires different in diameter between the front wheels 14L, 14R and the rear wheels 16L, 16R, the four-wheel drive vehicle 10 can smoothly be switched from the two-wheel drive state to the four-wheel drive state.

According to the four-wheel drive vehicle 10 of this example, the second dog clutch 32 includes the synchronizing mechanism 116 synchronizing the rotation speed of the second ring gear 92 coupled to the propeller shaft 28 in a power transmittable manner and the rotation speed of the second movable sleeve 104 coupled to the central axle 98 in a power transmittable manner, and when the rear wheel 16L or 16R is coupled to the central axle 98 by the corresponding control coupling 34L or 34R and the rotation speed of the second ring gear 92 is synchronized with the rotation speed of the second movable sleeve 104 by the synchronizing mechanism 116, the electronic control device 100 switches the first dog clutch 24 from the first non-meshing state to the first meshing state. Therefore, even when a speed difference exists between wheels during running, for example, when the vehicle 10 is turning or when the vehicle 10 is equipped with tires different in diameter between the front wheels 14L, 14R and the rear wheels 16L, 16R, the four-wheel drive vehicle 10 can smoothly be switched from the two-wheel drive state to the four-wheel drive state.

Other examples of the present invention will be described with reference to the drawings. In the following description, portions common to the examples are denoted by the same reference numerals and will not be described.

Second Example

Figure 12:
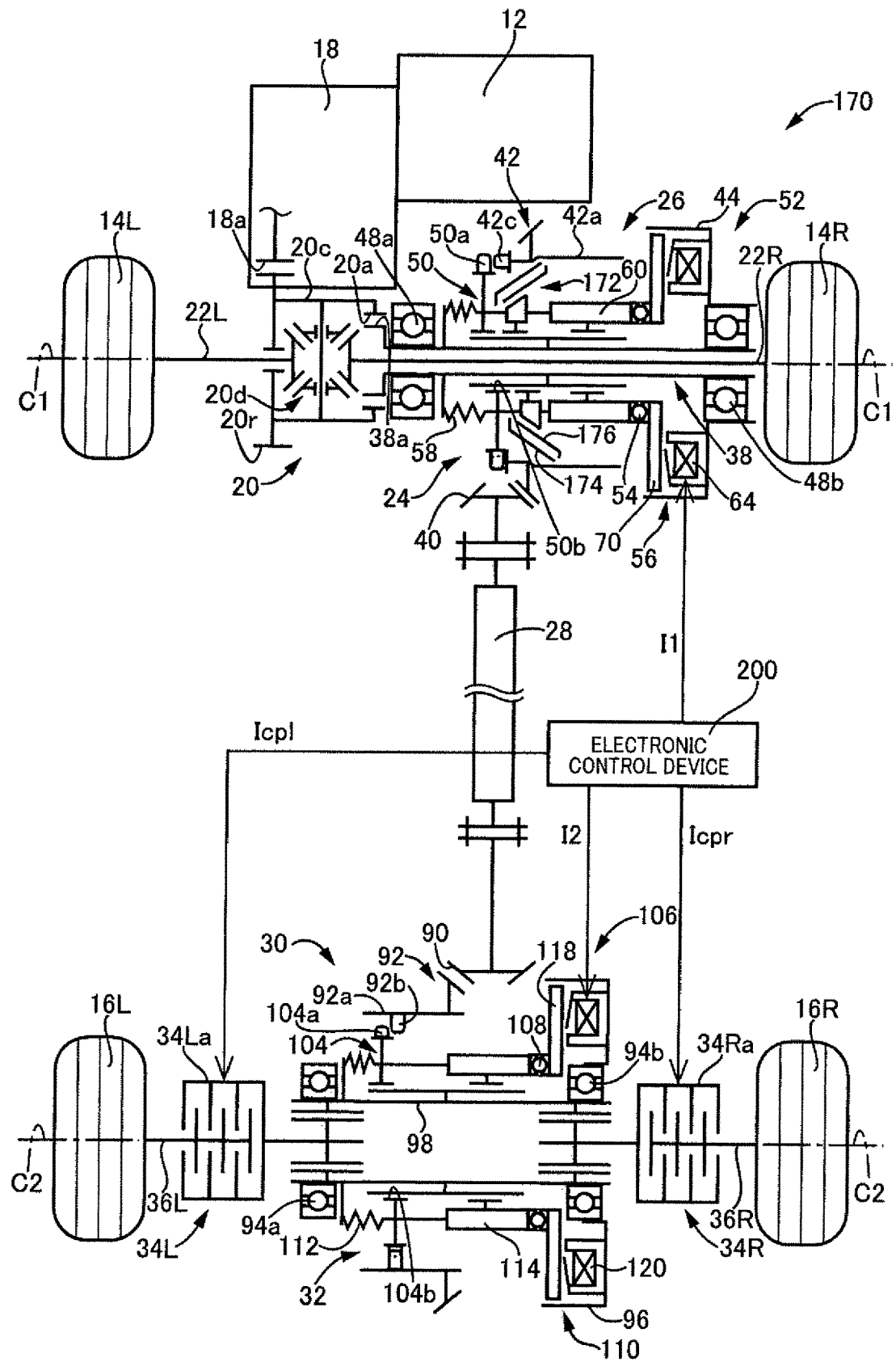
FIG. 12 is a diagram showing another example, i.e., a second example, of the present invention and is a schematic for schematically explaining a configuration of a four-wheel drive vehicle.

FIG. 12 shows a four-wheel drive vehicle 170, i.e., another example of the present invention. The four-wheel drive vehicle 170 of this example is substantially the same as the four-wheel drive vehicle 10 described above except that the first dog clutch (second clutch) 24 includes a synchronizing mechanism (second synchronizing mechanism) 172 and that the synchronizing mechanism 116 is not provided with the second dog clutch (dog clutch) 32. An electronic control device (control device) 200 of the four-wheel drive vehicle 170 of this example is substantially the same as the electronic control device 100 of the four-wheel drive vehicle 10 described above except that the function of the coupling control portion 162 is partially changed, i.e., functions of a rotation speed difference calculating portion 162d, a 4WD switching determining portion 162e, and a wheel selecting portion 162f are changed, that the function of the first dog clutch control portion 164 is partially changed, i.e., a synchronization completion determining portion 164b is added to the first dog clutch control portion 164, and that the function of the second dog clutch control portion 166 is partially changed, i.e., the synchronization completion determining portion 166a is eliminated from the second dog clutch control portion 166.

Figure 13:
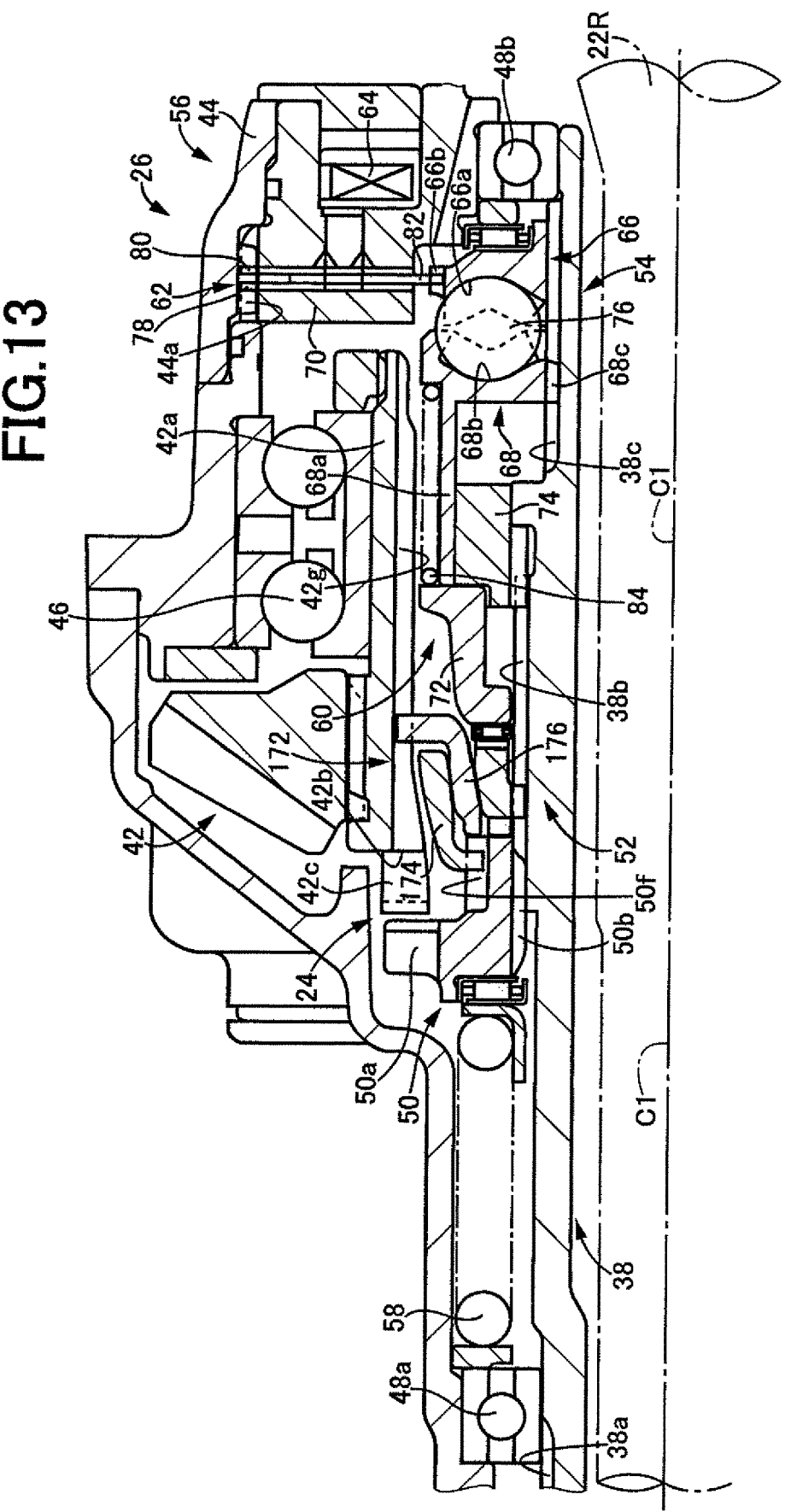
FIG. 13 is a cross-sectional view for explaining a configuration of a transfer disposed on the four-wheel drive vehicle of FIG. 12.
Figure 14:
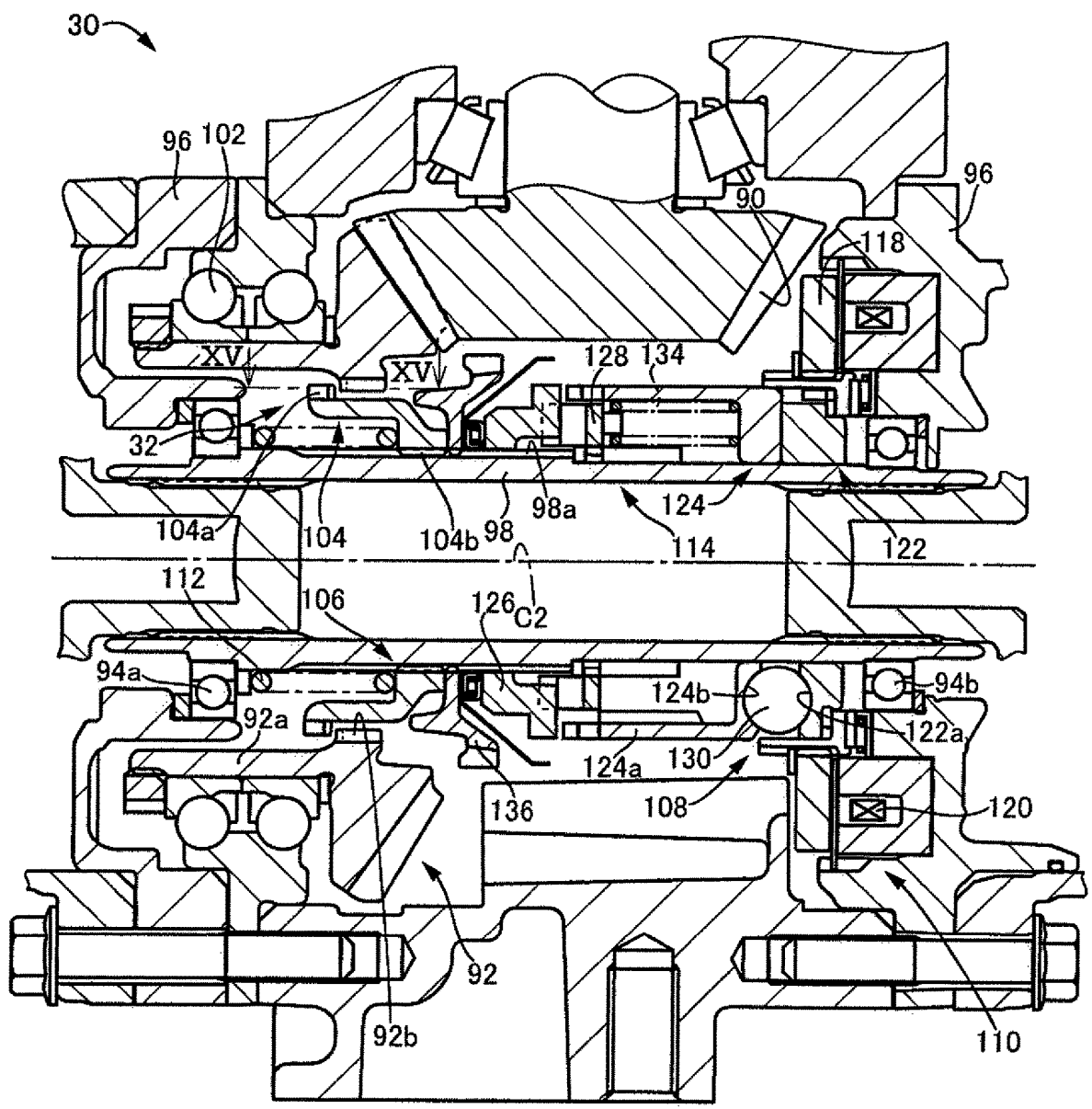
FIG. 14 is a cross-sectional view for explaining a configuration of a portion of a rear-wheel drive power distributing unit disposed on the four-wheel drive vehicle of FIG. 12.

As shown in FIG. 13, the synchronizing mechanism 172 includes a first friction engagement member 174 meshed with outer circumferential spline teeth 50f formed on the first movable sleeve (third rotating member) 50 relatively non-rotatably with respect to the first movable sleeve 50 and movably in the first rotation axis C1 direction with respect to the first movable sleeve 50, and a second friction engagement member 176 meshed with inner circumferential spline teeth 42g formed on the first ring gear (fourth rotating member) 42 relatively non-rotatably with respect to the first ring gear 42 and movably in the first rotation axis C1 direction with respect to the first ring gear 42. In the synchronizing mechanism 172 configured as described above, in a case where the first movable sleeve 50 is at the first non-meshing position while the input shaft 38 is rotating, when the first drive current I1 (A) is supplied to the first electromagnetic coil 64 of the first actuator 56 and the first movable sleeve 50 is moved toward the bearing 48a beyond the first non-meshing position where the projection 72a of the second piston 72 is latched on the latching teeth 74a of the holder 74 against the urging force of the first spring 58, the first friction engagement member 174 coupled to the first movable sleeve 50 in a power transmittable manner is frictionally engaged with the second friction engagement member 176 coupled to the first ring gear 42 in a power transmittable manner, so that the rotation speed of the first movable sleeve 50 is synchronized with the rotation speed of the first ring gear 42. Additionally, as shown in FIG. 14, the first friction engagement member 138 and the second friction engagement member 140 of the synchronizing mechanism 116 are removed from the second dog clutch 32, and the second dog clutch 32 does not have the function of the synchronizing mechanism 116 described above synchronizing a rotation speed of the second meshing teeth (sub-drive-wheel-side meshing teeth) 104a of the second movable sleeve 104 with a rotation speed of the second meshing teeth (drive-power-source-side meshing teeth) 92b of the second ring gear 92.

Figure 15:
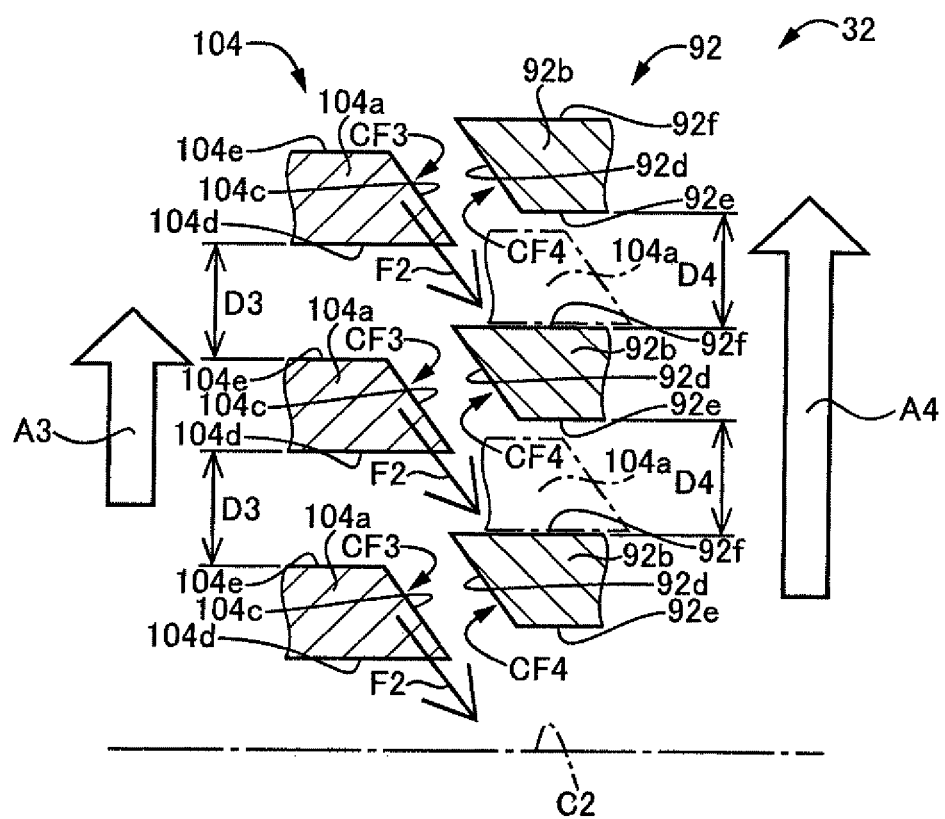
FIG. 15 is a cross-sectional view of the transfer taken along a line XV-XV of FIG. 14.

FIG. 15 is a diagram showing a state in which, in the case of switching from the two-wheel drive state with each of the first dog clutch 24 and the second dog clutch 32 released to the four-wheel drive state by engaging each of the first dog clutch 24 and the second dog clutch 32, the synchronizing mechanism 172 of the first dog clutch 24 is operated to substantially synchronize the rotation speed of the first movable sleeve 50 with the rotation speed of the first ring gear 42 so that the second meshing teeth 104a of the second movable sleeve 104 are meshed with the second meshing teeth 92b of the second ring gear 92. In FIG. 15, when the two-wheel drive state is switched to the four-wheel drive state, the central axle 98 is coupled to either one of the left and right rear wheels 16L, 16R by the corresponding control coupling 34L, 34R. FIG. 15 is a diagram showing a state of the four-wheel drive vehicle 170 during forward running. The second meshing teeth 92b of the second ring gear 92 are coupled to the engine 12 in a power transmittable manner via, for example, the propeller shaft 28, while the synchronizing mechanism 172 disposed on the first dog clutch 24 is operated or the first dog clutch 24 is engaged, and the second meshing teeth 104a of the second movable sleeve 104 are coupled to the rear wheel 16L or 16R in a power transmittable manner via, for example, the central axle 98, while the left control coupling 34L or the right control coupling 34R is engaged.

As shown in FIG. 15, the multiple second meshing teeth 104a formed on the second movable sleeve 104 are formed on an outer circumferential portion of the cylindrical second movable sleeve 104. The multiple second movable sleeve 104 are each formed in an elongated shape in the second rotation axis C2 direction and are formed in the circumferential direction of the cylindrical second movable sleeve 104 such that intervals D3 between the respective second meshing teeth 104a become constant. The intervals D3 are set such that the multiple second meshing teeth 104a can enter spaces between the multiple second meshing teeth 92b formed on the second ring gear 92.

As shown in FIG. 15, at the time of switching from the two-wheel drive state to the four-wheel drive state, the rotation speed of the second meshing teeth 104a of the second movable sleeve 104 is smaller than the rotation speed of the second meshing teeth 92b of the second ring gear 92, and the second meshing teeth 104a of the second movable sleeve 104 and the second meshing teeth 92b of the second ring gear 92 rotate in directions of arrows A3, A4 around the second rotation axis C2, i.e., both rotate in the same direction. Therefore, when the second movable sleeve 104 is moved from the second non-meshing position to the second meshing position by the second movement mechanism 106, i.e., the second meshing teeth 104a of the second movable sleeve 104 are moved in a direction toward the second meshing teeth 92b of the second ring gear 92 by the second movement mechanism 106, the second meshing teeth 104a of the second movable sleeve 104 move relative to the second meshing teeth 92b of the second ring gear 92 in a direction of an arrow F2. In this example, as in the first example described above, the first ring gear 42, the second ring gear 92, etc. are designed such that, while the propeller shaft 28 is rotating, the rotation speed of the first ring gear 42 is reduced as compared to the rotation speed of the second ring gear 92, or specifically, the difference, i.e., the front-rear ring gear ratio difference G, is generated between the gear ratio between the driven pinion 40 disposed on the propeller shaft 28 and the first ring gear 42 and the gear ratio between the drive pinion 90 disposed on the propeller shaft 28 and the second ring gear 92. Therefore, at the time of switching from the two-wheel drive state to the four-wheel drive state, the rotation speed of the second meshing teeth 104a of the second movable sleeve 104 easily becomes slower than the rotation speed of the second meshing teeth 92b of the second ring gear 92.

As shown in FIG. 15, the multiple second meshing teeth 104a formed on the second movable sleeve 104 are each provided with a chamfered portion, i.e., a one-sided chamfer CF3, inclined in one direction over the entire face width of the second meshing teeth 104a, on end surfaces of the second meshing teeth 104a facing toward the second meshing teeth 92b and serving as abutting surfaces abutting on the second meshing teeth 92b. Since the second meshing teeth 104a of the second movable sleeve 104 are provided with the one-sided chamfers CF3, the end surfaces of the second meshing teeth 104a facing toward the second meshing teeth 92b and serving as the abutting surfaces abutting on the second meshing teeth 92b have a second inclined surface 104c formed to incline such that the length of the second meshing teeth 104a in the second rotation axis C2 direction decreases with respect to the direction of the arrow A3 in which the second meshing teeth 104a rotate at the time of forward running of the four-wheel drive vehicle 170. The multiple second meshing teeth 104a each have parallel surfaces 104d, 104e formed substantially parallel to the second rotation axis C2 on both sides of the second meshing teeth 104a in the direction of the arrow A3.

As shown in FIG. 15, the multiple second meshing teeth 92b of the second ring gear 92 are formed on an inner circumferential portion of the second ring gear 92. The multiple second meshing teeth 92b are each formed in an elongated shape in the second rotation axis C2 direction and are respectively formed in the circumferential direction of the second ring gear 92 such that intervals D4 between the second meshing teeth 92b become constant. The intervals D4 are set such that the multiple second meshing teeth 104a formed on the second movable sleeve 104 can enter spaces between the multiple second meshing teeth 92b.

As shown in FIG. 15, the multiple second meshing teeth 92b formed on the second ring gear 92 are each provided with a chamfered portion, i.e., a one-sided chamfer CF4, inclined in one direction over the entire face width of the second meshing teeth 92b, on end surfaces of the second meshing teeth 92b facing toward the second meshing teeth 104a and serving as abutting surfaces abutting on the second meshing teeth 104a. Since the second meshing teeth 92b of the second ring gear 92 are provided with the one-sided chamfers CF4, the end surfaces of the second meshing teeth 92b facing toward the second meshing teeth 104a and serving as the abutting surfaces abutting on the second meshing teeth 104a have a second inclined surface 92d formed to incline such that the length of the second meshing teeth 92b in the second rotation axis C2 direction increases with respect to the directions of the arrows A3, A4. The multiple second meshing teeth 92b each have parallel surfaces 92e, 92f formed substantially parallel to the second rotation axis C2 on both sides of the second meshing teeth 92b in the direction of the arrow A3.

Therefore, as shown in FIG. 15, the second meshing teeth 92b formed on the second ring gear 92 and the second meshing teeth 104a formed on the second movable sleeve 104 are provided with the one-sided chamfers CF3, CF4 such that the second meshing teeth 92b are meshed with the second meshing teeth 104a when the rotation speed of the second meshing teeth 92b of the second ring gear 92 is greater than the rotation speed of the second meshing teeth 104a of the second movable sleeve 104 in a case where the second meshing teeth 104a are moved by the second movement mechanism 106 in the direction toward the second meshing teeth 92b to cause the end portions of the second meshing teeth 104a on the side of the second meshing teeth 92b to abut on the end portions of the second meshing teeth 92b facing toward the second meshing teeth 104a.

Figure 16:
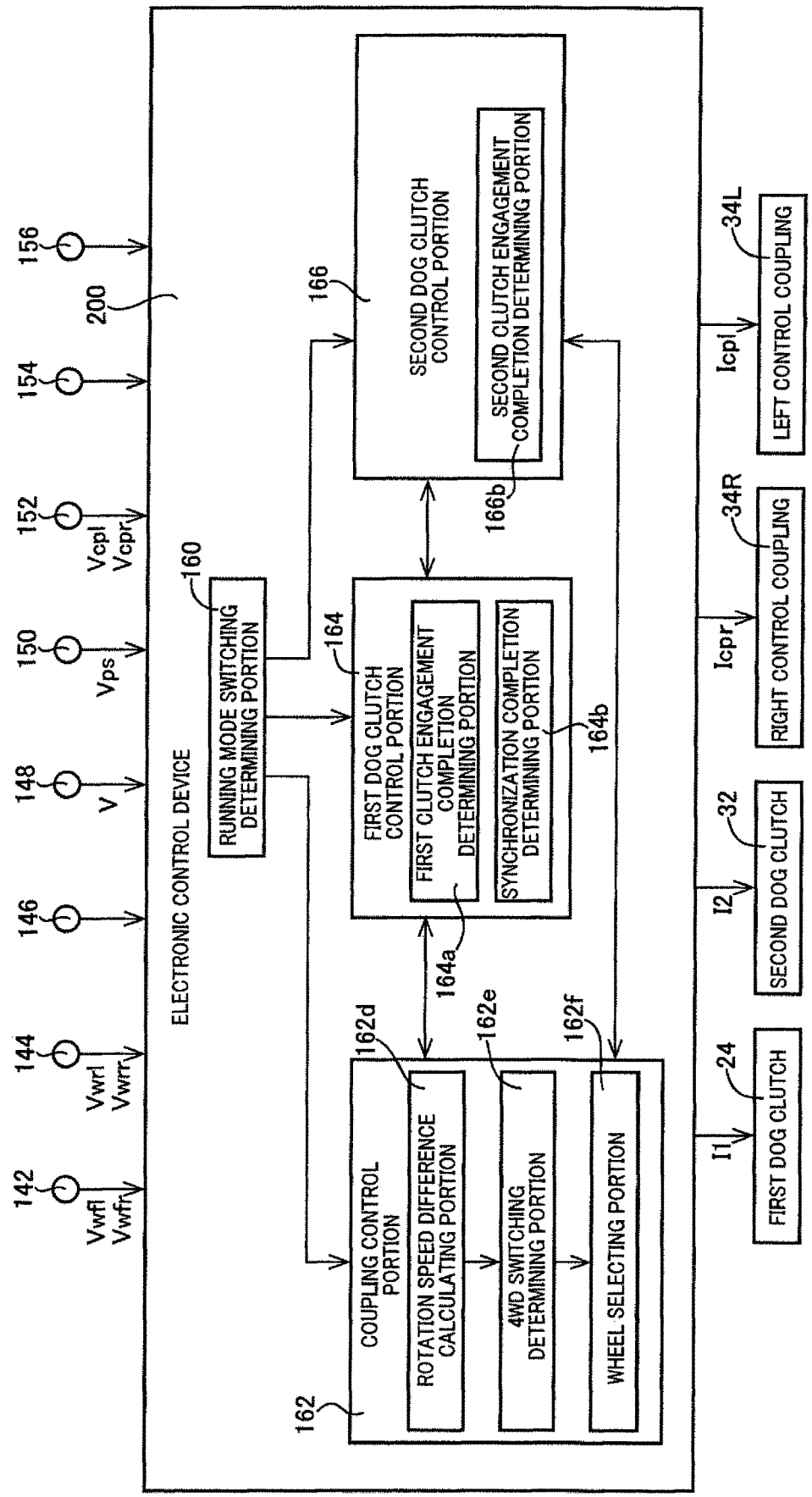
FIG. 16 is a functional block diagram for explaining a main portion of the control function included in an electronic control device of the vehicle of FIG. 12.

As shown in FIG. 16, the coupling control portion 162 includes a rotation speed difference calculating portion 162d, a 4WD switching determining portion 162e, and a wheel selecting portion 162f. If the running mode switching determining portion 160 determines that the two-wheel drive running mode is switched to the four-wheel drive running mode, i.e., determines that a switching request is made for switching the second dog clutch 32 from the second non-meshing state to the second meshing state, the rotation speed difference calculating portion 162d calculates a difference (V2rl−V2kl), i.e., a third rotation speed difference (first rotation speed difference) Vs3 (rpm), between a rotation speed V2rl (rpm) of the second meshing teeth 92b of the second ring gear 92 and a rotation speed V2kl (rpm) of the second meshing teeth 104a of the second movable sleeve 104 in the case where the rear wheel 16L is coupled to the central axle 98 by the left control coupling 34L, and a difference (V2rr−V2kr), i.e., a fourth rotation speed difference (second rotation speed difference) Vs4 (rpm), between a rotation speed V2rr (rpm) of the second meshing teeth 92b of the second ring gear 92 and a rotation speed V2kr (rpm) of the second meshing teeth 104a of the second movable sleeve 104 in the case where the rear wheel 16R is coupled to the central axle 98 by the right control coupling 34R.

The rotation speed V2rl of the second meshing teeth 92b and the rotation speed V2rr of the second meshing teeth 92b are calculated from the average rotation speeds Vwfav (rpm) of the front wheels 14L, 14R and the front-rear ring gear ratio difference G set in advance. The rotation speed V2rl and the rotation speed V2rr are the rotation speeds of the second meshing teeth 92b of the second ring gear 92 when the first dog clutch 24 is engaged so that the second meshing teeth 92b of the second ring gear 92 are coupled to the engine 12 in a power transmittable manner. The rotation speed V2kl of the second meshing teeth 104a is obtained from the rotation speed Vwrl (rpm) of the rear wheel 16L detected from the second wheel speed sensor 144 when the running mode switching determining portion 160 determines that the two-wheel drive running mode is switched to the four-wheel drive running mode. The rotation speed V2kr of the second meshing teeth 104a is obtained from the rotation speed Vwrr (rpm) of the rear wheel 16R detected from the second wheel speed sensor 144 when the running mode switching determining portion 160 determines that the two-wheel drive running mode is switched to the four-wheel drive running mode.

When the third rotation speed difference Vs3 and the fourth rotation speed difference Vs4 are calculated by the rotation speed difference calculating portion 162d, the 4WD switching determining portion 162e determines whether the two-wheel drive state can smoothly be switched to the four-wheel drive state, i.e., whether the second dog clutch 32 can smoothly be switched from the second non-meshing state to the second meshing state, based on the calculated third and fourth rotation speed differences Vs3 and Vs4 and the vehicle speed V (km/h) detected from the vehicle speed sensor 148 when the running mode switching determining portion 160 determines that the two-wheel drive running mode is switched to the four-wheel drive running mode. For example, if at least one of a third point P3 obtained from the third rotation speed difference Vs3 (rpm) calculated by the rotation speed difference calculating portion 162d and the vehicle speed V (km/h) detected from the vehicle speed sensor 148 and a fourth point P4 obtained from the fourth rotation speed difference Vs4 (rpm) calculated by the rotation speed difference calculating portion 162d and the vehicle speed V (km/h) detected from the vehicle speed sensor 148 is within the preset switchable region (predetermined range) Sok shown in a map of FIG. 17, the 4WD switching determining portion 162e determines that the two-wheel drive state can smoothly be switched to the four-wheel drive state, i.e., that the second dog clutch 32 can smoothly be switched from the second non-meshing state to the second meshing state. The map shown in FIG. 17 is the same as the map shown in FIG. 7 of the first example described above.

When the 4WD switching determining portion 162e determines that the two-wheel drive state can smoothly be switched to the four-wheel drive state, i.e., that the second dog clutch 32 can smoothly be switched from the second non-meshing state to the second meshing state, the wheel selecting portion 162f selects one control coupling from the left-and-right pair of the left control coupling 34L and the right control coupling 34R to couple corresponding one rear wheel of the left and right paired rear wheels 16L, 16R to the central axle 98. For example, as shown in FIG. 17, if the third point P3 and the fourth point P4 obtained by the 4WD switching determining portion 162e are both within the switchable region Sok, the wheel selecting portion 162f derives the ideal rotation speed difference Vst (rpm) from the vehicle speed V (km/h), for example, V4 (km/h), detected from the vehicle speed sensor 148 and the switching target differential rotation derivation line Lt, selects the fourth point P4 to achieve a smaller difference, i.e., a difference S4, out of a difference S3 (rpm) between the ideal rotation speed difference Vst (rpm) and the third point P3, i.e., the third rotation speed difference Vs3 (rpm), and the difference S4 (rpm) between the ideal rotation speed difference Vst (rpm) and the fourth point P4, i.e., the fourth rotation speed difference Vs4 (rpm), and selects the right control coupling 34R that couples the rear wheel 16R resulting in the fourth point P4 within the switchable region Sok to the central axle 98.

Figure 17:
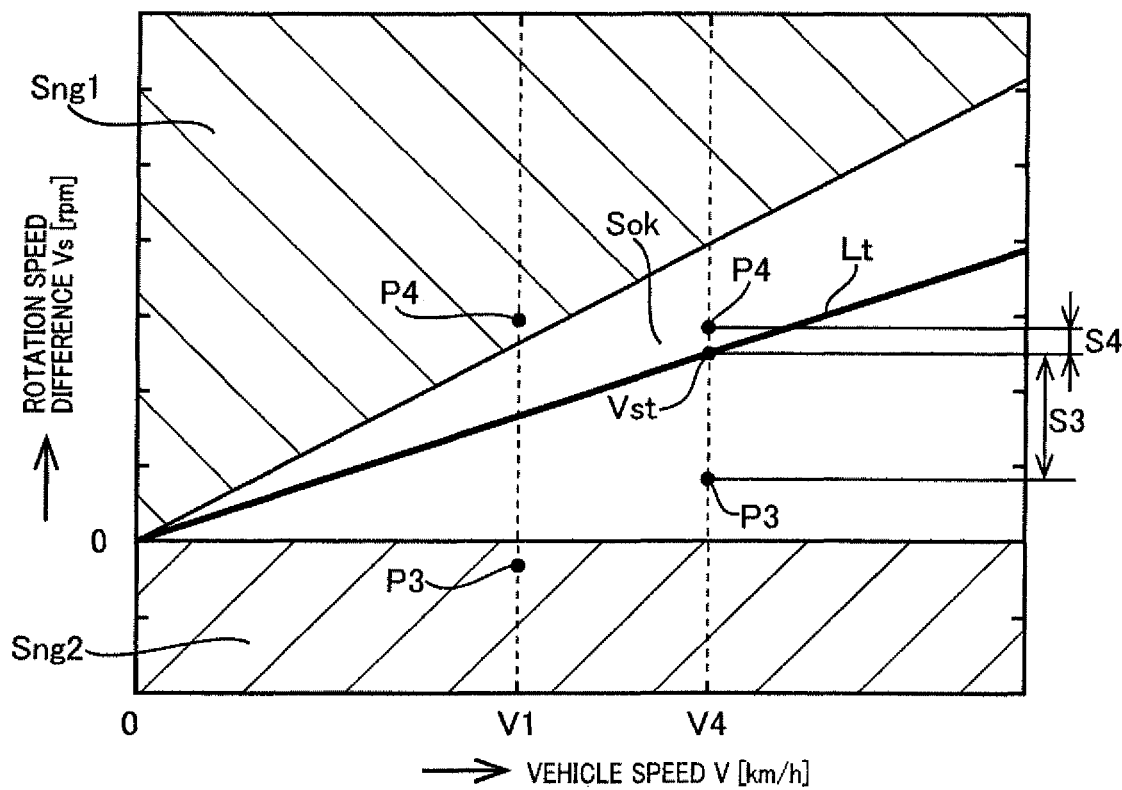
FIG. 17 is a diagram showing an example of a map used in a 4WD switching determining portion and a wheel selecting portion provided in the electronic control device of FIG. 16.

As shown in FIG. 17, if the vehicle speed V (km/h) detected from the vehicle speed sensor 148 is V1 (km/h), for example, and the third point P3 obtained by the 4WD switching determining portion 162e is within the non-switchable region Sng2 while the fourth point P4 obtained by the 4WD switching determining portion 162e is within the large switching sound region Sng1, i.e., even if none of the third point P3 and the fourth point P4 are within the switchable region Sok and the 4WD switching determining portion 162e determines that the two-wheel drive state cannot smoothly be switched to the four-wheel drive state, the wheel selecting portion 162f selects the fourth point P4 resulting in the larger rotation speed difference Vs out of the third point P3, i.e., the third rotation speed difference Vs3, and the fourth point P4, i.e., the fourth rotation speed difference Vs4, thereby selecting the right control coupling 34R that couples the rear wheel 16R resulting in the fourth point P4 within the large switching sound region Sng1 to the central axle 98, for example, when at least one of the front wheels 14L, 14R and the rear wheels 16L, 16R slips and it is determined that the two-wheel drive state needs to be switched to the four-wheel drive state, i.e., the second dog clutch 32 needs to be switched from the second non-meshing state to the second meshing state.

As shown in FIG. 16, the first dog clutch control portion 164 includes the synchronization completion determining portion 164b and the first clutch engagement completion determining portion 164a. When the running mode switching determining portion 160 determines that the two-wheel drive running mode is switched to the four-wheel drive running mode and the coupling drive current is supplied to the electromagnetic coil of either the right control coupling 34R or the left control coupling 34L selected by the wheel selecting portion 162f, the first dog clutch control portion 164 supplies the first drive current I1 (A) to the first electromagnetic coil 64 of the first actuator 56. As a result, the first movable sleeve 50 is moved toward the bearing 48a beyond the first non-meshing position where the projection 72a of the second piston 72 is latched on the latching teeth 74a of the holder 74 against the urging force of the first spring 58, and the rotation speed of the first ring gear 42 is thereby rotationally synchronized with the rotation speed of the first movable sleeve 50 by the synchronizing mechanism 172.

When the first drive current I1 (A) is supplied by the first dog clutch control portion 164, the synchronization completion determining portion 164b determines whether the rotation speed of the first ring gear 42 is synchronized with the rotation speed of the first movable sleeve 50. For example, the synchronization completion determining portion 164b calculates the rotation speed of the first ring gear 42 from the rotation speed Vps (rpm) of the propeller shaft 28 detected by the first rotation speed sensor 150 and the gear ratio between the driven pinion 40 integrally disposed on the propeller shaft 28 and the first ring gear 42, also calculates the rotation speed of the first movable sleeve 50 from the average rotation speed Vwfav (rpm) of the front wheels 14L, 14R detected from the first wheel speed sensor 142, and determines that the rotation speed of the first ring gear 42 is synchronized with the rotation speed of the first movable sleeve 50 when a differential rotation between the calculated rotation speeds of the first ring gear 42 and the first movable sleeve 50 falls within a predetermined synchronization determination range.

When the running mode switching determining portion 160 determines that the two-wheel drive running mode is switched to the four-wheel drive running mode and the coupling drive current is supplied to the electromagnetic coil of either the right control coupling 34R or the left control coupling 34L selected by the wheel selecting portion 162f, the second dog clutch control portion 166 supplies the second drive current I2 (A) to the second electromagnetic coil 120 of the second actuator 110. As a result, the second movable sleeve 104 is moved toward the bearing 94a beyond the second non-meshing position where the projection 126a of the second piston 126 is latched on the latching teeth 128a of the holder 128 against the urging force of the second spring 112.

When the synchronization completion determining portion 164b determines that the rotation speed of the first ring gear 42 is synchronized with the rotation speed of the first movable sleeve 50, the second dog clutch control portion 166 reduces the magnitude of the second drive current I2 (A) supplied to the second electromagnetic coil 120 of the second actuator 110 to stop the supply of the second drive current I2 supplied to the second electromagnetic coil 120. As a result, the second movable sleeve 104 is moved to the second meshing position by the urging force of the second spring 112.

When the second dog clutch control portion 166 reduces the magnitude of the second drive current I2 supplied to the second electromagnetic coil 120 of the second actuator 110, the second clutch engagement completion determining portion 166b determines whether the second dog clutch 32 is completely engaged, i.e., whether the second dog clutch 32 is switched from the second non-meshing state to the second meshing state. For example, when the second position sensor 156 detects that the second movable sleeve 104 is at the second meshing position, the second clutch engagement completion determining portion 166b determines that the second dog clutch 32 is switched from the second non-meshing state to the second meshing state.

When the second clutch engagement completion determining portion 166b determines that the second dog clutch 32 is switched from the second non-meshing position to the second meshing position, the first dog clutch control portion 164 reduces the magnitude of the first drive current I1 (A) supplied to the first electromagnetic coil 64 of the first actuator 56 to stop the supply of the first drive current I1 supplied to the first electromagnetic coil 64. As a result, the first movable sleeve 50 is moved to the first meshing position by the urging force of the first spring 58.

When the first dog clutch control portion 164 reduces the magnitude of the first drive current I1 supplied to the first electromagnetic coil 64 of the first actuator 56, the first clutch engagement completion determining portion 164a determines whether the first dog clutch 24 is completely engaged, i.e., whether the first dog clutch 24 is switched from the first non-meshing state to the first meshing state. For example, when the first position sensor 154 detects that the first movable sleeve 50 is at the first meshing position, the first clutch engagement completion determining portion 164a determines that the first dog clutch 24 is switched from the first non-meshing state to the first meshing state.

When the first clutch engagement completion determining portion 164a determines that the first dog clutch 24 is switched from the first non-meshing state to the first meshing state, the coupling control portion 162 stops the supply of the coupling drive current supplied to either the right control coupling 34R or the left control coupling 34L selected by the wheel selecting portion 162f and subsequently controls the right coupling drive current Icpr (A) supplied to the electromagnetic coil of the right control coupling 34R and the left coupling drive current Icpl (A) supplied to the electromagnetic coil of the left control coupling 34L depending on a vehicle running state.

Figure 18:
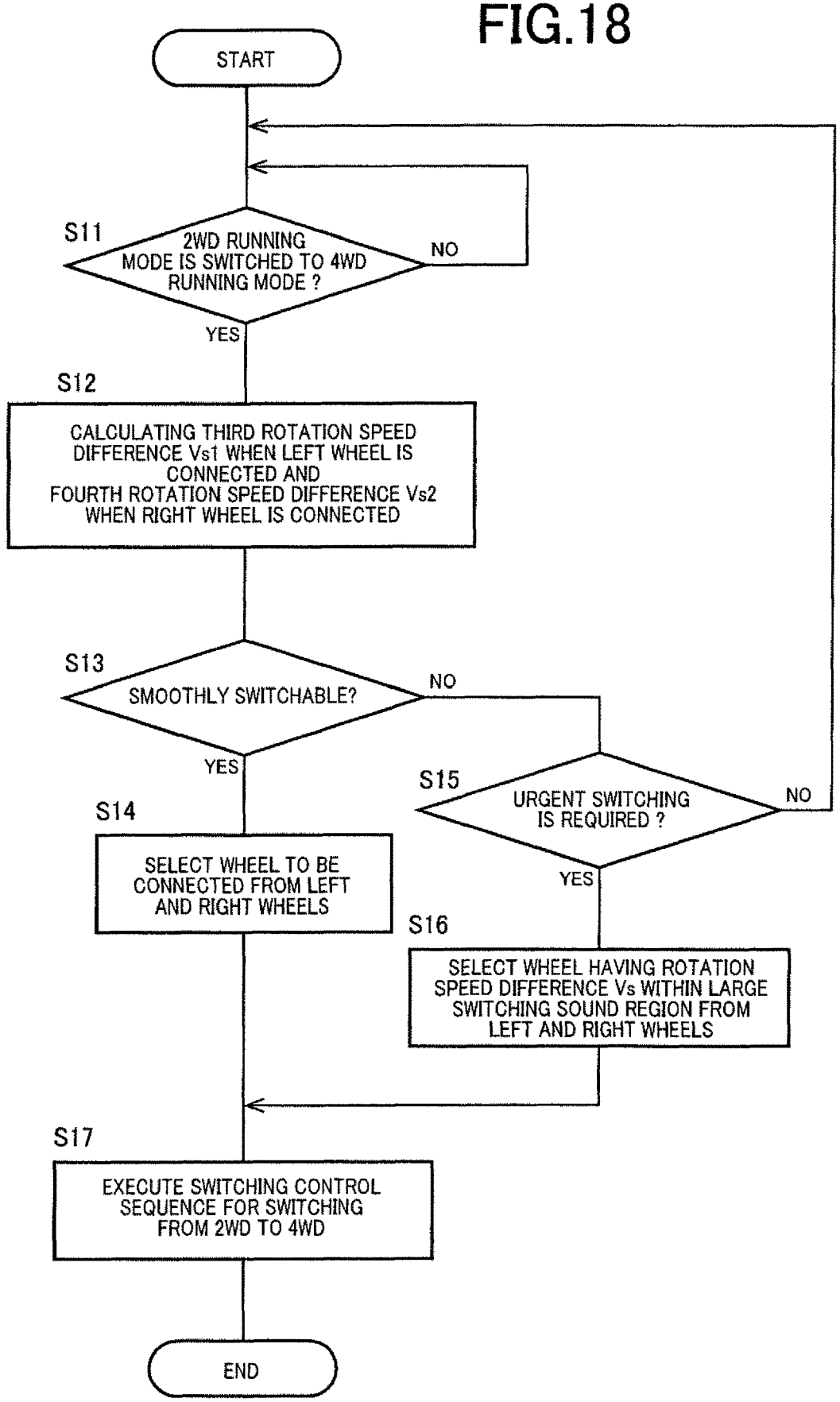
FIG. 18 is a flowchart for explaining an example of an operation of the electronic control device of FIG. 12 configured to switch the vehicle from a two-wheel drive state to a four-wheel drive state while the vehicle performs two-wheel drive running.

FIG. 18 is a flowchart for explaining an example of an operation in the electronic control device 200 to switch the vehicle 170 from the two-wheel drive state during the two-wheel drive running to the four-wheel drive state.

First, at S11 corresponding to the function of the running mode switching determining portion 160, it is determined whether switching is performed from the two-wheel drive running mode in which the two-wheel drive state is implemented to the four-wheel drive running mode in which the four-wheel drive state is implemented. If the determination of S11 is negative, S11 is executed again, and if the determination of S11 is affirmative, S12 corresponding to the function of the rotation speed difference calculating portion 162d is executed. At S12, calculations are made to obtain the third rotation speed difference Vs3, or specifically, the difference between the rotation speed V2rl of the second meshing teeth 92b of the second ring gear 92 and the rotation speed V2kl of the second meshing teeth 104a of the second movable sleeve 104 in the case that the rear wheel 16L, i.e., the left rear wheel, is coupled to the central axle 98, and the fourth rotation speed difference Vs4 (rpm), or specifically, the difference between the rotation speed V2rr of the second meshing teeth 92b of the second ring gear 92 and the rotation speed V2kr of the second meshing teeth 104a of the second movable sleeve 104 in the case that the right rear wheel 16R is coupled to the central axle 98.

At S13 corresponding to the function of the 4WD switching determining portion 162e, it is determined whether the two-wheel drive state can smoothly be switched to the four-wheel drive state, i.e., whether the second dog clutch 32 can smoothly be switched from the second non-meshing state to the second meshing state, based on the third rotation speed difference Vs3 and the fourth rotation speed difference Vs4 calculated at S12 and the vehicle speed V detected from the vehicle speed sensor 148. If the determination of S13 is affirmative, S14 corresponding to the function of the wheel selecting portion 162f is executed, and if the determination of S13 is negative, S15 corresponding to the function of the wheel selecting portion 162f is executed. At S14, the wheel resulting in the rotation speed difference Vs within the switchable range Sok is selected between the left rear wheel 16L and the right rear wheel 16R and the control coupling is selected for coupling the selected wheel to the central axle 98. At S15, it is determined whether the two-wheel drive state needs to be switched to the four-wheel drive state, i.e., the second dog clutch 32 needs to be switched from the second non-meshing state to the second meshing state. If the determination of S15 is negative, this routine is terminated, and if the determination of S15 is affirmative, S16 corresponding to the function of the wheel selecting portion 162f is executed.

At S16, the wheel resulting in the rotation speed difference Vs within the large switching sound region Sng1 is selected between the left rear wheel 16L and the right rear wheel 16R and the control coupling is selected for coupling the selected wheel to the central axle 98. Subsequently, S17 corresponding to the functions of the coupling control portion 162, the first dog clutch control portion 164, the second dog clutch control portion 166, etc. is executed. At S17, the rear wheel selected at S14 or S16 is coupled to the central axle 98 by the corresponding control coupling, and the switching control sequence is executed for switching the vehicle 170 from the two-wheel drive state to the four-wheel drive state.

As described above, according to the four-wheel drive vehicle 170 of this example, when a switching request is made for switching the second dog clutch 32 from the second non-meshing state in which the second meshing teeth 92b of the second ring gear 92 are not meshed with the second meshing teeth 104a of the second movable sleeve 104 to the second meshing state in which the second meshing teeth 92b are meshed with the second meshing teeth 104a, the electronic control device 200 calculates the third rotation speed difference Vs3 between the second meshing teeth 92b and the second meshing teeth 104a in the case that the rear wheel 16L is coupled to the central axle 98 by the left control coupling 34L, and the fourth rotation speed difference Vs4 between the second meshing teeth 92b and the second meshing teeth 104a in the case that the rear wheel 16R is coupled to the central axle 98 by the left control coupling 34R; if at least one rotation speed difference Vs of the calculated third and fourth rotation speed differences Vs3, Vs4 is within the preset switchable region Sok, the electronic control device 200 couples the rear wheel 16L or 16R resulting in the rotation speed difference Vs within the switchable region Sok to the central axle 98 by the corresponding control coupling 34L or 34R to switch the second dog clutch 32 from the second non-meshing state to the second meshing state; and if neither the calculated third nor fourth rotation speed difference Vs3, Vs4 is within the switchable region Sok, the electronic control device 200 prohibits switching of the second dog clutch 32 from the second non-meshing state to the second meshing state. Therefore, when the second dog clutch 32 is switched from the second non-meshing state to the second meshing state, the rear wheel 16L or 16R resulting in the rotation speed difference Vs between the second meshing teeth 92b of the second ring gear 92 and the second meshing teeth 104a of the second movable sleeve 104 within the switchable region Sok can be coupled to the central axle 98 by the corresponding control coupling 34L or 34R, so that when the second meshing teeth 92b are meshed with the second meshing teeth 104a, the rotation speed difference Vs between the second meshing teeth 92b and the second meshing teeth 104a is within the switchable region Sok and is the rotation speed difference Vs allowing smooth switching of the second dog clutch 32 from the second non-meshing state to the second meshing state. As a result, even when a speed difference exists between wheels during running, for example, when the vehicle 170 is turning or when the vehicle 170 is equipped with tires different in diameter between the front wheels 14L, 14R and the rear wheels 16L, 16R, the second dog clutch 32 can smoothly be switched from the second non-meshing state to the second meshing state.

According to the four-wheel drive vehicle 170 of this example, when both the third rotation speed difference Vs3 and the fourth rotation speed difference Vs4 are within the switchable region Sok, the electronic control device 200 selects the third rotation speed difference Vs3 or the fourth rotation speed difference Vs4 so that a smaller difference is selected out of the difference S3 between the ideal rotation speed difference Vst defined in advance and the third rotation speed difference Vs3 and the difference S4 between the ideal rotation speed difference Vst and the fourth rotation speed difference Vs4 and couples the rear wheel 16L or 16R resulting in the selected rotation speed difference Vs to the central axle 98 by the corresponding control coupling 34L or 34R. Therefore, the rear wheel 16L or 16R resulting in the rotation speed difference Vs between the second meshing teeth 92b of the second ring gear 92 and the second meshing teeth 104a of the second movable sleeve 104 relatively close to the ideal rotation speed difference Vst can be coupled to the central axle 98 by the corresponding control coupling 34L or 34R, so that the second dog clutch 32 can smoothly be switched from the second non-meshing state to the second meshing state, particularly during turning running of the vehicle 170.

According to the four-wheel drive vehicle 170 of this example, even if neither the third rotation speed difference Vs3 nor the fourth rotation speed difference Vs4 is within the switchable region Sok and it is determined that the second dog clutch 32 needs to be switched from the second non-meshing state to the second meshing state, the electronic control device 200 couples the rear wheel 16L or 16R resulting in the larger rotation speed difference Vs out of the third rotation speed difference Vs3 and the fourth rotation speed difference Vs4 to the central axle 98 by the corresponding control coupling 34L or 34R. Therefore, if the second dog clutch 32 needs to be switched from the second non-meshing state to the second meshing state, the second dog clutch 32 can be switched from the second non-meshing state to the second meshing state.

According to the four-wheel drive vehicle 170 of this example, when the rear wheel 16L or 16R is coupled to the central axle 98 by the corresponding control coupling 34L or 34L, the electronic control device 200 controls the second dog clutch 32 to connect the power transmission path between the propeller shaft 28 and the central axle 98 in a power transmittable manner and controls the first dog clutch 24 to connect the power transmission path between the engine 12 and the propeller shaft 28 in a power transmittable manner. Therefore, even when a speed difference exists between wheels during running, for example, when the vehicle 170 is turning or when the vehicle 170 is equipped with tires different in diameter between the front wheels 14L, 14R and the rear wheels 16L, 16R, the four-wheel drive vehicle 170 can smoothly be switched from the two-wheel drive state to the four-wheel drive state.

According to the four-wheel drive vehicle 170 of this example, the first dog clutch 24 includes the synchronizing mechanism 172 synchronizing the rotation speed of the first movable sleeve 50 coupled to the engine 12 in a power transmittable manner and the rotation speed of the first ring gear 42 coupled to the propeller shaft 28 in a power transmittable manner, and when the rear wheel 16L or 16R is coupled to the central axle 98 by the corresponding control coupling 34L or 34R and the rotation speed of the first movable sleeve 50 is synchronized with the rotation speed of the first ring gear 42 by the synchronizing mechanism 172, the electronic control device 200 switches the second dog clutch 32 from the second non-meshing state to the second meshing state. Therefore, even when a speed difference exists between wheels during running, for example, when the vehicle 170 is turning or when the vehicle 170 is equipped with tires different in diameter between the front wheels 14L, 14R and the rear wheels 16L, 16R, the four-wheel drive vehicle 170 can smoothly be switched from the two-wheel drive state to the four-wheel drive state.

Third Example

A four-wheel drive vehicle 180 of this example is substantially the same as the four-wheel drive vehicle 10 of the first example described above except that the second dog clutch 32 is not included. An electronic control device (control device) 210 of the four-wheel drive vehicle 180 of this example is substantially the same as the electronic control device 100 of the four-wheel drive vehicle 10 of the first example described above except that the function of the first dog clutch control portion 164 is partially changed, i.e., a synchronization completion determining portion 164c is added to the first dog clutch control portion 164 and that the second dog clutch control portion 166 is eliminated.

Figure 19:
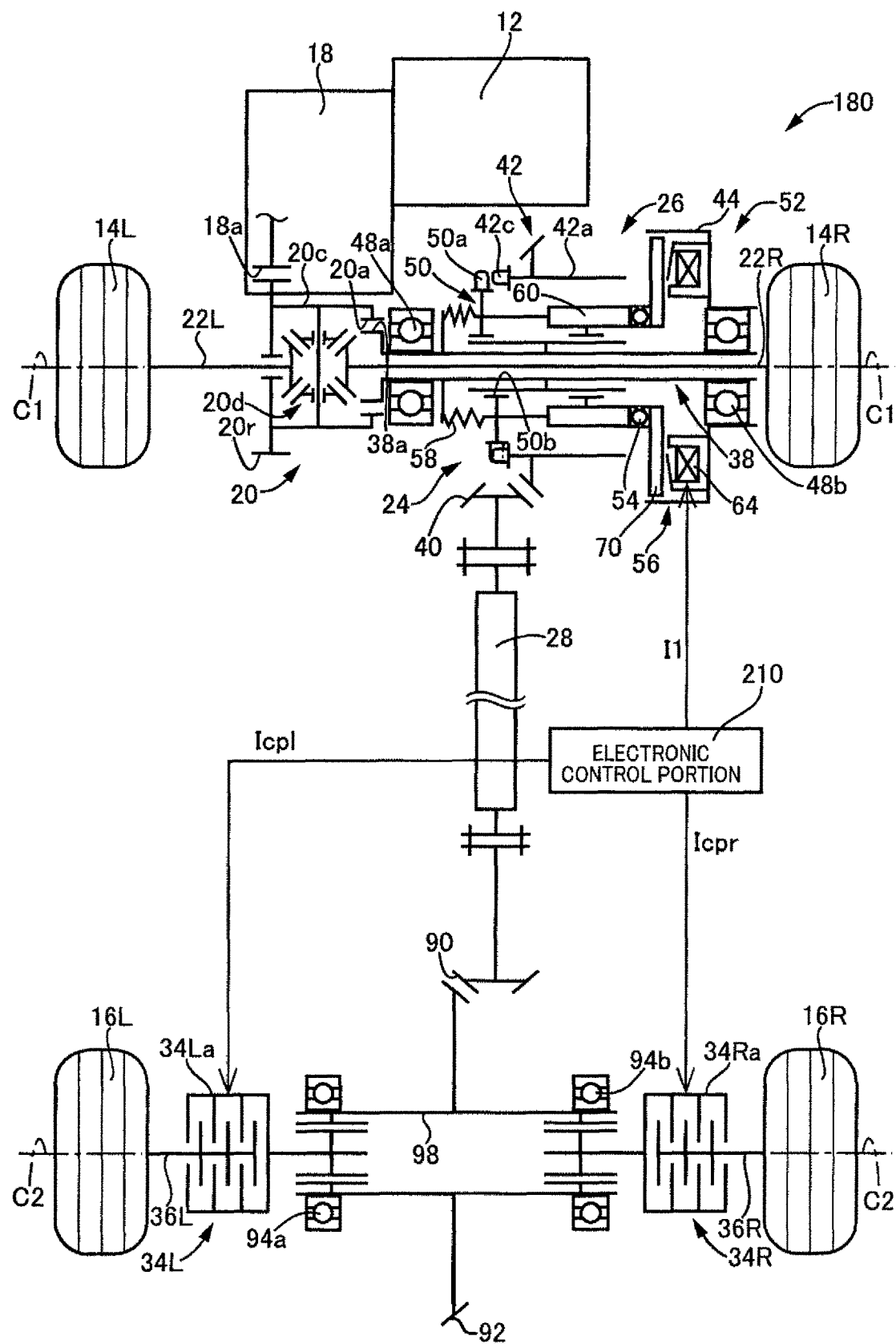
FIG. 19 is a diagram showing still another example, i.e., a third example, of the present invention and is a schematic for schematically explaining a configuration of a four-wheel drive vehicle.

As shown in FIG. 19, in the four-wheel drive vehicle 180, the second dog clutch 32 is removed, and the second ring gear 92 is integrally fixed to the central axle 98. In the four-wheel drive vehicle 180 configured as described above, for example, when the two-wheel drive running mode is selected by the electronic control device 210 in the four-wheel drive state in which the first dog clutch 24 is engaged and the left control coupling 34L and the right control coupling 34R are engaged, the first movement mechanism 52 moves the first movable sleeve 50 from the first meshing position to the first non-meshing position to release the first dog clutch 24, and the left control coupling 34L and the right control coupling 34R disconnect the power transmission path between the rear wheel 16L and the central axle 98 and the power transmission path between the rear wheel 16R and the central axle 98 to achieve the disconnect state in which the propeller shaft 28 is disconnected from each of the engine 12 and the pair of the left and right rear wheels 16L, 16R. When the four-wheel drive running mode is selected by the electronic control device 210 from the disconnect state, the left control coupling 34L and the right control coupling 34R connect the power transmission path between the rear wheel 16L and the central axle 98 and the power transmission path between the rear wheel 16R and the central axle 98, and the first movement mechanism 52 moves the first movable sleeve 50 from the first non-meshing position to the first meshing position to engage the first dog clutch 24. Therefore, the four-wheel drive vehicle 180 of this example is a four-wheel drive vehicle with a disconnect function of disconnecting from the engine 12 and the pair of the left and right rear wheels 16L, 16R in the two-wheel drive state, while the propeller shaft 28 is used to transmit the drive power to the pair of left and right rear wheels 16L, 16R in the four-wheel drive state.

Figure 20:
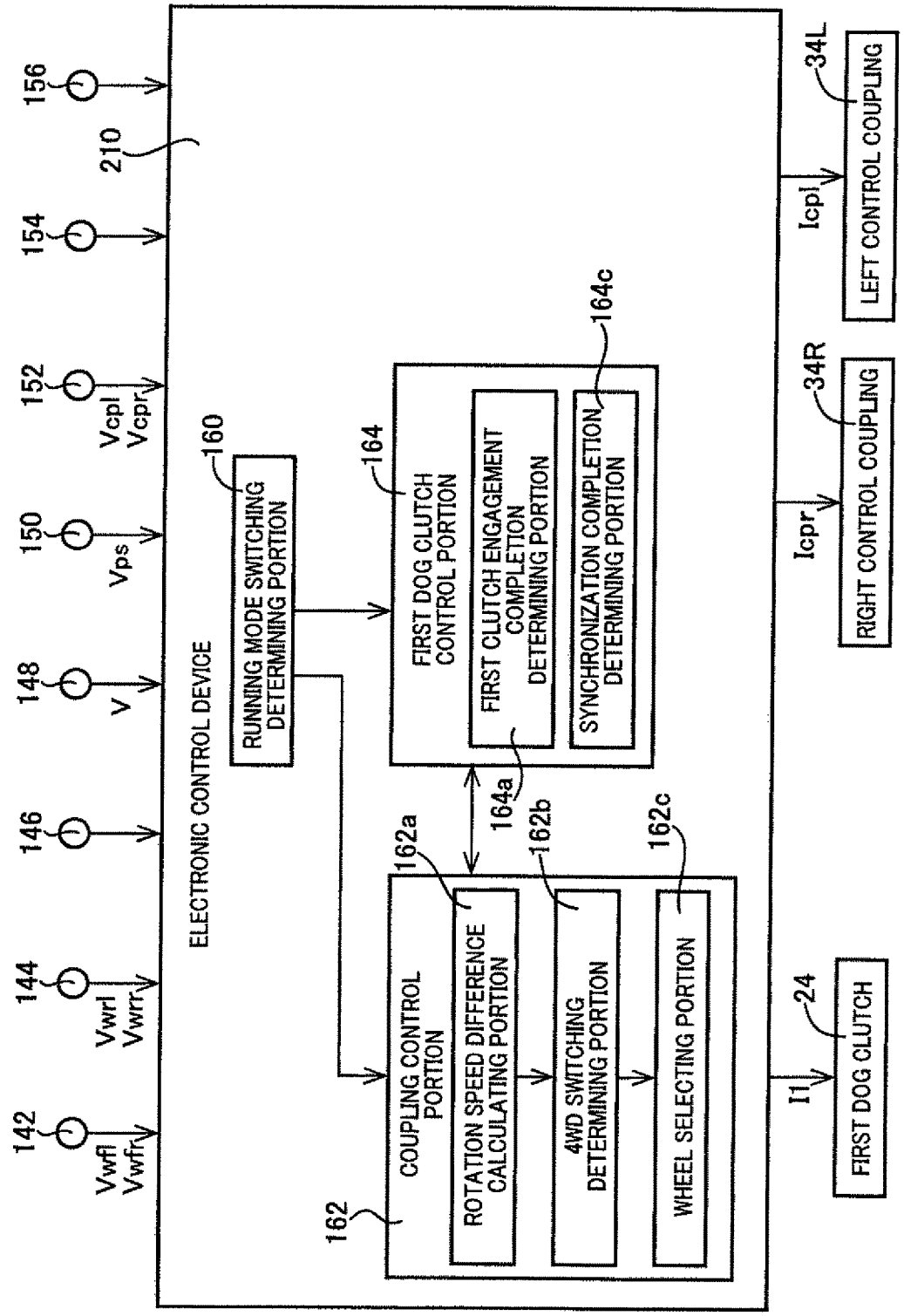
FIG. 20 is a functional block diagram for explaining a main portion of the control function included in an electronic control device of the vehicle of FIG. 19.

As shown in FIG. 20, the first dog clutch control portion 164 includes the first clutch engagement completion determining portion 164a and the synchronization completion determining portion 164c. When the running mode switching determining portion 160 determines that the two-wheel drive running mode is switched to the four-wheel drive running mode and the coupling drive current is supplied to the electromagnetic coil of either the right control coupling 34R or the left control coupling 34L selected by the wheel selecting portion 162c, the first dog clutch control portion 164 supplies the first drive current I1 (A) to the first electromagnetic coil 64 of the first actuator 56. As a result, the first movable sleeve 50 is moved toward the bearing 48a beyond the first non-meshing position where the projection 72a of the second piston 72 is latched on the latching teeth 74a of the holder 74 against the urging force of the first spring 58.

When the first drive current I1 (A) is supplied by the first dog clutch control portion 164, the synchronization completion determining portion 164c determines whether the rotation speed of the central axle 98 is synchronized with the rotation speed of the rear wheel 16L or 16R coupled by the left control coupling 34L or the right control coupling 34R selected by the wheel selecting portion 162c. For example, the synchronization completion determining portion 164c calculates the rotation speed of the central axle 98 from the rotation speeds Vcpl, Vcpr (rpm) of the coupling covers 34La, 34Ra detected by the second rotation speed sensor 152, and also calculates the rotation speed of the rear wheel 16L or the rear wheel 16R coupled by the left control coupling 34L or the right control coupling 34R selected by the wheel selecting portion 162c from the rotation speeds Vwrl, Vwrr of the rear wheels 16L, 16R detected by the second wheel speed sensor 144, and determines that the rotation speed of the central axle 98 is synchronized with the rotation speed of the rear wheel 16L or the rear wheel 16R coupled by the left control coupling 34L or the right control coupling 34R selected by the wheel selecting portion 162c when a differential rotation falls within a predetermined synchronization determination range between the calculated rotation speeds of the central axle 98 and the rear wheel 16L or the rear wheel 16R coupled by the left control coupling 34L or the right control coupling 34R selected by the wheel selecting portion 162c.

When the synchronization completion determining portion 164c determines that the synchronization is achieved, the first dog clutch control portion 164 reduces the magnitude of the first drive current I1 (A) supplied to the first electromagnetic coil 64 of the first actuator 56 to stop the supply of the first drive current I1 supplied to the first electromagnetic coil 64. As a result, the first movable sleeve 50 is moved to the first meshing position by the urging force of the first spring 58.

When the first dog clutch control portion 164 reduces the magnitude of the first drive current I1 supplied to the first electromagnetic coil 64 of the first actuator 56, the first clutch engagement completion determining portion 164a determines whether the first dog clutch 24 is completely engaged, i.e., whether the first dog clutch 24 is switched from the first non-meshing state to the first meshing state.

When the first clutch engagement completion determining portion 164a determines that the first dog clutch 24 is switched from the first non-meshing state to the first meshing state, the coupling control portion 162 stops the supply of the coupling drive current supplied to either the right control coupling 34R or the left control coupling 34L selected by the wheel selecting portion 162c and subsequently controls the right coupling drive current Icpr (A) supplied to the electromagnetic coil of the right control coupling 34R and the left coupling drive current Icpl (A) supplied to the electromagnetic coil of the left control coupling 34L depending on a vehicle running state.

Although the examples of the present invention have been described in detail with reference to the drawings, the present invention is also applicable in other forms.

For example, in the four-wheel drive vehicle 10 of the first example described above, the second dog clutch 32 is a dog clutch having the second meshing teeth 104a of the second movable sleeve 104 meshed with the second meshing teeth 92b of the second ring gear 92; however, for example, a multiplate clutch selectively disconnecting or connecting the power transmission path between the propeller shaft 28 and the central axle 98 may be used instead of the second dog clutch 32. Specifically, any type of a clutch may be used instead of the second dog clutch 32 as long as the clutch selectively disconnects or connects the power transmission path between the propeller shaft 28 and the central axle 98.

In the four-wheel drive vehicle 10 of the first example described above, the one-sided chamfers CF3, CF4 are formed on the second meshing teeth 104a of the second movable sleeve 104 and the second meshing teeth 92b of the second ring gear 92, i.e., in the first example in which the second meshing teeth 92b, 104a of the second dog clutch 32 are meshed for switching from the two-wheel drive state to the four-wheel drive state after the first meshing teeth 42c, 50a of the first dog clutch 24 are meshed, the one-sided chamfers CF3, CF4 are formed on the second meshing teeth 92b, 104a of the second dog clutch 32 meshed later than the first dog clutch 24; however, for example, two-sided chamfers may be formed instead of the one-sided chamfers CF3, CF4. Furthermore, chamfered portions, i.e., chamfers, may not be formed on the second meshing teeth 104a of the second movable sleeve 104 and the second meshing teeth 92b of the second ring gear 92.

In the four-wheel drive vehicle 170 of the second example described above, the first dog clutch 24 is a dog clutch having the first meshing teeth 50a of the first movable sleeve 50 meshed with the first meshing teeth 42c of the first ring gear 42; however, for example, a multiplate clutch selectively disconnecting or connecting the power transmission path between the engine 12 and propeller shaft 28 may be used instead of the first dog clutch 24. Specifically, any type of a clutch may be used instead of the first dog clutch 24 as long as the clutch selectively disconnects or connects the power transmission path between the engine 12 and the propeller shaft 28.

In the four-wheel drive vehicle 170 of the second example described above, the one-sided chamfers CF1, CF2 are formed on the first meshing teeth 50a of the first movable sleeve 50 and the first meshing teeth 42c of the first ring gear 42, i.e., in the second example in which the first meshing teeth 42c, 50a of the first dog clutch 24 are mashed for switching from the two-wheel drive state to the four-wheel drive state after the second meshing teeth 92b, 104a of the second dog clutch 32 are meshed, the one-sided chamfers CF1, CF2 are formed on the first meshing teeth 42c, 50a of the first dog clutch 24 meshed later than the second dog clutch 32; however, for example, two-sided chamfers may be formed instead of the one-sided chamfers CF1, CF2. Furthermore, chamfered portions, i.e., chamfers, may not be formed on the first meshing teeth 50a of the first movable sleeve 50 and the first meshing teeth 42c of the first ring gear 42.

The above description is merely an embodiment and the present invention can be implemented in variously modified and improved forms based on the knowledge of those skilled in the art.

REFERENCE SIGNS LIST 10, 170,180: four-wheel drive vehicle
12: engine (drive power source)
14L, 14R: front wheel (main drive wheel)
16L, 16R: rear wheel (sub-drive wheel)
24: first dog clutch (dog clutch, second clutch)
28: propeller shaft (power transmitting member)
32: second dog clutch (first clutch, dog clutch)
34L: left control coupling (control coupling)
34R: right control coupling (control coupling)
42: first ring gear (fourth rotating member)
42c: first meshing teeth (sub-drive wheel-side meshing teeth)
50: first movable sleeve (third rotating member)
50a: first meshing teeth (drive-power-source-side meshing teeth)
92: second ring gear (first rotating member)
92b: second meshing teeth (drive-power-source-side meshing teeth)
98: central axle
100, 200, 210: electronic control device (control device)
104: second movable sleeve (second rotating member)
104a: second meshing teeth (sub-drive wheel-side meshing teeth)
116: synchronizing mechanism (first synchronizing mechanism)
160: running mode switching determining portion
162: coupling control portion
162a, 162d: rotation speed difference calculating portion
162b, 162e: 4WD switching determining portion
162c, 162f: wheel selecting portion
164: first dog clutch control portion
164b: synchronization completion determining portion
166: second dog clutch control portion
166a: synchronization completion determining portion
172: synchronizing mechanism (second synchronizing mechanism)

CF1, CF2, CF3, CF4: one-sided chamfer
S1, S2, S3, S4: difference between an idle rotation speed difference Vc1 and a first, second, third or fourth rotation speed difference Vs1, Vs2, Vs3 or Vs4
Sok: switchable region (predetermined range)
Vs: rotation speed difference
Vs1: first rotation speed difference
Vs2: second rotation speed difference
Vs3: third rotation speed difference (first rotation speed difference)
Vs4: fourth rotation speed difference (second rotation speed difference)
Vst: idle rotation speed difference (set rotation speed difference)

What is claimed is:

1. A four-wheel drive vehicle selectively switching between a two-wheel drive state in which a drive power is transmitted from a drive power source to a pair of left and right main drive wheels and a four-wheel drive state in which the drive power is also transmitted from the drive power source to a pair of left and right sub-drive wheels through a power transmitting member for transmitting the drive power to the pair of left and right sub-drive wheels and disconnecting the power transmitting member from each of the drive power source and the pair of left and right sub-drive wheels in the two-wheel drive state,
the four-wheel drive vehicle comprising:
a pair of left and right control couplings respectively coupled to the pair of left and right sub-drive wheels; a central axle disposed between the paired left and right control couplings and coupled to the pair of left and right control couplings; a dog clutch selectively disconnecting or connecting a power transmission path between the drive power source and the power transmitting member or a power transmission path between the power transmitting member and the central axle; and a control device, wherein
the dog clutch includes drive-power-source-side meshing teeth coupled to the drive power source in a power transmittable manner and sub-drive-wheel-side meshing teeth coupled to the sub-drive wheels in a power transmittable manner, wherein
the drive-power-source-side meshing teeth and the sub-drive-wheel-side meshing teeth are provided with one-sided chamfers to allow the drive-power-source-side meshing teeth and the sub-drive-wheel-side meshing teeth to mesh with each other when a rotation speed of the drive-power-source-side meshing teeth is greater than a rotation speed of the sub-drive-wheel-side meshing teeth in a case that the drive-power-source-side meshing teeth and the sub-drive-wheel-side meshing teeth come closer to each other and cause respective tip portions to abut on each other, wherein
when a switching request is made for switching from a non-meshing state in which the drive-power-source-side meshing teeth are not meshed with the sub-drive-wheel-side meshing teeth to a meshing state in which the drive-power-source-side meshing teeth are meshed with the sub-drive-wheel-side meshing teeth, the control device calculates a first rotation speed difference between the drive-power-source-side meshing teeth and the sub-drive-wheel-side meshing teeth in a case that one of the pair of left and right sub-drive wheels is coupled to the central axle by corresponding one of the pair of left and right control couplings, and a second rotation speed difference between the drive-power-source-side meshing teeth and the sub-drive-wheel-side meshing teeth in the case that the other of the pair of left and right sub-drive wheels is coupled to the central axle by corresponding the other of the pair of left and right control couplings, wherein
if at least one of the calculated first and second rotation speed differences is within a predetermined range set in advance, the control device couples the sub-drive wheel corresponding to the rotation speed difference within the predetermined range, to the central axle by the control coupling to switch the dog clutch from the non-meshing state to the meshing state, and wherein
if neither the calculated first nor second rotation speed difference is within the predetermined range, the control device prohibits switching of the dog clutch from the non-meshing state to the meshing state.

2. The four-wheel drive vehicle according to claim 1, wherein when both the first and second rotation speed differences are within the predetermined range, the control device selects the first rotation speed difference or the second rotation speed difference so that a smaller difference is selected out of a difference between a set rotation speed difference defined in advance and the first rotation speed difference and a difference between the set rotation speed difference and the second rotation speed difference, and couples the sub-drive wheel corresponding to the selected rotation speed difference, to the central axle by the control coupling.

3. The four-wheel drive vehicle according to claim 1, wherein even if neither the first rotation speed difference nor the second rotation speed difference is within the predetermined range and it is determined that the dog clutch needs to be switched from the non-meshing state to the meshing state, the control device couples the sub-drive wheel corresponding to a larger value of the first rotation speed difference and the second rotation speed difference, to the central axle by the control coupling.

4. The four-wheel drive vehicle according to claim 1, wherein
the dog clutch selectively disconnects or connects the power transmission path between the drive power source and the power transmitting member, wherein
the four-wheel drive vehicle comprises a first clutch selectively disconnecting or connecting the power transmission path in the power transmission path between the power transmitting member and the central axle, and wherein
when the sub-drive wheel is coupled to the central axle by the control coupling, the control device controls the dog clutch to connect the power transmission path between the drive power source and the power transmitting member and controls the first clutch to connect the power transmission path between the power transmitting member and the central axle.

5. The four-wheel drive vehicle according to claim 4, wherein
the first clutch includes a first synchronizing mechanism synchronizing a rotation speed of a first rotating member coupled to the power transmitting member in a power transmittable manner and a rotation speed of a second rotating member coupled to the central axle in a power transmittable manner, and wherein
when the sub-drive wheel is coupled to the central axle by the control coupling and the rotation speed of the first rotating member is synchronized with the rotation speed of the second rotating member by the first synchronizing mechanism, the control device switches the dog clutch from the non-meshing state to the meshing state.

6. The four-wheel drive vehicle according to claim 1, wherein
the dog clutch selectively disconnects or connects the power transmission path between the power transmitting member and the central axle, wherein
the four-wheel drive vehicle comprises a second clutch selectively disconnecting or connecting the power transmission path in the power transmission path between the drive power source and the power transmitting member, and wherein
when the sub-drive wheel is coupled to the central axle by the control coupling, the control device controls the dog clutch to connect the power transmission path between the power transmitting member and the central axle and controls the second clutch to connect the power transmission path between the drive power source and the power transmitting member.

7. The four-wheel drive vehicle according to claim 6, wherein
the second clutch includes a second synchronizing mechanism synchronizing a rotation speed of a third rotating member coupled to the drive power source in a power transmittable manner and a rotation speed of a fourth rotating member coupled to the power transmitting member in a power transmittable manner, and wherein
when the sub-drive wheel is coupled to the central axle by the control coupling and the rotation speed of the third rotating member is synchronized with the rotation speed of the fourth rotating member by the second synchronizing mechanism, the control device switches the dog clutch from the non-meshing state to the meshing state.

* * * * *